(12) United States Patent
Treiser

(10) Patent No.: US 11,100,523 B2
(45) Date of Patent: Aug. 24, 2021

(54) DETERMINING RELATIONSHIP VALUES

(71) Applicant: Gatsby Technologies, LLC, Washington, DC (US)

(72) Inventor: Adam Treiser, Washington, DC (US)

(73) Assignee: GATSBY TECHNOLOGIES, LLC

( * ) Notice: Subject to any disclaimer, the term of this patent is extended or adjusted under 35 U.S.C. 154(b) by 242 days.

(21) Appl. No.: 15/844,059

(22) Filed: Dec. 15, 2017

(65) Prior Publication Data

US 2018/0114238 A1     Apr. 26, 2018

Related U.S. Application Data

(63) Continuation-in-part of application No. 13/674,692, filed on Nov. 12, 2012, now abandoned, which is a continuation-in-part of application No. 13/461,670, filed on May 1, 2012, now Pat. No. 8,341,101, application No. 15/844,059, which is a continuation-in-part of application No. 13/903,651,
(Continued)

(51) Int. Cl.
| | |
|---|---|
| *G06F 16/00* | (2019.01) |
| *G06Q 30/02* | (2012.01) |
| *G06Q 50/00* | (2012.01) |
| *G06F 16/84* | (2019.01) |
| *G06F 16/28* | (2019.01) |

(52) U.S. Cl.
CPC ....... *G06Q 30/0204* (2013.01); *G06F 16/288* (2019.01); *G06F 16/88* (2019.01); *G06Q 30/02* (2013.01); *G06Q 50/01* (2013.01)

(58) Field of Classification Search
CPC .... G06F 16/288; G06F 16/355; G06F 16/337; G06F 16/9024; G06F 16/3347; G06F 16/367; G06F 16/35; G06F 16/90335; G06F 16/904; H01P 1/2002; H01P 1/2053; H01P 1/2084; H01P 7/04; H01P 7/10; G06Q 30/02; G06Q 30/0204; G06Q 50/01
USPC .................................................. 707/600–899
See application file for complete search history.

(56) References Cited

U.S. PATENT DOCUMENTS

| | | |
|---|---|---|
| 5,710,884 A | 1/1998 | Dedrick |
| 5,754,938 A | 5/1998 | Herz et al. |
(Continued)

FOREIGN PATENT DOCUMENTS

| | | |
|---|---|---|
| WO | WO 2007/134128 | 11/2007 |

OTHER PUBLICATIONS

A. Finder, When a Risque Online Persona Undermines a Chance for a Job, New York Times, Jun. 11, 2006 (2 pages).
(Continued)

*Primary Examiner* — Michelle N Owyang
(74) *Attorney, Agent, or Firm* — The Belles Group, P.C.

(57) ABSTRACT

In one embodiment, the present disclosure is directed to a method of identifying baselines for relationships. The method include obtaining, at a computer, a first set of relationships between information atoms, identifying baselines for the first set of relationships, and obtaining a second set of relationships between the information atoms. The method further includes determining differences between the baselines and the second set of relationships, and identifying how the differences relate to at least one information atom. A result is determined and output based on how the differences relate to the at least one information atom.

17 Claims, 47 Drawing Sheets

Related U.S. Application Data filed on May 28, 2013, now abandoned, which is a continuation of application No. 13/621,717, filed on Sep. 17, 2012, now Pat. No. 8,478,702, which is a continuation-in-part of application No. 13/461,670, filed on May 1, 2012, now Pat. No. 8,341,101, application No. 15/844,059, which is a continuation-in-part of application No. 14/605,996, filed on Jan. 26, 2015, now abandoned, which is a continuation of application No. 13/492,528, filed on Jun. 8, 2012, now Pat. No. 8,943,004, which is a continuation-in-part of application No. 13/461,670, filed on May 1, 2012, now Pat. No. 8,341,101, application No. 15/844,059, which is a continuation-in-part of application No. 14/442,393, filed as application No. PCT/US2013/069502 on Nov. 11, 2013, now abandoned, application No. 15/844,059, which is a continuation-in-part of application No. 15/305,946, filed as application No. PCT/US2015/026649 on Apr. 20, 2015, now abandoned.

(60) Provisional application No. 61/633,246, filed on Feb. 8, 2012, provisional application No. 61/715,415, filed on Oct. 18, 2012, provisional application No. 61/725,340, filed on Nov. 12, 2012, provisional application No. 61/981,887, filed on Apr. 21, 2014.

(56) References Cited

U.S. PATENT DOCUMENTS

| | | | |
|---|---|---|---|
| 5,966,533 A | 10/1999 | Moody | |
| 6,463,434 B2 | 10/2002 | Zhai | |
| 6,510,420 B1 | 1/2003 | Cessna et al. | |
| 6,778,982 B1 | 8/2004 | Knight et al. | |
| 6,990,486 B2 | 1/2006 | Ma et al. | |
| 7,035,855 B1 | 4/2006 | Kilger et al. | |
| 7,080,084 B2 | 7/2006 | Yoshimura | |
| 7,117,192 B2 | 10/2006 | Waltz et al. | |
| 7,177,864 B2 | 2/2007 | Ekhaus | |
| 7,365,308 B2 | 4/2008 | Trcka et al. | |
| 7,403,910 B1 | 7/2008 | Hastings et al. | |
| 7,406,434 B1 | 7/2008 | Chang et al. | |
| 7,454,412 B2 | 11/2008 | Diewald et al. | |
| 7,546,278 B2 | 7/2009 | Yang et al. | |
| 7,949,565 B1 | 5/2011 | Eldering | |
| 7,970,712 B2 | 6/2011 | Ruvolvo et al. | |
| 8,010,460 B2 | 8/2011 | Work et al. | |
| 8,010,570 B2 | 8/2011 | Sweeney | |
| 8,027,864 B2 | 9/2011 | Gilbert | |
| 8,036,930 B2 | 10/2011 | Brignull et al. | |
| 8,046,797 B2 | 10/2011 | Bentolila | |
| 8,082,291 B2 | 12/2011 | Gisolfi et al. | |
| 8,112,420 B2 | 2/2012 | Yamamoto et al. | |
| 8,341,101 B1 | 12/2012 | Treiser | |
| 8,370,244 B1* | 2/2013 | Daly | G06Q 40/04 705/36 R |
| 9,230,239 B2* | 1/2016 | Chen | G06Q 30/02 |
| 9,501,539 B2 | 11/2016 | Joshi | |
| 10,877,982 B1* | 12/2020 | De Boursetty | G06F 16/9535 |
| 2003/0033194 A1 | 2/2003 | Ferguson et al. | |
| 2003/0177127 A1 | 9/2003 | Goodwin et al. | |
| 2004/0122681 A1 | 6/2004 | Ruvolo et al. | |
| 2004/0215500 A1 | 10/2004 | Monahan | |
| 2006/0042483 A1 | 3/2006 | Work et al. | |
| 2006/0074832 A1 | 4/2006 | Gardner et al. | |
| 2006/0248087 A1 | 11/2006 | Agrawal et al. | |
| 2007/0011183 A1 | 1/2007 | Langseth et al. | |
| 2007/0078814 A1 | 4/2007 | Flowers et al. | |
| 2007/0192309 A1 | 8/2007 | Fischer et al. | |
| 2007/0239517 A1 | 10/2007 | Chung | |
| 2007/0260625 A1 | 11/2007 | Tien | |
| 2007/0299910 A1 | 12/2007 | Fontenot | |
| 2008/0162574 A1 | 7/2008 | Gilbert | |
| 2008/0184130 A1 | 7/2008 | Tien | |
| 2008/0215607 A1* | 9/2008 | Kaushansky | G06F 16/9535 |
| 2008/0288306 A1 | 11/2008 | MacIntyre | |
| 2008/0313200 A1 | 12/2008 | Archer | |
| 2009/0006286 A1 | 1/2009 | Angell et al. | |
| 2009/0063254 A1 | 3/2009 | Paul | |
| 2009/0106697 A1 | 4/2009 | Ward | |
| 2009/0132395 A1 | 5/2009 | Lam et al. | |
| 2009/0144211 A1 | 6/2009 | O'Sullivan | |
| 2009/0177644 A1 | 7/2009 | Martinez | |
| 2009/0187517 A1 | 7/2009 | Mihalkova | |
| 2009/0216563 A1 | 8/2009 | Sandoval et al. | |
| 2009/0240586 A1 | 9/2009 | Ramer | |
| 2009/0300326 A1 | 12/2009 | Sweeney | |
| 2010/0070448 A1 | 3/2010 | Omoigui | |
| 2010/0094858 A1 | 4/2010 | Indeck et al. | |
| 2010/0106752 A1 | 4/2010 | Eckardt, III | |
| 2010/0114899 A1 | 5/2010 | Guha et al. | |
| 2010/0153453 A1 | 6/2010 | Knowles | |
| 2010/0163316 A1 | 7/2010 | Chang | |
| 2010/0179845 A1 | 7/2010 | Davidson | |
| 2010/0179874 A1 | 7/2010 | Higgins | |
| 2010/0223581 A1* | 9/2010 | Manolescu | G06Q 10/00 715/853 |
| 2010/0228617 A1 | 9/2010 | Ransom et al. | |
| 2010/0235489 A1 | 9/2010 | Cogan | |
| 2010/0257028 A1 | 10/2010 | Hillerbrand | |
| 2011/0015969 A1 | 1/2011 | Loeb | |
| 2011/0035354 A1 | 2/2011 | Wan | |
| 2011/0087550 A1 | 4/2011 | Fordyce, III | |
| 2011/0153377 A1 | 6/2011 | Novikov | |
| 2011/0184894 A1 | 7/2011 | Cohen | |
| 2011/0191417 A1 | 8/2011 | Rathod | |
| 2011/0213741 A1 | 9/2011 | Shana et al. | |
| 2011/0295694 A1 | 12/2011 | Coggeshall et al. | |
| 2011/0307319 A1 | 12/2011 | Balestrieri | |
| 2012/0072264 A1 | 3/2012 | Perna | |
| 2012/0143921 A1 | 6/2012 | Wilson | |
| 2012/0158719 A1* | 6/2012 | Gannu | G06F 17/2785 707/732 |
| 2012/0166371 A1 | 6/2012 | Sweeney | |
| 2012/0166373 A1 | 6/2012 | Sweeney et al. | |
| 2012/0185353 A1 | 7/2012 | Goel | |
| 2012/0245887 A1 | 9/2012 | Spears | |
| 2012/0246170 A1 | 9/2012 | Antorno | |
| 2012/0278091 A1 | 11/2012 | Yaseen | |
| 2013/0007020 A1* | 1/2013 | Basu | G06F 16/367 707/750 |
| 2013/0018722 A1 | 1/2013 | Libby | |
| 2013/0018824 A1* | 1/2013 | Ghani | G06N 20/00 706/12 |
| 2013/0080212 A1* | 3/2013 | Li | G06Q 10/10 705/7.38 |
| 2013/0110928 A1* | 5/2013 | Ghosh | G06Q 50/01 709/204 |
| 2013/0346339 A1 | 12/2013 | Yao et al. | |
| 2014/0012886 A1 | 1/2014 | Downing | |

OTHER PUBLICATIONS

*Alice Corporation Pty. Ltd.* v. *CLS Bank International et al.*
B. Zhong, M. Hardin, and T. Sun, "Less Effortful Thinking Leads to More Social Networking? The Associations Between the Use of Social Network Sites and Personality Traits," Computers in Human Behavior, 27:1265-1271, 2011 (7 pages).
*Bilski et al.* v. *Kappos, Under Secretary of Commerce for Intellectual Property and Director, Patent and Trademark Office.*
C. Ross, E.S. Orr, M. Sisic, J.M. Arseneault, M.G. Simmering, and R. Robert Orr, "Personality and Motivations Associated with Facebook Use," Computers in Human Behaviors, 25:578-586, 2009 (9 pages).
C.M. Bishop, "Pattern Recognition and Machine Learning", vol. 4, Springer New York, 2006 (19 pages).
Cantador et al, Multilayered Semantic Social Network Modeling by Ontology-Based User Profiles Clustering Application to Collaborative Filtering, 2006.

(56) References Cited

OTHER PUBLICATIONS

Cindy K. Chung et al., Revealing Dimensions of Thinking in Open-Ended Self Descriptions: an Automated Meaning Extraction Method for Natural Languages, 42 J. Research & Personality, 96-132 (2008)—37 pages.
*Classen Immunotherapies, Inc.*, Plaintiff-Appellant, v. *Biogen IDEC*, Defendant-Appellee, and . . . .
Clements et al, Exploiting Positive and Negative Graded Relevance Assessments for Content Recommendation, 2010.
*Cybersource Corporation*, Plaintiff-Appellant, v. *Retail Decisions, Inc.*
D. Byrne, W. Griffitt, and D. Stefaniak, "Attraction and Similarity of Personality Characteristics," Journal of Personality and Social Psychology, 5(1):82-90, 1967 (9 pages).
D.C. Evans, S.D. Gosling, and A. Carroll, "What Elements of an Online Social Networking Profile Predict Target-Rater Agreement in Personality Impressions," In Proceedings of the International Conference on Web/ogs and Social Media, pp. 1-6, 2008 (6 pages).
D.J. Ozer and V. Benet-Martinez, "Personality and the Prediction of Consequential Outcomes," Annu. Rev. Psycho/., 57:401-421, 2006 (available online 2005) 23 pages.
E.C. Tupes and R.E. Christal, "Recurrent Personality Factors Based on Trait Ratings," Journal of Personality, 60(2):225-251, 1992 (released for publication in 1961) 28 pages.
E.L. Kelly and J.J. Conley, "Personality and Compatibility: A Prospective Analysis of Marital Stability and Marital Satisfaction," Journal of Personality and Social Psychology, 52(1):27-40, 1987 (14 pages).
*Electric Power Group, LLC*, Plaintiff-Appellant v. *Alstom S.A., Alstom Grid, Inc., Psymetrix, Ltd., Alstom Limited*, Defendants-Appellees'.
Eric Gilbert and Karrie Karahalios, Predicting Tie Strengths With Social Media, ACM CHI '09 Proceedings of the 27th international conference on Human factors in computing systems (2009)—10 pages.
Facebook F8: Redesigning and hitting 800 million users, LA Times, Sep. 2011 (3 pages).
G. Holmes, A. Donkin, and 1.H. Witten, "WEKA: A Machine Learning Workbench," Intelligent Information Systems, 1994, Proceedings of the 1994 Second Australian and New Zealand Conference on, IEEE, pp. 357-361, 1994 (5 pages).
In re Abele and Marshall United States Court of Customs and Patent Appeals.
J. Goldbeck et al., "Predicting Personality with Social Media," Submitted for Review to CHI (2011)—10 pages.
Jim Sterne, "Text Analytics for Social Media—Evolving Tools for an Evolving Environment," White Paper (201 O)—17 pages.
Kai-Yu Wang et al., Discovering Interest Groups for Marketing in Virtual Communities, J Bus Res (2012)—7 pages.
L.R. Golberg, "A Broad-Bandwidth, Public Domain, Personality Inventory Measuring the Lower-Level Facets of Several Five-Factor Models," Personality Psychology in Europe, 7:7-28, 1999 (22 pages).
L.R. Goldberg, "The Structure of Phenotypic Personality Traits," American Psychologist, 48(1):26-34, 1993 (9 pages).
Cloninger, and H.G. Gough, The International Personality Item Pool and the Future of Public-Domain Personality Measures, Journal of Research Personality, 40:84-96, 2006 (available on line 2005) 18 pages.
M.R. Barrick and M.K. Mount, "The Big Five Personality Dimensions and Job Performance: A Meta-Analysis," Personnel Psychology, 44(1):1-26, 1991 (26 pages).
M.T. Russell and D.L. Karol, "The 16PF Fifth Edition Administrator's Manual," Institute for Personality and Ability Testing Champaign, IL, 1994 (10 pages).
Mark R. Gilbert et al. "Planning for 2012: Uncover Synergies from ECM and B1 Investments," Gartner, Inc., ID:G002176645 (2011)—5 pages.

*Mayo Collaborative Services, Oba Mayo Medical Laboratories, et al.* v. *Prometheus Laboratories, Inc.*
Michael Chui et al., "The Impact of Big Data on Payments," 2012—7 pages.
Office Action issued in U.S. Appl. No. 13/621,717, dated Dec. 19, 2012 (23 pages).
P.T. Costa Jr. and R.R. Mccrae, "NEO Personality Inventory-Revised (NEO-Pl-R) and NEO Five-Factor Inventory (NEO-FFI) Professional Manual," Odessa, FL,:Psychological Assessment Resources, 1992 (5 pages).
Paul Gillan, The New Conversation: Taking Social Media from Talk to Action, Harvard Business Review (2010)—24 pages.
PCT International Search Report and Written Opinion of PCT Application No. PCT/US2012/61642, dated Feb. 5, 2013 (17 pages).
PCT International Search Report and Written Opinion of PCT Application No. PCT/US2013/025070, dated Apr. 15, 2013 (11 pages).
PCT International Search Report and Written Opinion of PCT Application No. PCT/US2013/025128, dated Apr. 16, 2013 (13 pages).
PCT International Search Report and Written Opinion of PCT Application No. PCT/US2013/24119, dated Apr. 8, 2013 (19 pages).
PCT International Search Report and Written Opinion of PCT Application No. PCT/US15/26649, dated Jul. 30, 2015.
PCT International Search Report dated Apr. 26, 2013 for International Application No. PCT/US13/24060 filed Jan. 31, 2013 (15 pages).
P. T. Costa Jr. and R. R. McCrae, "NEO Personality Inventory-Revised (NEO-PI-R) and NEO Five-Factor Inventory (NEO-FFI) Professional Manual," Odessa, FL.,: Psychological Assessment Resources, 1992 (5 pages).
R.P. Tett, D.N. Jackson, and M. Rothstein, "Personality Measures as Predictors of Job Performance: A Meta-analytic Review," Personnel Psychology, 44:703-742, 1991 (40 pages).
S. Zhao, S. Grasmuck, and J. Martin, "Identity Construction on Facebook: Digital Empowerment in Anchored Relationships," Computers in Human Behavior, 24:1816-1836, 2008 (21 pages).
Personality in Online Social Networks: Self-reported Facebook-related Behaviors and Observable Profile Information, Cyberpsychology, Behavior, and Social Networking, 14(9):483-488, 2011 (6 pages).
S.D. Gosling, S. Gaddis, and S. Vazire, "Personality Impressions Based on Facebook Profiles," ICWSM, 2007 (4 pages).
Sarah Perez, "How Twitter Is Pairing Its Interest Graph With Ads," TechCrunch (2012)—2 pages.
Search BusinessAnalytics.com Tip Guide: 'Big Data' Finds Ally in Predictive Analytic, but Combo Requires Care, TechTarget Business Applications and Analytics Media—7 pages.
T. Correa, A, W. Hinsley, and H. G. De Zuniga, "Who Interacts on the Web?: The Intersection of Users' Personality and Social Media Use," Computers in Human Behavior, 26:247-253, 2009 (7 pages).
T. Ryan and S. Xenos, "Who Uses Facebook? An Investigation into the Relationship Between the Big Five, Shyness, Narcissism, Loneliness, and Facebook Usage." Computers in Human Behavior, 24:1658-1664, 2011 (7 pages).
T.A. Judge, C.A. Higgins, C.J. Thoresen, and M.R. Barrick, "The Big Five Personality Traits, General Mental Ability, and Career Success Across the Life Span," Personnel Psychology, 52(3):621-652, 1999 (32 pages).
Tom DuBois, et al., Improving Recommendation Accuracy by Clustering Social Networks With Trust, 3rd ACM Conference on Recommender Systems workshop: Recommender Systems and the Social Web (2009)—7 pages.
United States Court of Appeals, Federal Circuit. In Re: Lewis Ferguson, Darryl Costin and Scott C. Harris.
Y. Amichal-Hamburger and G. Vinitzky, "Social Network Use and Personality," Computers in Human Behavior, 26:1289-1295, 2010 (7 pages).
Y. Bachrach et al., "Personality and Patterns of Facebook Usage," WebSci 2012, Jun. 22-24, 2012 (9 pages).

\* cited by examiner

DETERMINING RELATIONSHIP VALUES

CROSS REFERENCE TO RELATED APPLICATIONS

The present application is a continuation in part of U.S. patent application Ser. No. 13/674,692, filed Nov. 12, 2012, which is a continuation-in-part of U.S. patent application Ser. No. 13/461,670, filed on May 1, 2012 (now U.S. Pat. No. 8,341,101), and also claims the benefit of U.S. Provisional Patent Application No. 61/633,246, filed Feb. 8, 2012, and of U.S. Provisional Patent Application No. 61/715,415, filed on Oct. 18, 2012.

The present application is also a continuation in part of U.S. patent application Ser. No. 13/903,651, filed May 28, 2013, which is a continuation of U.S. patent application Ser. No. 13/621,717, filed Sep. 17, 2012, now U.S. Pat. No. 8,478,702, which is a continuation in part of U.S. patent application Ser. No. 13/461,670, filed on May 1, 2012 (now U.S. Pat. No. 8,341,101). Application Ser. Nos. 13/461,670 and 13/621,717 also claim the benefit of U.S. Provisional Application No. 61/633,246, filed Feb. 8, 2012.

The present application is also a continuation in part of U.S. patent application Ser. No. 14/605,996, filed Jan. 26, 2015, which is a continuation of U.S. patent application Ser. No. 13/492,528, filed Jun. 8, 2012, now U.S. Pat. No. 8,943,004, which is a continuation in part of U.S. patent application Ser. No. 13/461,670, filed on May 1, 2012 (now U.S. Pat. No. 8,341,101), which claims the benefit of U.S. Provisional Patent Application No. 61/633,246, filed Feb. 8, 2012.

The present application is also a continuation in part of U.S. patent application Ser. No. 14/442,393, filed May 12, 2015, which is a U.S. national stage application under 35 U.S.C. § 371 of PCT Application No. PCT/US13/69502, filed Nov. 11, 2013, which claims the benefit of U.S. Provisional Application No. 61/725,340, filed Nov. 12, 2012.

The present application is also a continuation in part of U.S. patent application Ser. No. 15/305,946, filed Oct. 21, 2016, which is a U.S. national stage application under 35 U.S.C. § 371 of PCT Application No. PCT/US2015/026649, filed Apr. 20, 2015, which claims the benefit of U.S. Provisional Application No. 61/981,887, filed Apr. 21, 2014.

The disclosures of the aforementioned priority applications are incorporated herein by reference in their entireties.

BACKGROUND

There is a growing trend among companies and organizations to collect and use large quantities of information about customers and consumers. Customer profiling systems, for example, are known in the art. Traditional profiling systems include consumer rewards cards, credit card purchase information, demographic profiling, behavioral profiling, and customer surveying. Generally, these systems attempt to determine products, promotions, and advertisements that are most likely to appeal to a specific customer or broad customer segment. This information helps businesses forecast future market behavior, manage their product portfolio and inventory levels, adjust product pricing, design marketing strategies, and determine human resource and capital investment needs in order to increase revenue, market share, and profitability. While most customer profiling approaches create basic customer profiles, these profiles do not reflect the myriad similarities between customers or the numerous ways in which customers can be grouped. Additionally, customer information is often collected with respect to a single business metric and may never be used to glean insights about other metrics that may be helpful to the company.

In addition, organizations that depend on gratuitous donations—whether donations of money, time, goods, services, membership or other contributions—as the sole or primary source of revenue and resources, are vitally concerned with efficiently maintaining and growing the amount, value, and frequency of such donations, as well as maintaining and increasing the number of donors and donor groups that make contributions to the organization. Further, businesses, investors, and other stakeholders frequently require evidence that an individual, product, brand, TV show, movie, advertisement, business venture, or potential partner can attract and possibly influence before engaging in a business relationship.

Further, while predictive analytics may be used to identify relationships and trends from collected information, this information may be widely dispersed within an organization. Consequently, processing the stored information into a useable form may require significant time and effort.

As a result, there is a need for a system that addresses the issues above.

BRIEF SUMMARY

The present disclosure may be directed, in one aspect, to a method of identifying baselines for relationships, the method comprising obtaining, at a computer, a first set of relationships between information atoms; identifying baselines for the first set of relationships; obtaining a second set of relationships between the information atoms; determining differences between the baselines and the second set of relationships; identifying how the differences relate to at least one information atom; determining a result based on how the differences relate to the at least one information atom; and outputting the result.

BRIEF DESCRIPTION OF THE DRAWINGS

The accompanying drawings, which are incorporated in and constitute a part of this specification, illustrate embodiments and together with the description, serve to explain the principles of the invention. In the drawings.

DETAILED DESCRIPTION

Figure 1:
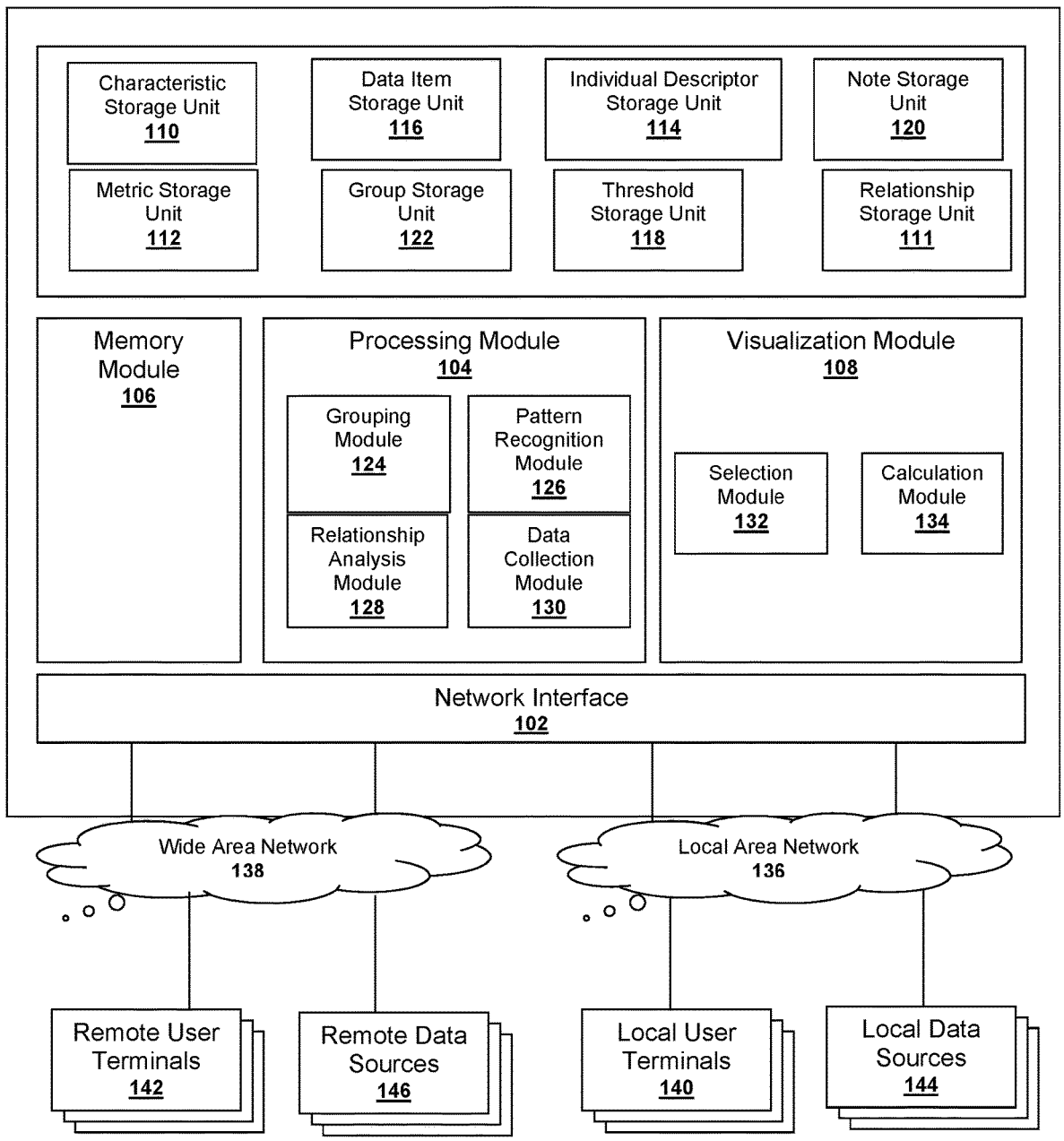
FIG. 1 is a block diagram of an exemplary embodiment of a characteristic-based server.

The disclosure is divided into three sections. Section I relates generally to relates to characteristic-based profiling systems. Section II relates generally to systems and methods for analyzing and displaying large amounts of data. Section III relates generally to the assisted onboarding of complex datasets. Different embodiments disclosed in the respective sections can be used together as part of an apparatus, method, or system. To the extent a term, reference number, or symbol is used differently in different sections, context should be taken from the relevant section and not the other sections.

Section I

This section relates to characteristic-based profiling systems and, more particularly, to combining multiple points of data regarding individuals through the use of characteristics in order to determine the relationship between the individuals and user-defined criteria.

Description of Related Art

Customer profiling systems are known in the art. Traditional systems include consumer rewards cards, credit card purchase information, demographic profiling, behavioral profiling, and customer surveying. Some businesses supplement these traditional systems with website and social media analytic tools that profile the business's fans and followers according to factors such as "likes," "click-through rates," and search engine queries, among others. Generally, these systems attempt to determine products, promotions, and advertisements that are most likely to appeal to a specific customer or broad customer segment. This information helps businesses forecast future market behavior, manage their product portfolio and inventory levels, adjust product pricing, design marketing strategies, and determine human resource and capital investment needs in order to increase revenue, market share, and profitability. For example, advertising targeted at customers who are most likely to purchase a product may be more effective than advertising targeting broader audiences. Likewise, products that are related to one another are likely to be purchased by the same customer and may sell better if offered at the same time, whether as a package or as separate items. Online retailers often use a similar approach, suggesting items that other customers frequently purchase in conjunction with the selected item.

While most approaches create basic customer profiles, these profiles do not reflect the myriad similarities between customers or the numerous ways in which customers can be grouped. For example, most approaches generally provide profiles on either an individual customer or an overly broad customer segment (for example, all women ages 25-34 with a college degree), failing to reflect the various degrees of granularity with which customers can be grouped. One type of approach typically uses only historical, static, and quantitative or objective information. As a result, customer profiles created by these approaches are generally outdated and inaccurate, and fail to account for the vast amount of potentially rich, but qualitative and subjective, information about the customer that is available to most businesses. A second type of approach uses only subjective or qualitative information. These approaches also have drawbacks. Typically, they use expensive and time-consuming methods such as customer surveys or focus groups. Due to the nature of the setting, the results may not accurately reflect the attitudes or opinions of the surveyed individuals. Due to the expense and time involved, only a limited number of individuals may be surveyed. Likewise, the purchasing suggestions created by these systems are often inaccurate. For example, while many customers who purchase item A also purchase item B, that information does not provide any insight into what a specific customer, or group of customers, may be interested in.

Additionally, customer information is often collected with respect to a single business metric and may never be used to glean insights about other metrics that may be helpful to the company. This is particularly true for businesses that are growing and those that have multiple departments. Growing businesses must usually adjust or supplement its performance metrics to reflect new goals, strategies, and business operations. As a result, these businesses must understand how its customers relate to the new set of business metrics rather than, or in addition to, the ones for which the data was originally collected. Similarly, businesses with multiple departments frequently gather customer information for purposes of a department-specific metric, but fail to use that information across other departments or globally within the organization. For example, a business may have a marketing department and risk management department. Customer information gathered by the marketing department when researching new product markets may never be seen or used by the risk management team to determine whether that customer or market poses undue risk to the business. Methods for combining this disparate data, (for example, a technique sometimes referred to as "one version of the truth analysis") do not allow the business to apply the same method to external data it may be interested in. Furthermore, these systems are used only to organize the information and are not useful for analyzing it.

For example, companies may gather information to attempt to measure the sentiment that individuals, or groups of individuals, express towards certain topics (for example, a specific product, brand, company, issue, or person). This may allow an organization to determine how people perceive it, or topics important to it.

Sentiment analysis methods are capable of identifying the sentiment expressed in a single statement, or the overall sentiment expressed by multiple statements; however, these methods typically cannot determine whether this sentiment accurately reflects the individual's (or group's) true feelings, or simply reflects the mannerisms and style of that individual or group. For example, a certain individual may generally express strong sentiments as part of their personal style, even when they do not feel strongly about the topic they are discussing. Sentiment analysis methods may incorrectly determine that this individual has a strong sentiment towards a given topic, based on the sentiment normally expressed by that individual. Thus, there is a need for a more accurate sentiment analysis method that takes into account the baseline sentiment expressed by each individual or group, to more accurately determine that individual's or group's sentiment towards a given topic.

In addition, sentiment analysis methods are unable to determine which individuals matter the most to an organization. For example, a business may wish to identify which customers have the most impact on a marketing campaign. Likewise, an organization may wish to identify individuals that have absolutely no significance to it whatsoever, and should therefore be ignored. These sentiment analysis methods may be able to identify which individuals have positive or negative sentiment about the campaign. However, these methods will not be able to determine which of those individuals are also the most important to that business. For example, an organization may wish to identify individuals who make statements that influence others. A positive or negative review by one individual (for example, a technology critic) may be taken more seriously, and influence more people, than a similar review by another individual. In other cases, the sentiment expressed by an individual may be a reliable predictor of larger trends, even if that individual's statement is not influential. For example, certain individuals may have insights that are later expressed by large groups, even if the group is unaware of that insight. Thus, an organization may wish to identify these insightful individuals, in order to determine trends and attitudes as early as possible.

Likewise, an organization may wish to know how a positive or negative sentiment expressed by an individual corresponds to certain behavior by that same individual. For example, whether an individual who makes a negative statement about a service later discontinues that service. This may allow the organization to determine which dissatisfied customers it should offer the largest incentives to continue their service. A business might also wish to know which individuals that make positive statements about a product later purchase that product. This may allow a business to identify which potential customers are most likely to make a purchase, in order to target those customers with incentives. A business may also want to identify people with similar sentimental patterns and characteristic based profiles so as to better understand how to address, prepare for, and anticipate various situations, changes in situations, relationships, customer feelings, reactions, or sentiments.

The organization may also wish to track the change in an individual's sentiment based on certain actions by the organization. For example, whether an incentive was effective in retaining a customer because it actually changed the customer's sentiment, or whether the customer has retained service because of the incentive, but remains dissatisfied. Or, whether a certain marketing campaign affects individuals' sentiment towards a product.

In the advertising, marketing, and public relations fields, businesses often tailor their communications with existing or potential consumers, investors, employees and others. These communications are tailored, to the greatest extent possible, for the business' purpose in sending the message and for the individual(s) who are intended to receive the message. Tailoring the message appropriately has become increasingly more difficult with the advent of real-time messaging, targeted advertising, social media, viral campaigns, and more. These communication platforms require businesses to communicate with the intended recipient as if on a 1-to-1 basis. Nevertheless, tailoring the message appropriately is only becoming more important as doing so often increases conversion rates, click-through rates, sales, and other barometers of an advertising, marketing or PR campaign's success. As discussed above, systems that use basic profiling techniques result in customer profiles that are generally outdated and inaccurate. As a result, these systems do not allow these businesses to tailor their message as narrowly as possible for each individual, or group.

For example, "cookies" are used to track and monitor user behavior on the Internet in order to measure the effectiveness of an advertisement, or other message. These cookies are ever more important in the Social Media context because users of such platforms frequently share content with other friends or people on the network, rather than actually clicking on the advertisement. Thus, it is increasingly important to understand the type of person who is accessing or viewing an advertisement or message; otherwise the value of such "word of mouth" marketing is greatly diminished. However, it is difficult to capture a complete profile of each individual or group of individuals through the use of cookies. Thus, there is a need for a system that can determine how effective an advertisement or message is, or will be, in reaching certain individuals or types of individuals.

In addition, many organizations attempt to collect real-time information about their customers or audience. However, this is often difficult to do with the basic profiling techniques described above. In addition, these basic techniques often cannot be performed in real time, and result in customer profiles that are generally outdated and inaccurate.

Many organizations also sell the data they collect about individuals to other organizations. Often however, this information is not very detailed. Many organizations will not (or cannot) sell sensitive or detailed information about each individual, due to privacy concerns and laws. Thus, there is a need for a system that is capable of creating a detailed profile about an individual, or group of individuals, in a way that does not reveal any identifying or sensitive information about the individual(s).

There is also a need for a system that can create a predictive profile of an individual, or group of individuals, in order to predict future behavior and performance. Many organizations attempt to track the performance of individuals. For example, large companies attempt to track employee performance, to determine which employees perform well, and which are likely to perform well in the future. These companies also attempt to determine how well each job candidate is likely to perform, if they were given a job with the company. Thus, there is a need for a system that can create a detailed profile about an individual or group of individuals, and determine how that profile relates to certain performance characteristics. There is also a need for a system that can provide this information without revealing sensitive information, or information the employer is not allowed to consider as a factor, about each individual, In business environments where team projects and collaboration play a significant role, many companies struggle to assemble the most effective teams. Often, managers and human resource departments assemble teams on the basis of employees' skill sets, seniority, and/or experience. However, factors such as shyness, social dominance, creativity, leadership, the ability to officiate and foster an open and collaborative work environment, among many others, are not formally taken into consideration when assembling a team. Even when a business recognizes the importance of these and other subjective factors, they are not formally included in the analytical process because such factors are expensive and obtrusive to measure, based upon inconsistent or inaccurate anecdotes, or are measured through historical performance and peer assessment reviews. These basic systems do not provide real time feedback to team members regarding its performance with respect to critical subjective criteria, such as identifying overly-dominant team members who are drowning out others, identifying "free-riders", identifying harmful "intra-group cliques", identifying power-struggles within a team, or identifying detrimental body language, tone-of-voice, or communication habits. Thus, the basic systems do not enable a business to address these important group dynamic issues until after it is too late.

Characteristic based screening can also be used to identify which individuals have a greater propensity to be a terrorist, sex-offender, or spy. Basic systems rely on identifying known associations between an individual and other potentially harmful or threatening people or organizations. These associations, however, do not enable a government agency to measure "grey areas" of a person. For example, two individuals may be nearly identical in their known associations, but one person is often angry, vengeful, and has an explosive temperament. In contrast, the second individual may be characterized by spirituality, self-evaluation, and ambition. As a result, the first individual may have a greater correlation with anti-social behavior and should not be trusted.

One of the most difficult aspects facing businesses today is how to measure the value of its connections and affiliations on social media platforms. Specifically, there is a need to understand and measure characteristics such as an affiliated individual's reach, the strength of the connection between the individual and the business, the strength of the connection between the individual and his or her personal social network and sub-networks, and the trustworthiness of the connection with the individual, the density of the business' social network and that of its "fans", "followers", and "likes." This would enable a business to measure its connections, understanding which connections reach the most people, have the greatest impact on people (and which people), have the greatest ability to motivate action in others, and are interested in topics affiliated or connected, either directly or indirectly, with the business. All of this may then be correlated back to the business' own metrics, so that it may know who is a valuable social media connection, when, and for what reason.

Further, organizations that depend on gratuitous donations-whether donations of money, time, goods, services, membership or other contributions—as the sole or primary source of revenue and resources, are vitally concerned with efficiently maintaining and growing the amount, value, and frequency of such donations, as well as maintaining and increasing the number of donors and donor groups that make contributions to the organization. These organizations compete with one another for the donations that an individual or entity, such as a corporation, is willing to make to support the organization's mission or to support such organizations and activities generally. Moreover, because these organizations are generally unable to provide a reciprocal material or tangible benefit in return for a donation, they have fewer methods and opportunities for successfully marketing to, and acquiring a donation from, a potential donor.

These organizations currently rely on inefficient tactics and tools for fundraising, maintaining the support of existing donors, acquiring new donors, and marketing themselves to potentially lucrative third-party partners. These organizations currently struggle to efficiently identify, attract, motivate, reward, and communicate and interact with, existing or prospective donors or third-party partners. As a result, these organizations struggle to efficiently maintain and grow the amount, value, or frequency of the donations they receive or the number of donors or donor groups from which they receive such donations. For example, many nonprofit organizations struggle to identify the opportune moments for soliciting donations from specific donors and, instead, solicit donations, such as through a direct mailer, from many donors at the same time. Many nonprofit organizations also struggle to identify effective means of incentivizing donors. As a result, these organizations frequently provide donors with the same or similar reward, such as a placard or calendar, even though many donors may be more effectively motivated to make a donation if provided a different incentive. Additionally, many nonprofit organizations struggle to evaluate fundraising campaigns and events and identify those that would likely appeal to specific donors or other stakeholders. As a result, many nonprofit organizations pursue fundraising opportunities—such as bake sales, golf tournaments, marathons and races, silent auctions, telethons, and even governmental grants and awards—without understanding the ability of each opportunity to motivate and attract the greatest number of donors, the most valuable donors, or the most valuable third-party partners, for the organization. Not only do these methods often fail to provide efficient returns, they also cause the organization to dilute the efficacy of its mission, solicitations, and marketing. More important, however, is that these methods fail to capture a characteristic profile of the donor and donor group, which would enable the organization to better understand the causes, messages, rewards and methods of motivating and communicating with a donor and donor group in order to increase the value, size, frequency, or number of donations received from a donor and donor group, as well as increase the number of donors and donor groups.

Additionally, individuals attempting to market themselves depend on the ability to identify the type of audience that would or would not be interested in such individual. However, these individuals, such as celebrities, athletes, aspiring actors, chefs, politicians, reality TV participants, or any other individual, currently do not have the tools and methods to efficiently and accurately capture the characteristic-based profile of his or her current and prospective friends, fans, followers, or audience that does, or would likely, listen to or watch, be motivated by, or interested in, such individual. As a result, these individuals generally are unable to demonstrate the value they can, or would likely, provide to an organization such as a corporate sponsor, advertiser, TV network, talent agency, movie studio, or venture capitalist.

Similarly, businesses, investors, and other stakeholders frequently require evidence of the audience that an individual, product, brand, TV show, movie, advertisement, business venture, or potential partner, whether an individual or entity, can attract and possibly influence before engaging in a business relationship or investing in such individual, product, brand, TV show, movie, advertisement, business venture, or partnership. These business, investors, and other stakeholders currently are unable to efficiently capture a characteristic-based profile of the audience or constituents that such potential investments would acquire the interest and attention of, or possibly influence.

There is a need for a system that addresses the issues above.

Summary

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

Consistent with an exemplary embodiment of the present invention, there is provided a computer-readable non-transitory storage medium having instructions which, when executed on a processor, perform a method for identifying relationships between individuals, metrics, and sub-metrics, using characteristics.

In one embodiment, a method of identifying related characteristics is disclosed. In this method, a computer receives descriptions of individuals, characteristics that define categories of individuals generally; and a metric. The computer gathers data items and calculates a number of relationships between the gathered data and the received items. Based on these relationships, groups of related characteristics can be identified, and output to a user, another system, or stored for future use. Thus, the disclosed method can be used to identify groups of related characteristics. In another embodiment, instructions are contained in a non-transitory computer-readable medium that are operable to execute the disclosed method of identifying related characteristics. In a third embodiment, a computer is disclosed that performs the disclosed method of identifying related characteristics. The computer may contain memory, a network interface, and a processor running software operable to perform the disclosed method.

It is to be understood that both the foregoing general description and the following detailed description are exemplary and explanatory only, and are not restrictive of the invention, as claimed. Further features or variations may be provided in addition to those set forth herein. For example, the present invention may be directed to various combinations and sub-combinations of the disclosed features, or combinations and sub-combinations of several further features disclosed below in the detailed descriptions.

Detailed Description

Reference will now be made in detail to an exemplary embodiment of the invention, an example of which is illustrated in the accompanying drawings. Wherever possible, the same reference numbers will be used throughout the drawings to refer to the same or like parts. It is apparent, however, that the embodiments shown in the accompanying drawings are not limiting, and that modifications may be made without departing from the spirit and scope of the invention.

Systems and methods consistent with the invention provide a characteristic-based system for identifying, organizing, describing, and visualizing relationships between a business's metrics and individuals. To this end, the characteristic-based system may define a number of characteristics. As used herein, the term characteristic broadly refers to any attribute, trait, value, or other factor associated, whether objectively or subjectively, with an individual or group of individuals. The detailed description below provides further examples of such characteristics. When receiving information about an individual, the characteristic-based system may use a suitable relationship-determining module (i.e., a software component, a hardware component, or a combination of a software component and a hardware component) comprising relationship-determining algorithms known in the art to determine the relationship between the information and the characteristics. This relationship may be described using both a magnitude and a direction. Further, the description may be represented by a numerical value, textual identifier, graphical icon, color, opacity, or any other suitable method of representing the relationship. The magnitude may represent how strongly the information is related to the characteristics, including the lack of any relationship at all. The relationship may also be identified as positive, negative, or neutral. The term "positive" broadly refers to relationships where the existence of, or a change in, one member of the relationship corresponds to a similar existence of, or a similar change in, the other members. The term "negative" broadly refers to relationships where the existence of, or a change in one member of the relationship corresponds to a lack of the existence of, or an inverse change in, the other members. The term "neutral" broadly refers to a relationship where the existence of, or a change in one member of the relationship does not correspond to any existence or change in the other members.

The system may also receive a plurality of descriptors, identifying or describing specific individuals. The system may use a similar relationship-determining module to identify which individual, or individuals, are the most strongly related to the information. Again, the relationships may include a magnitude, and/or a direction identified as positive, negative, or neutral. In this way, the system may further determine the relationship between the individuals and the characteristics. These relationships may be accumulated over time to develop a better understanding of the individual, based on multiple data points.

Further, the system may use the relationship-determining modules to identify new relationships and patterns in the data. The system may use these relationships and patterns to create new characteristics, which will be used when evaluating the received data. Likewise, over time the system may identify characteristics that generally do not relate to the data. It may flag these characteristics as irrelevant with respect to certain data or relationships. The system may then skip the irrelevant characteristics, increasing performance.

The system may also use the relationship-determining module to identify characteristics that are related to each other. The system may group these related characteristics together, as a group of characteristics. Any title may be given to this group of characteristics, or to the group of individuals, data, data sources, or metrics that have a strong relationship with that group of characteristics. The system may use the relationship-determining module to determine the relationships between the groups of characteristics and the characteristics, data, individuals, and the other groups of characteristics. In this manner, personality types may be identified and analyzed.

In addition, the system may receive a metric, representing an overall goal or interest of a particular organization. As used herein, the term metric broadly refers to any attribute, measurement, goal, strategy, or other information of interest to an organization. The metric may also consist of a number of sub-metrics. As used herein, the term sub-metric broadly refers to any attribute, measurement, goal, strategy, or other information related to the metric. The system may use a suitable relationship-determining module to identify the relationship between the metric and the characteristics. In this way, the system may further determine the relationship between the metrics and the individuals. The system may also determine the relationship between groups of characteristics and the metric, and individuals and the metric. In this manner, the organization may gain information on how personality types or individuals contribute to the metric it is interested in.

Further, a visualization module (i.e., a software component, a hardware component, or a combination of a software component and a hardware component) may be used to develop a representation of any relationship or group of relationships. The user may select two areas of interest. The selections may comprise one or more metrics, sub-metrics, characteristics, groups of characteristics, individuals, data items, data sources, or any grouping of the same. Once both selections have been made, the system may use the relationships for those selections to calculate an overall relationship between the two. The system may then represent this overall relationship as a single value or descriptor. Further, the user may assign weights to one or more of the selection items, or change the assigned weights. When the weights are changed, the system may re-calculate all relationships and values associated with the weights. The system may use these weights accordingly when calculating the overall relationship between the selections. The system may also determine the relationships between one selection and the underlying items comprising the other selection. The system may then compute a single value or descriptor for the underlying items. In this manner, the user is able to determine how the underlying items contribute to the overall relationship between the selections.

The system may also receive a plurality of threshold criteria. As used herein, the term threshold criteria broadly refers to any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed. The system may output notifications when any threshold criteria are met.

FIG. 1 is a block diagram of an exemplary embodiment of a characteristic-based server 100. One skilled in the art will appreciate that system 100 may be implemented in a number of different configurations without departing from the scope of the present invention. As shown in FIG. 1, characteristic-based system 100 may include a network interface 102, a memory module 106, a processing module 104, a visualization module 108, and one or more interconnected information storage units, such as, for example, a characteristic storage unit 110, a relationship storage unit 111, a metric storage unit 112, an individual descriptor storage unit 114, a data item storage unit 116, a threshold criteria storage unit 118, a note storage unit 120, and a group storage unit 122. While the information storage units in the embodiment shown in FIG. 1 are interconnected, each information storage unit need not be interconnected. Moreover, rather than separate storage units, characteristic-based server 100 may include only one database that would include the data of storage units 110-122. Likewise, while the data storage units are shown as part of server 100, in another embodiment, one or more storage units may be separate units, connected to server 100 through network interface 102.

Network interface 102 may be one or more devices used to facilitate the transfer of information between server 100 and external components, such as user terminals 140, 142 and data sources 144, 146. Network interface module 102 may receive user requests from local user terminal 140 or remote user terminal 142, and route those requests to processing module 104 or visualization module 108. In exemplary embodiments, network interface module 102 may be a wired or wireless interface to a local-area network connecting one or more local user terminals 142 and local data sources 144, or wide-area network such as the internet, connecting one or more remote user terminals 142, or remote data sources 146. Network interface module 102 may allow a plurality of local user terminals 140 and remote user terminals 142 to connect to the system, in order to make selections and receive information, alerts, and visualizations. Network interface module 102 may also allow the system to connect to one or more local data sources 144, on a local-area-network, or remote data sources 146, on one or more remote networks.

Memory module 106 may represent one or more non-transitory computer-readable storage devices that maintain information that is used by processing module 104 and/or other components internal and external to characteristic-based server 100. Further, memory module 106 may include one or more programs that, when executed by processing module 104, perform one or more processes consistent with embodiments of the present invention. Examples of such processes are described below with respect to FIGS. 1-16. Memory module 106 may also include configuration data that may be used by processing module 104 to present user interface screens and visualizations to user terminals 140 and 142. Examples of such screens are described in greater detail with respect to FIGS. 9-16.

Processing module 104, as shown in FIG. 1, may further include a data collection module 130, a grouping module 124, a pattern recognition module 126, and a relationship analysis module 128. Data collection module 130 may include components for collecting data items from data sources, using network interface 102. As described in more detail below, data items collected by the data collection module may include any information pertaining to an individual. Relationship analysis module 128 may include components for determining the existence and strength of a relationship between two items. For example, and as described in greater detail below, relationship analysis module 128 may include a natural-language processing component for determining the relationship between two items. Grouping module 124 may include components for identifying groups of related items. For example, and as described in greater detail below, grouping module 124 may use relationships identified by relationship analysis module 128 to identify groups of related items. Pattern recognition module 126 may include components for identifying patterns in the received data. For example, and as described in greater detail below, pattern recognition module 126 may include pattern recognition algorithms known in the art to identify new characteristics based on patterns of received data.

As shown in FIG. 1, characteristic-based server 100 may also include a plurality of interconnected storage units, 110-122. In this regard, server 100 may include a storage unit module (not shown) having components for controlling access to storage units 110-122. Such a storage unit module may include a query function that, in response to a match request, may query information stored in one or more of storage units 110-122 to identify characteristics, data items, or metrics meeting specified criteria. Storage units 110-122 may be configured using any appropriate type of unit that facilitates the storage of data, as well as the locating, accessing and retrieving of data stored in the storage units.

Characteristic storage unit 110 may store general characteristics of individuals. As used herein, the term characteristic broadly refers to any attribute, trait, value or other factor associated, whether objectively or subjectively, with an individual or group of individuals. For example, a characteristic may reflect a number of attributes that may be applicable to one or more individuals, such as types of previously or currently held fields of work (e.g., salesperson), professional or personal values (e.g., environmentalism), location (e.g., New York), social interactions (e.g., trendsetter), emotional traits (e.g., generally negative), user-defined characteristics, or others.

Relationship storage unit 111 may store information regarding relationships between one or more characteristics, individuals, groups of characteristics, metrics, data items, or groups thereof. Relationship storage unit 111 may also store values, weights, or other information calculated by processing module 104 or visualization module 108.

Data item storage unit 116 may store data collected by data collection module 130. Data item storage unit 116 may also store metadata associated with the data items, describing the data items. For example, metadata may include the data source the data item was collected from, the time the data item was posted or created, the time the data item was collected, the type of data item (e.g., a blog post), or the individual with which the data is associated. Data item storage unit 116 may also store data items received, or created by characteristic-based server 100.

Metric storage unit 112 may store metrics and sub-metrics for an organization. As used herein, a metric broadly refers to any measurement, criteria, goal, or information of interest to an organization. For example, a given organization may be interested in "brand awareness," or how likely a given person is to recognize the organization's brand. The metric may also be comprised of sub-metrics. As used herein, a sub-metric refers to any information related to a metric. For example, sub-metrics related to brand awareness may include "internet mentions" for that brand, how widely those mentions are distributed, how the mentions describe the brand, number of sales, or others.

Individual descriptor storage unit 114 may store descriptors of specific individuals. As used herein, an individual descriptor includes any information that identifies a specific individual, as opposed to a group of people. Descriptors may include names, addresses, employee numbers, drivers license numbers, credit card and other banking account information, social security numbers, behavioral profiles, relationship or social network information, linguistic styles or writing, voice recognition, image recognition, or any other unique identifiers. In this manner, each descriptor or group of descriptors may be used to identify a unique individual.

Threshold criteria storage unit 118 may store the threshold criteria used to determine when a notification should occur. Threshold criteria may include any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed.

Note storage unit 120 may store notes, consisting of information entered by one or more users, that are associated with one or more individual descriptors, groups, relationships, metrics, sub-metrics, data items, or data sources. The information may include textual, graphical, audio, or video information. For example, a user may enter a description of a specific group, as the "treehugger" group. This description may allow users to more easily refer to, and understand the characteristics that comprise that group.

Group storage unit 122 may store groups, consisting of a plurality of characteristics, or other groups. These groups may allow users to more easily identify and understand categories of individuals.

Visualization module 108, as shown in FIG. 1, may further include a selection module 132 and a calculation module 134. Selection module 132 may include components for receiving user selections from network interface module 102. For example, selection module 132 may allow users on remote terminals to make selections. User selections may consist of one or more individual descriptors, metrics, sub-metrics, characteristics, groups, data items, data sources, or groups thereof. Calculation module 134 may include components for determining the relationships between the selected groups and the remaining groups, data items, metrics, sub-metrics, characteristics, data sources, and individuals. This may include using the relationships to calculate an overall relationship for a group with respect to the other groups, data items, metrics, characteristics, data sources, and individuals. Calculation module 134 may also receive weights associated with a group, data item, metric, sub-metric, characteristic, data source, or individual, and use the weights in conjunction with the stored relationships when determining the overall relationship for a selection. Visualization module 108 may use the calculated values for a selection to build a screen containing at least one selection, and a representation of the overall relationship between that selection and at least one other selection. Visualization module 108 may also include additional information about the selection in the screen. For example, and as discussed in more detail below, selection module 132 may receive a selection of an individual and a selection of a metric. Calculation module 134 may determine the overall relationship between the individual and metric based on the stored relationships. Visualization module 108 may return a screen containing information about the individual and a single descriptor of the overall relationship.

Characteristic server 100 may consist of a single computer or mainframe, containing at least a processor, memory, storage, and a network interface. Server 100 may optionally be implemented as a combination of instructions stored in software, executable to perform the steps described below, and a processor connected to the software, capable of executing the instructions. Alternatively, server 100 may be implemented in a number of different computers, connected to each other either through a local-area network (LAN) or wide-area network (WAN). Data collection module 130 may optionally comprise search engine tools known in the art, operable to find data sources and data items relevant to the search criteria, such as an individual. Storage units 110-122 may comprise any computer-readable medium known in the art, including databases, file systems, or remote servers.

Figure 2:
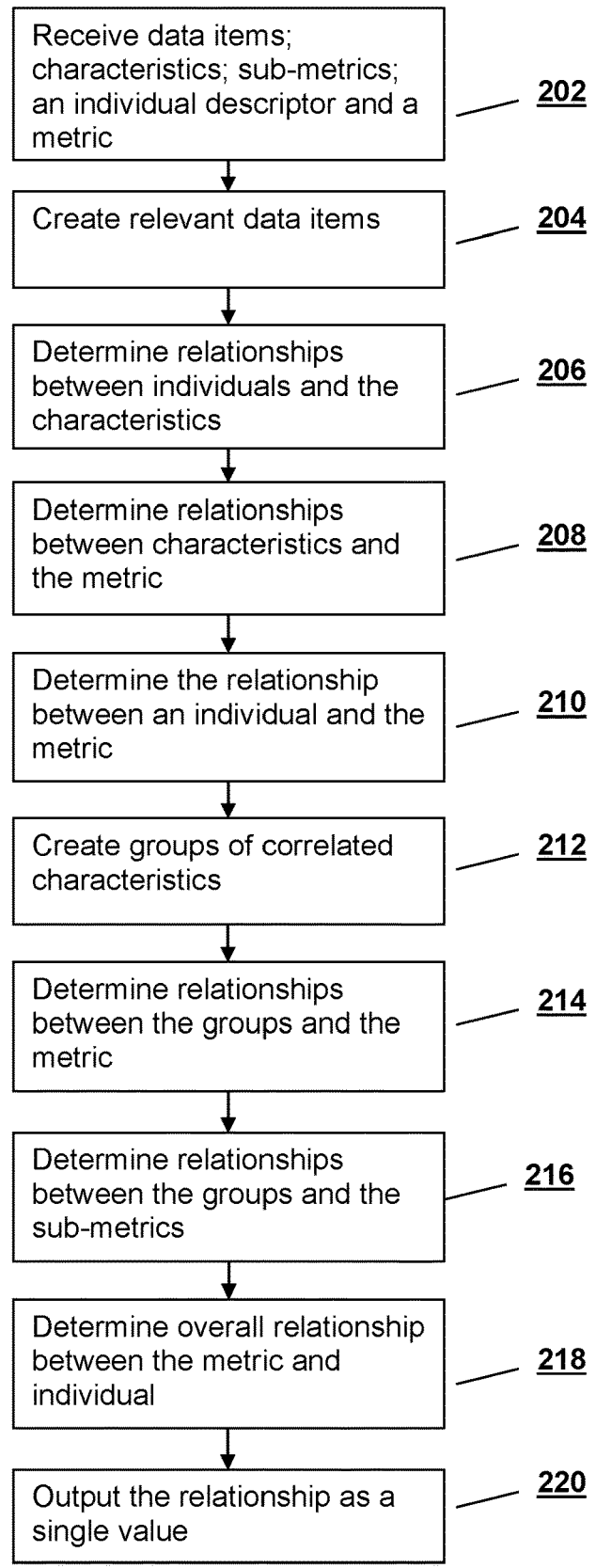
FIG. 2 is a flowchart depicting one process for determining a relationship score for an individual relative to a metric.

FIG. 2 is a flowchart demonstrating an exemplary process 200 for characteristic-based profiling consistent with the present invention. For example, characteristic-based system 100 may use process 200 of FIG. 2 to determine the relationship between an individual, or groups of individual descriptors, and a user-specified metric based on a number of characteristics. As shown in FIG. 2, process 200 may begin by receiving a number of characteristics, an individual descriptor, and a metric. A metric broadly refers to any measurement, goal, interest, parameter, or other information that an organization may be interested in learning.

In one embodiment, the metric will be an overall goal or measurement related to a business. In this embodiment, the system uses the data and characteristics to obtain information about existing and potential customers that are positively and negatively related to the metric. However, the system may also be used to identify other factors related to the metric, such as characteristics, groups of characteristics, data sources, or sub-metrics. By recognizing new characteristics as data is processed, the system may also identify new, previously unknown, customers or groups of customers related to the metric. For example, the system may use a pattern recognition module 126, described above, to determine patterns of data that are not defined as characteristics, but which occur on a regular basis. Once recognized, the system may automatically define these patterns as new characteristics.

As discussed above, characteristics broadly refer to any attribute, trait, value, or other factor associated, whether objectively or subjectively, with an individual or group of individuals. For example, characteristic types may comprise: social network (influencer, follower, etc.); sentimental (positive, neutral, etc.); temperamental (emotionless, dramatic, etc.); attitudinal (health conscious, eco-friendly, etc.); psychographic (personality factors, personality-derived factors, etc.); demographic (age, gender, etc.); transactional (past purchases, rewards, etc.); firmographic (employment, rank, etc.); data item attributes (data source; author, etc.); cognitive dimensions of thinking (i.e., evaluative, schedule-driven, etc.), or other descriptions of groups or categories of people. A characteristic may be an objective factor, such as age or income, a subjective factor, such as "eco-friendly," or a combination of objective and subjective factors. These characteristics are typically selected by a user, based on known templates, or on the types of individuals they believe will be relevant to one or more metrics or sub-metrics. Alternatively, or in addition, and as described in more detail below, the system itself may identify characteristics that are relevant to the metric as it analyzes the data items. These characteristics may also be obtained or purchased from other data sources, such as marketing databases, or public websites, discussion boards, or databases.

Individual descriptors broadly refer to any information that may be used to identify a specific individual, including account information, license numbers, phone numbers, email addresses, name, relationship information, behavioral profile, nicknames or aliases, or any information that may be used to differentiate one individual from a group. These descriptors may be received from organizations, users, or internal or external data sources, as described below. Further, an individual descriptor may contain multiple pieces of information that collectively identify a specific person. For example, an individual descriptor may consist of a name, driver's license number, credit card account number, and street address, which may be used collectively to identify a specific person. This example is not limiting, and any information that uniquely identifies an individual may be part of an individual descriptor. For another example, an individual descriptor may consist only of social network information, which describes a person by their social or business relationships to others.

At step 202, the system may receive a plurality of data items, characteristics, sub-metrics, an individual descriptor, and a metric. The data items may be received from a plurality of data sources. At step 204, the system may create relevant data items for the individual. In one embodiment, the system accesses all data sources that may have relevant information about the metric. These data sources may comprise; internal data sources (e.g. crm, payroll, etc.), privately-shared sources (e.g., suppliers, partners, etc.), user-authorized data sources (e.g., social media accounts, etc.), public data sources (e.g., blogs, tweets, etc.), or purchased data sources (e.g., data aggregators, credit card db, etc.). As discussed above, the purchased data sources may also contain characteristics, metrics, or individual descriptors. In another embodiment, the system may only access data from sources that have been marked as relevant for one or more individual descriptors, metrics, groups, or sub-metrics.

In general, data sources may contain both structured, and unstructured data, which may be qualitative and subjective, quantitative and objective, or a combination of both. Structured data broadly refers to any data that is placed into a pre-existing structure such as a database, spreadsheet, or form. Unstructured data broadly refers to data that does not have a defined structure, such as prose, news articles, blog posts, comments, messages, emoticons, images, video, audio, or other freely-entered data. Quantitative and objective data broadly concerns factual, measurable subjects. For example, quantitative data may be described in terms of quantity, such as a numerical value or range. In comparison, qualitative and subjective data broadly describes items in terms of a quality or categorization wherein the quality or category may not be fully defined. For example, qualitative and subjective data may describe objects in terms of warmth and flavor.

The system may use an appropriate relationship-determination module (i.e., a software component, a hardware component, or a combination of a software component and a hardware component), utilizing techniques known in the art, to determine the strength of the relationship between the data items and the individuals. This relationship strength consists of a number or descriptor indicating the magnitude of the relationship. The strength of the relationship represents how strongly the data item is related to a specific individual descriptor. For example, a data item discussing the name, address, and family members of the individual would have a strong relationship to an individual descriptor containing the same information. Likewise, a data item that did not mention any of the information comprising the individual descriptor would not have a strong relationship to that descriptor. In this manner, the system may determine which individuals are associated with the data item. The system may also use other methods to identify the individual associated with, or likely to be associated with a data item. For example, the data item may be associated with a known individual descriptor, such as a username, account, or name.

These data items will be strongly correlated with any individual descriptor containing a matching user name, account, or name. In another embodiment, the system may determine when the data item refers to a pseudonym, or includes missing information about an individual. For example, when a data item strongly relates to a known descriptor, but the names do not match, the system may use additional methods to determine whether the two individuals are the same. In such a case, the system may create a pseudonym item, containing a descriptor of the individual associated with the data item. If additional data items are also found to have a strong relationship to both the individual descriptor and the pseudonym, the system may add the information from the pseudonym to the individual descriptor. In this manner, future data items relating to the pseudonym may be identified with the individual. If no strong relationship is found, the system may use the pseudonym to create a new individual descriptor.

The system may automatically use the pseudonym to create a new individual descriptor, or add the pseudonym information to an existing individual descriptor, if threshold relationship strengths are met. For example, if the relationship strength between the pseudonym and the descriptor reaches a set value, the system may automatically merge the two. Likewise, if the relationship strength falls below a certain threshold, the system may automatically create a new descriptor based on the pseudonym. This behavior is not limited to names, and the system may perform this action when any of the information in the individual descriptor does not match the information in the data item. In this manner, the system is capable of collecting new information about the individuals, as well as recognizing new individuals.

If a strong relationship exists between the data item and an individual descriptor, the system creates an association between the data item and the individual descriptor. The system will also mark the data source as relevant to the individual descriptor, so that it may be identified more quickly in the future. The system will next use an appropriate method known in the art, such as, for example, natural language processing, to identify the portions of the data item that are relevant to the individual. The system uses the relevant data portions to create a new data item, containing only the data relevant to one or more individual descriptors. In this embodiment, only the relevant data items will be analyzed.

At step 206, the system uses a suitable relationship-determining module (i.e., a software component, a hardware component, or a combination of a software component and a hardware component) to determine the relationship between the individual descriptors and the characteristics. The relationship-determining module may comprise algorithms known in the art, including one or more of; natural language processing, textual analysis, contextual analysis, direct 1-to-1 mapping, artificial intelligence, image analysis, speech analysis, or other suitable techniques known for determining correlations, patterns, or relationships. The relationship consists of a magnitude, indicating the strength (or lack thereof) of the relationship, and a direction, indicating whether the relationship is positive, negative, or neutral. As used in this application, the direction simply indicates whether a given relationship represents a positive correlation (i.e. positive direction), a negative correlation (i.e., negative direction), or no correlation (i.e. neutral direction). For example, an individual who has repeatedly shown "eco-friendly" behavior and attitudes will be positively correlated with an "eco-friendly" characteristic. In this case, the characteristic and individual descriptor would have a strong, positive relationship. Similarly, an individual who displays hostility towards "eco-friendly" topics and ideas would be negatively correlated with the "eco-friendly" characteristic. The individual descriptor for this person would have a strong negative relationship with the "eco-friendly" characteristic. Finally, an individual who did not correlate to the "eco-friendly" characteristic would have a neutral relationship with it.

Figure 3:
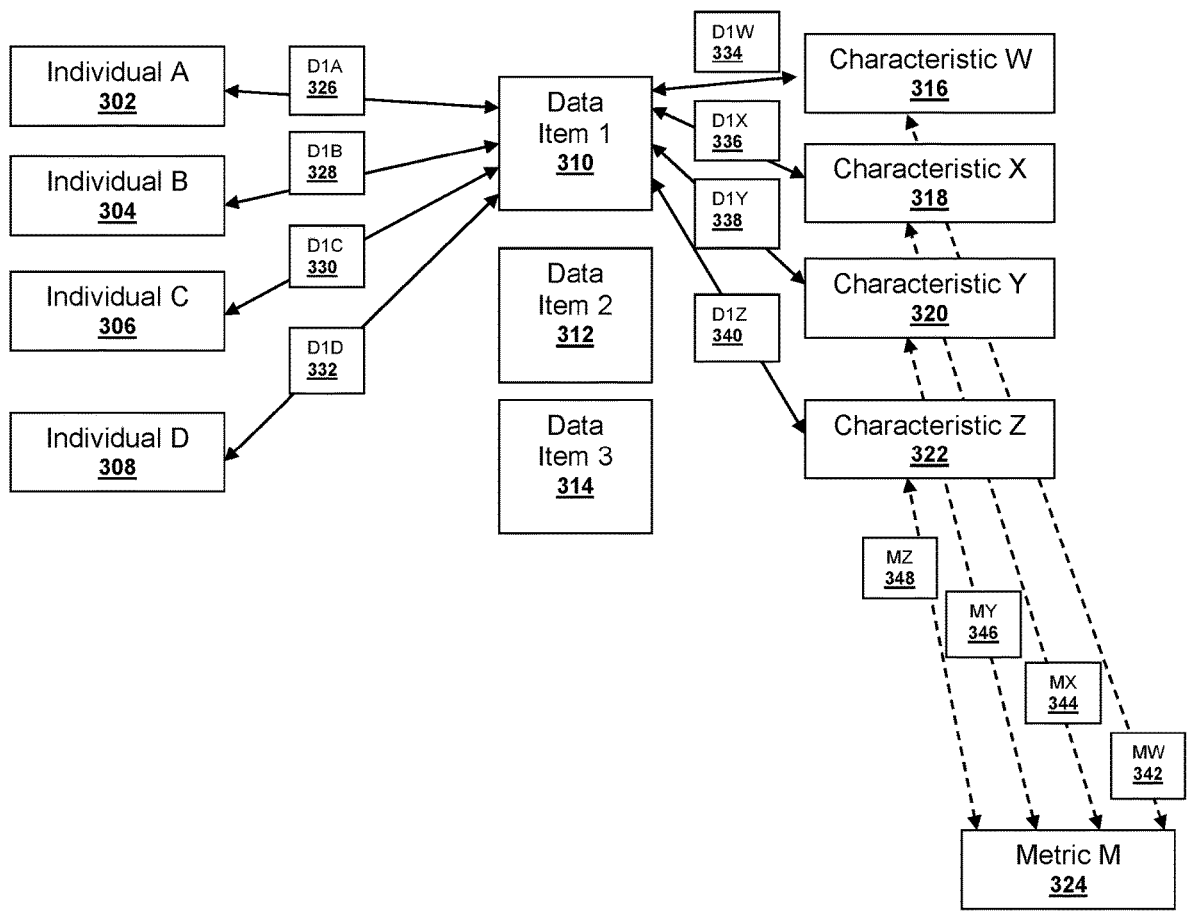
FIG. 3 is a block diagram depicting an example of relationships between characteristics, metrics, data items, and individuals.
Figure 4:
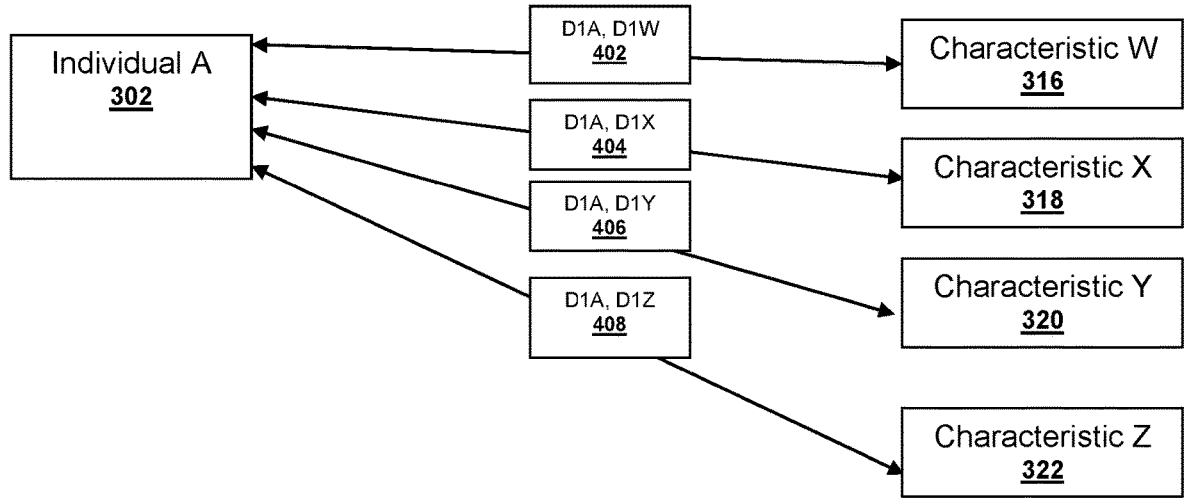
FIG. 4 is a block diagram depicting an example of relationships between individuals and characteristics.

To determine this relationship, the system may use a relationship-determining technique known in the art to determine the relationship between the data items and the characteristics. This relationship may consist of a magnitude and a direction. The system may also calculate a value for a characteristic based on the relationship between the characteristic and the data item, and the relationship between the data item and the individual descriptor. This is represented in FIG. 3, items 326-332 (first set of relationships) and 334-340 (second set of relationships). For example, the relationship between individual A 302 and characteristic W 316 will be determined based on second relationship D1W 334 and first relationship D1A 326; where second relationship D1W 334 represents the relationship between characteristic W and data item 1 310, and first relationship D1A represents the relationship between data item 1 and individual A. The combined relationships will be stored with the characteristics, and associated with the individual descriptor as shown in FIG. 4. The combined scores based on D1A, D1W, 402 to D1A, D1Z 408 are associated with the relationship between individual A 302, and characteristics W 316 to Z 322.

Figure 5:
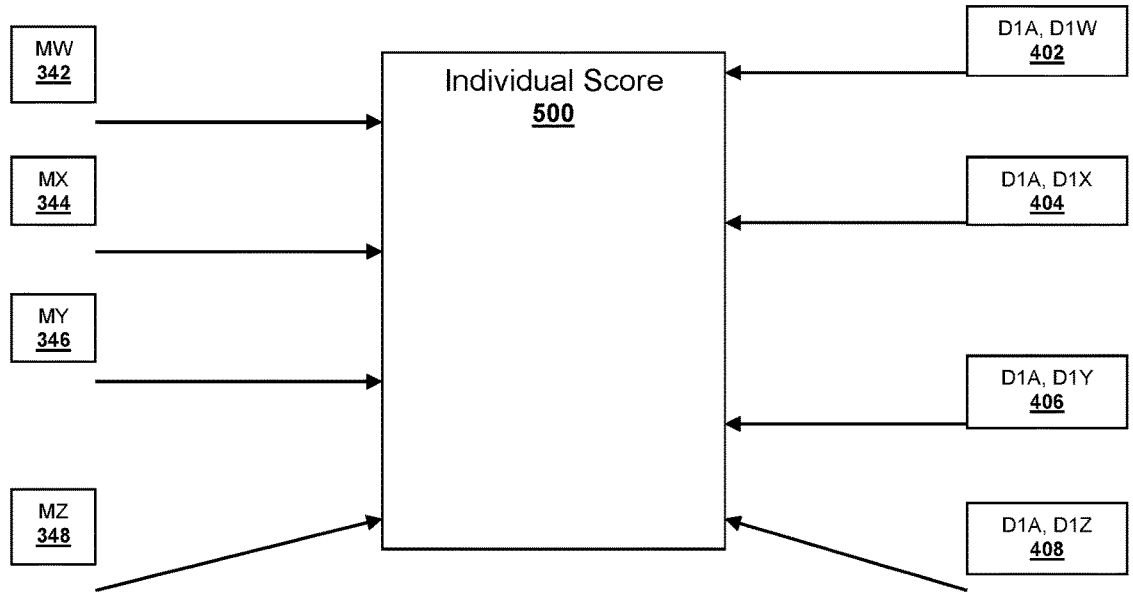
FIG. 5 is a block diagram depicting an example score for an individual related to a metric.

Returning now to FIG. 2, at step 208, the system may also determine the relationship between the characteristics and the metric. This relationship may also consist of a magnitude and direction, as described above. The system may determine this relationship using a suitable relationship-determining module (i.e., a software component, a hardware component, or a combination of a software component and a hardware component), known in the art. FIG. 5 illustrates an example of the third set of relationships determined between characteristics W 316 to Z 322, and metric M 324, represented by MW 342 to MZ 348 respectively.

At step 210, the system may determine the relationship between individual descriptor 302 and metric 324. The system may determine this relationship using a suitable relationship-determining module, as described above. This relationship may also consist of a magnitude and direction, as described above. As shown in FIG. 5, this relationship may be determined based on the relationships between characteristics 316-322 and metric 324, represented by MW 342 to MZ 348, and the relationships between the individual 302 and characteristics 316 to 322, represented as D1A, D1W 402 to D1A, D1Z 408 (the sixth set of relationships).

At this point, the system may output individual-metric relationship 500, representing the strength of the relationship between individual 302 and metric 324. This score may be represented as a numerical value, a descriptor, an image, or any other means of conveying the overall magnitude and/or direction of the relationship between individual 302 and metric 324.

In another embodiment, the system may store a "baseline" sentiment for each relationship. For example, when a relationship is first calculated between two items, the system may store the sentiment associated with that relationship as a baseline for the relationship. The sentiment may include any type of meaning, such as a general temperament or mood, an emotion towards a specific thing, or a temporary change in mood. Multiple baselines can be created for an individual based on any number of factors identified as significant, such as context (e.g., with whom the individual is conversing, where the individual is, what did the individual just do or encounter, and what's happening in the world), subject matter, and time. Machine learning, sentiment analysis, natural language processing, image analysis, contextual analysis, voice recognition and speech analysis, and other suitable techniques may be used to identify sentiments, create baselines, and identify the degree of difference from one or more baselines and determine the significance of such difference with respect to the individual, other individuals, and a business. When computing or forecasting future relationships between the same or similar items (with respect to either the same individual or a different individual for purposes of forecasting or comparison) the system may compare the new relationships to one or more of the baseline relationships, in order to determine in what manner and to what extent they differ from one or more of the baselines. The system may determine whether these differences are associated with other data items such as specific topics, interests, events, interactions, situations, noises, or images. These differences may also be associated with a specific time, date, or location. The system may also determine whether the differences are associated with exposure to any other individual, any group of individuals, or any particular media, such as music, television, movies, books, radio, the Internet and specific webpages or a category thereof, mobile applications, advertisements, or promotions. The system may also determine whether the differences are associated with any particular temperature, body temperature, or geographic location. The system may also store these differences. In this manner, the system may calculate and store the changes in each relationship over time. The system may also calculate relationships between each difference and all the other stored items. In this manner, the system may identify how each change in sentiment is related to other relationships, individuals, and other changes in sentiments and business circumstances. For example, a strong relationship between a data item related to one individual that has a strong positive sentiment towards a data item, and differs from that relationship's baseline may be related to other individuals' also expressing strong positive sentiment towards the same item. Or, it may be related to other individuals' expressing mild negative sentiments towards a different data item. Using pattern recognition module 126, the system may also identify patterns in these relationships over time. Likewise, the system may identify patterns in one or more of the baselines over time. The system may also use machine learning or other suitable techniques, as mentioned above, to recognize new baselines in one or more relationships, as more information is collected.

Figure 6:
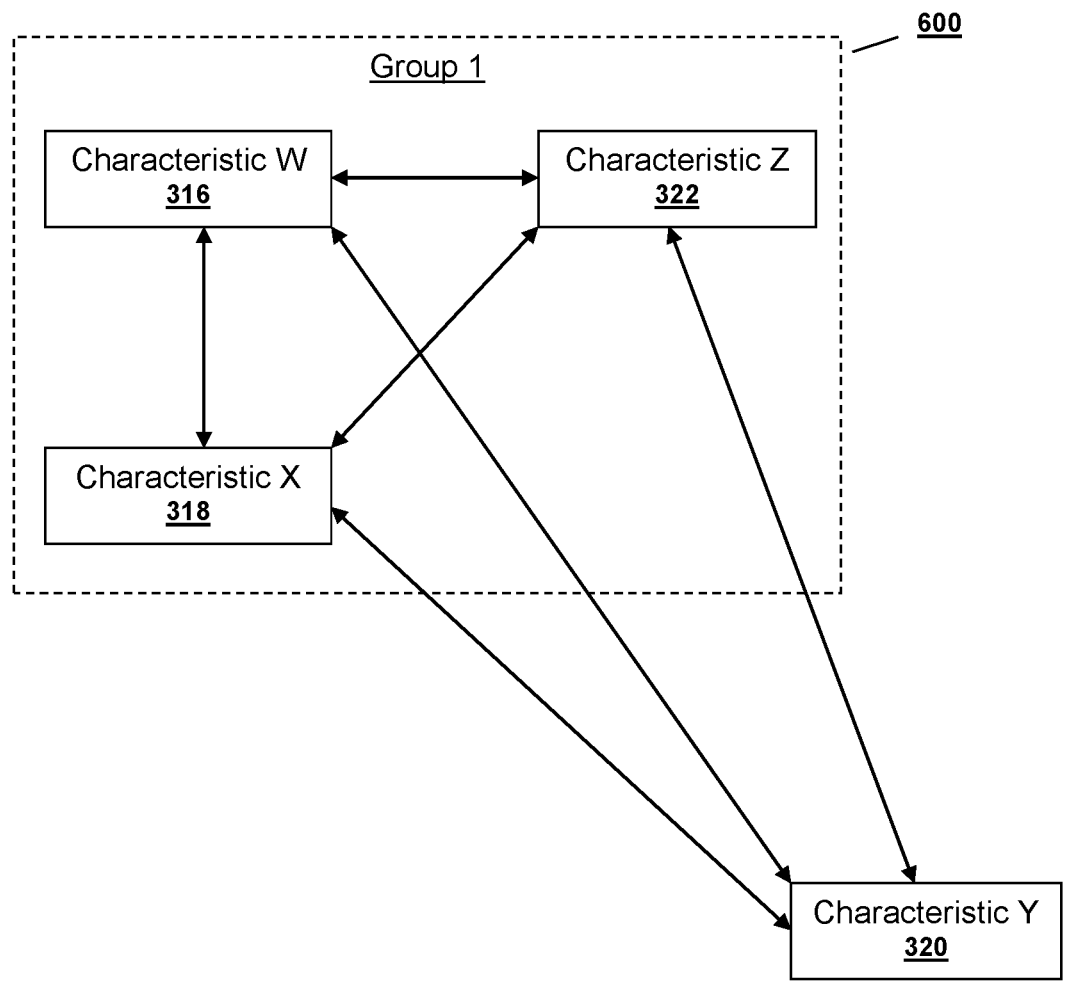
FIG. 6 is a block diagram depicting an example group of characteristics.

In another embodiment, the system may identify groups of characteristics, in order to determine the relationship between the groups and the metric. In this embodiment, the system may also use a suitable relationship-determining module, as described above, to determine the relationships between the characteristics. At step 212 in FIG. 2, the system may identify groups of characteristics that have strong relationships to each other using grouping module 124. As shown in FIG. 6, characteristics W 316, X 318, and Z 322 are strongly related, and the system may group them into group 1 600. Because characteristic Y 320 is not strongly related to the others, the system may not include it in group 1 600.

Figure 7:
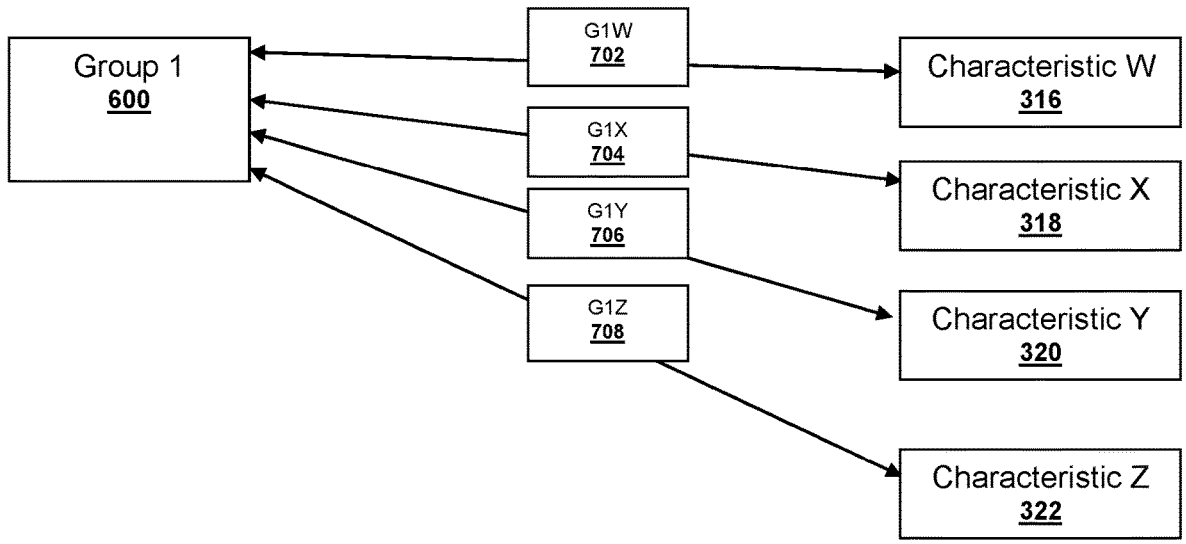
FIG. 7 is a block diagram depicting an example of relationships between groups and characteristics.
Figure 8:
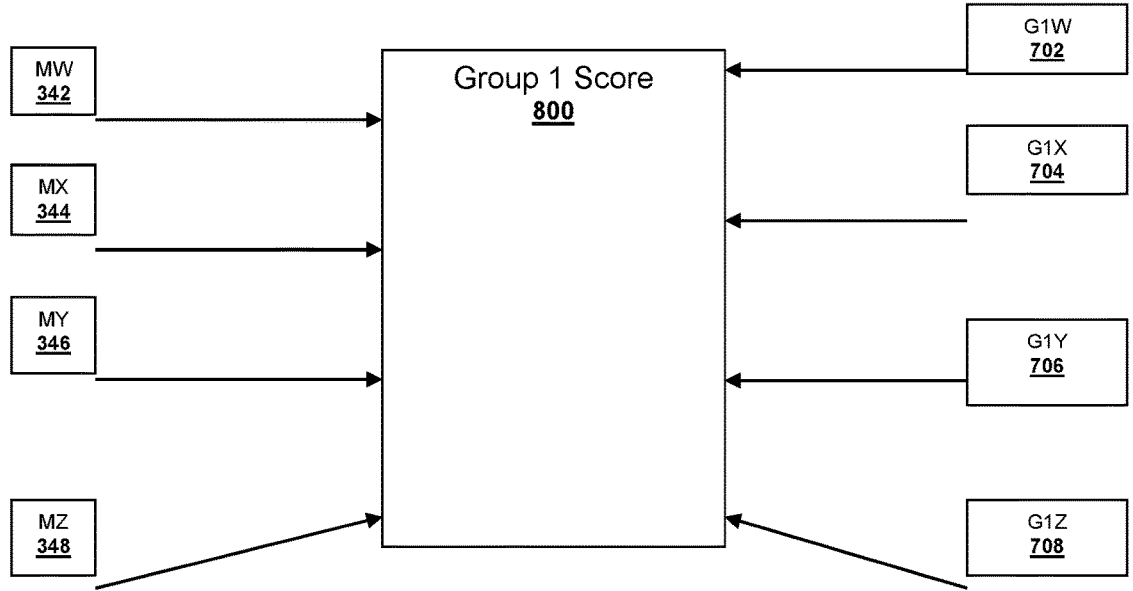
FIG. 8 is a block diagram depicting an exemplary score for a group.

At step 214 in FIG. 2, the system may also determine the relationship between the groups and the metric, based on the underlying characteristics. For example, the system may use a suitable relationship-determining module, as described above, to determine the relationships between the groups and the characteristics. For example, as shown in FIG. 7, the system determines a fourth set of relationships G1W 702 to G1Z 708 based on the relationship between group 1 600 and characteristics W 316 to Z 322. As described above, the relationship may contain a magnitude and direction. As shown in FIG. 8, the system may determine the group-metric relationship 800 (one of the fifth set of relationships) between group 1 600 and metric 324 based on the third set of relationship values MW 342 to MZ 348 and the fourth set of relationships G1W 702 to G1Z 708. As described above, the system may output group-metric relationship 800, which may be represented as a numerical value, a descriptor, an image, or any other means of conveying the magnitude and/or direction of the relationship.

Figure 9:
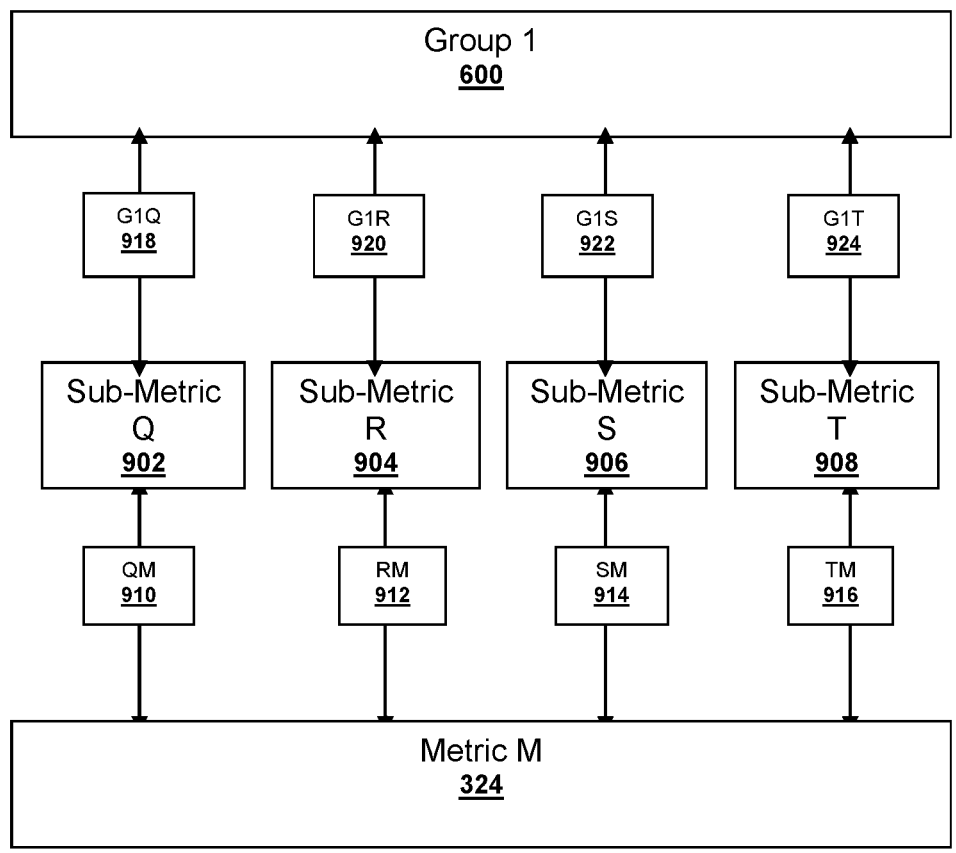
FIG. 9 is a block diagram depicting relationships used to determine sub-metric scores.

In yet another embodiment, the system may also determine the relationship between the sub-metrics and the metric. For example, at step 216, the system may also use a suitable relationship-determining module, as described above, to determine the relationships between the groups of characteristics and the sub-metrics. For example, as shown in FIG. 9, the system may determine a tenth set of relationships, the metric-sub-metric values QM 910 to TM 916 based on the relationship between metric M 324 and sub-metrics Q 902 through T 908. The system may also determine a ninth set of relationships, the group-sub-metric values G1Q 918 through G1T 924, based on the relationships between group 1 600 and sub-metrics Q 902 through T 908. As described above, the relationship may contain a magnitude and direction. The system may also determine the overall relationship score for the sub-metrics, based on the group-sub-metric values and metric-sub-metric values. For example, the system may determine an overall relationship for sub-metric Q 902 to metric M 324 based on G1Q 918 and QM 910. The system may output this information, as described above. In this manner, the system may determine which of the sub-metrics have the strongest relationship to the overall metric M 324.

Figure 10:
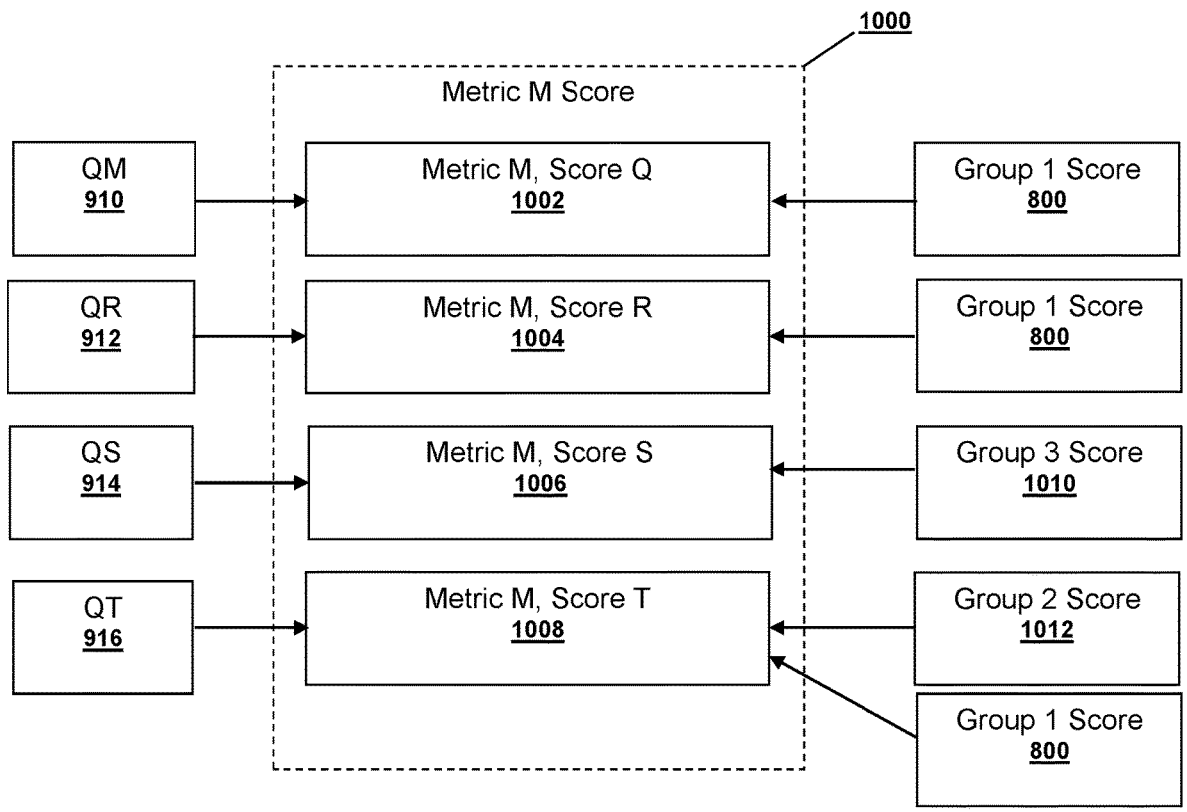
FIG. 10 is a block diagram, depicting relationships used to determine scores for a metric.

At step 218, the system may also determine an overall score for a metric, representing how successful the company is in meeting its metric, based on the collected data. For example, FIG. 10 shows an example of overall metric score 1000, based on a plurality of metric sub-scores, 1002-1008. The metric sub-scores are determined based on the metric-sub-metric values 910-918, as well as the group scores 800, 1010, 1012 for one or more groups having strong relationships to the sub-metrics. The system may determine score 1000 for the metric based on one or more of the sub-scores 1002-1008. As described above, the system may output this score using a suitable descriptor or value, at step 220.

Figure 11:
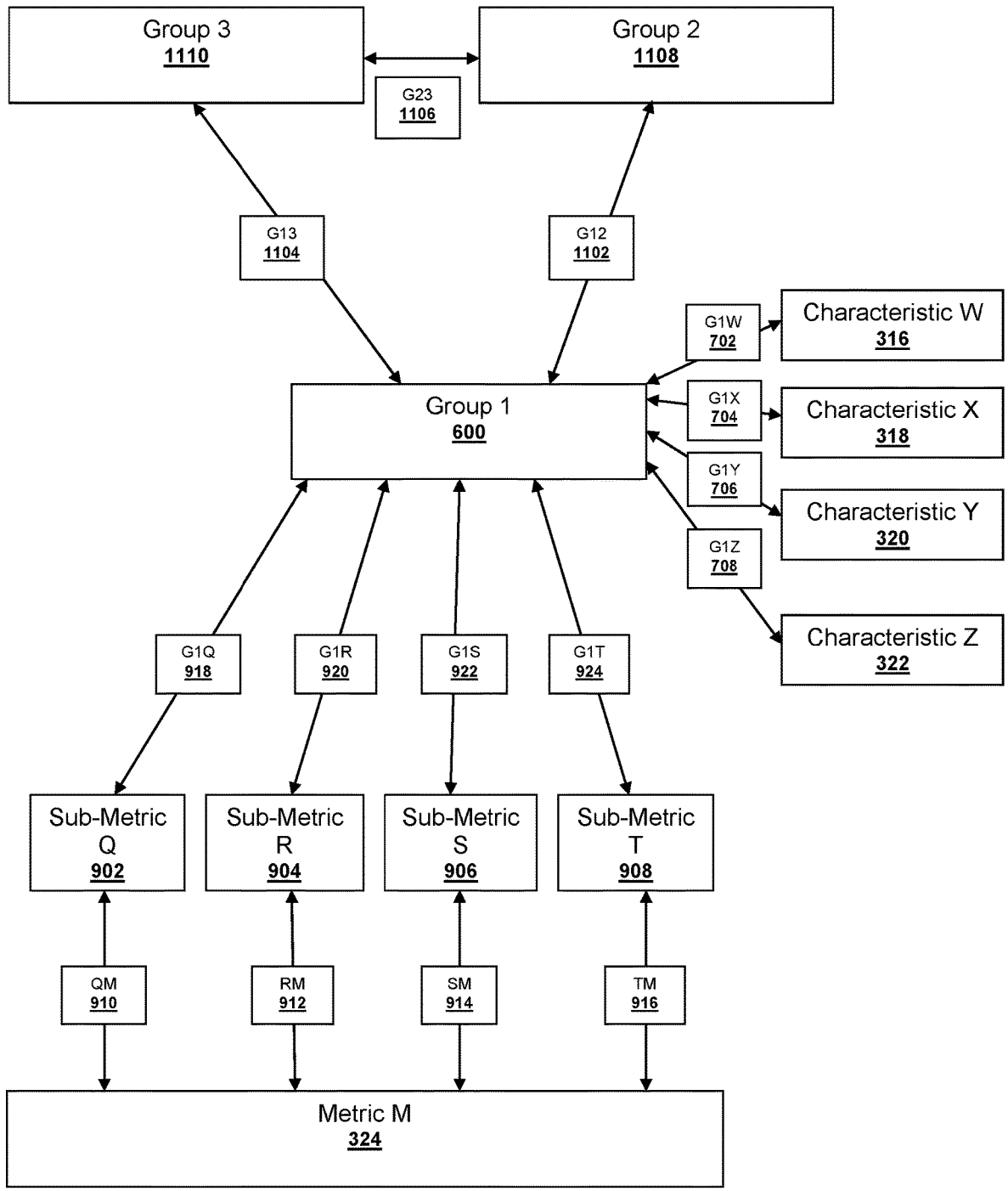
FIG. 11 is a block diagram, depicting relationships between groups, characteristics, sub-metrics, and a metric.

FIG. 11 shows another example of the relationships between groups, characteristics, sub-metrics, and the metric. In one embodiment, the system may use a suitable relationship-determining module, as described above, to determine an eighth set of relationships between groups, represented as G12 1102, G13 1104, and G23 1106. The system may identify groups of characteristics that have strong relationships to each other using grouping module 124. In this manner, the system may also create larger groups, in the event that less granularity is desired.

It should be apparent from the above description that a similar process may be performed starting with any metric, sub-metric, or characteristic. For example, the system may perform a similar process to calculate an individual score for a sub-metric with regard to a metric. It should also be apparent that the steps may be performed in any order, and that some steps may be omitted. It will also be apparent to a person having skill in the art that although the example discussed concerns business metrics and customers, the system may be broadly used for other applications as well. For example, an organization may have specific criteria for suitable participants in a clinical trial. In this embodiment, the metric would represent the criteria necessary to be a suitable participant, and the system would allow the organization to identify individuals who had a strong relation to the criteria. Likewise, a metric may be an organization's performance goals for its employees, allowing the system to identify the individual employees with the strongest relationship to those performance goals.

In another aspect of the system, a map of relevant data may be built from internal data, in order to identify relevant characteristics and data sources. For example, an organization may already possess information about its customers or relevant individuals. The system may analyze this data, using the steps described above. The system may use pattern recognition module 126 to identify relevant characteristics. Once the internal data has been processed, the system may use these characteristics when analyzing data from external data sources. This may save time and increase performance, since the system will use fewer irrelevant characteristics when analyzing the new data. Additionally, in this manner, the system may use information describing individuals it is interested in, without revealing any of the individuals' descriptors. This is because only characteristics, groups, or other mapped data is used when accessing external data sources.

Figure 12:
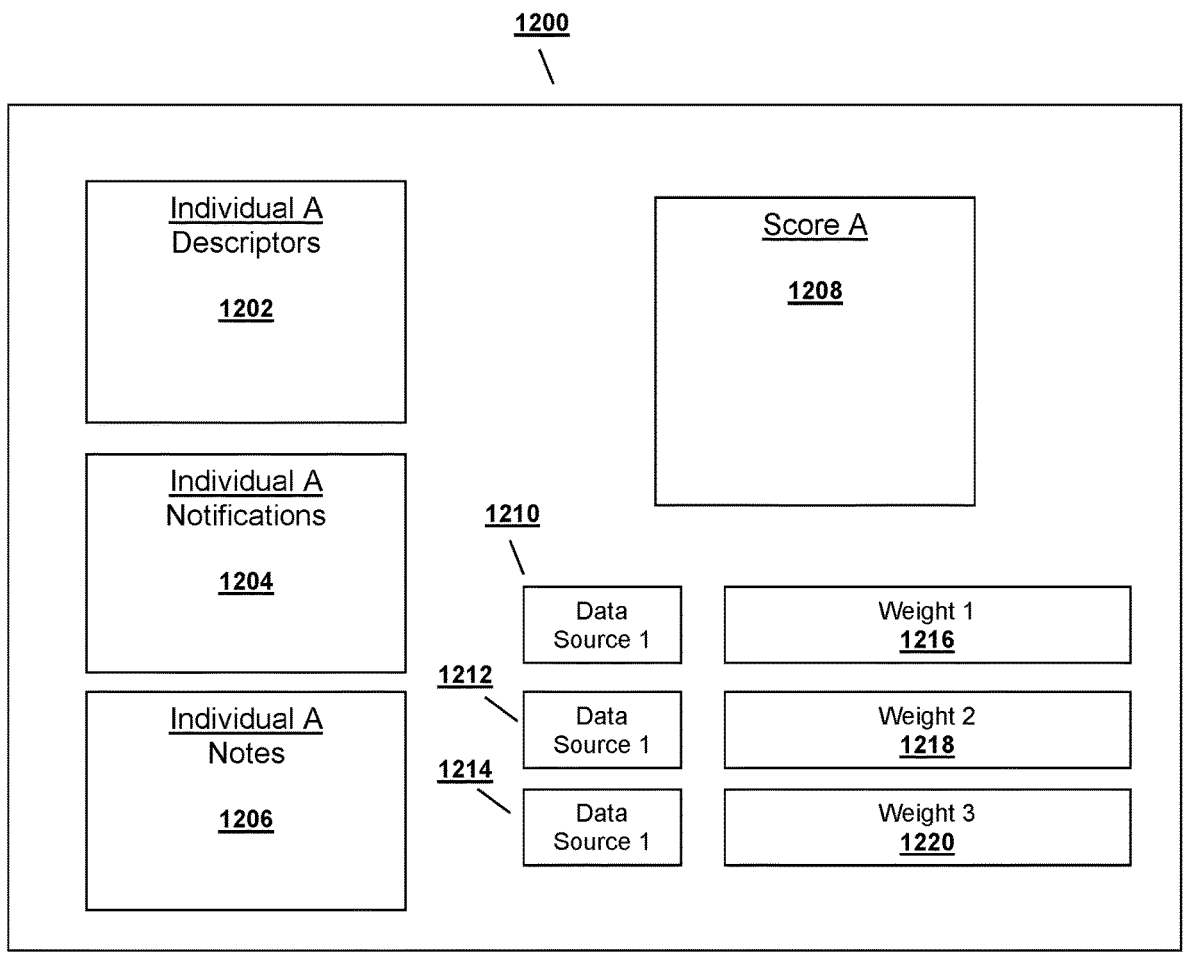
FIG. 12 is a block diagram depicting a sample user screen displaying an individual and their score.

FIG. 12 shows an exemplary embodiment of a visualization screen for an individual. Screen 1200 may comprise an individual descriptor window 1202, a notification window 1204, a note window 1206, a score window 1208, and one or more data source identifiers 1210-1214 and weight selection windows 1216-1220. Individual descriptor window 1202 may contain information describing an individual, based on the individual descriptor for that individual. Notification window 1204 may display any notifications related to the individual. Note window 1206 may display notes related to an individual. Note window 1206 may also allow remote users to enter notes, which will be stored and associated with the individual's descriptor. Thus, the notes related to an individual may be entered by a user, and associated with that user, or available to all users. Score window 1208 may contain the overall score for the user, relative to a metric, as computed above. Source identifiers 1210-1214 may contain icons, text, or other indicators of data sources that have strong relationships to the individual, as determined above. Weight selection windows 1216-1220 allow remote users to view the current weights assigned to the data sources. Weight selection windows 1216-1220 may also allow remote users to enter new weights for the data sources, causing visualization module 108 to re-calculate relationships and scores as described above. Thus, screen 1200 allows users at remote terminals to view information related to individuals, such as the individual's descriptor, notes, notifications, and score. One or more of these components may be missing, or present in a different quantity, or different positions than shown.

Figure 13:
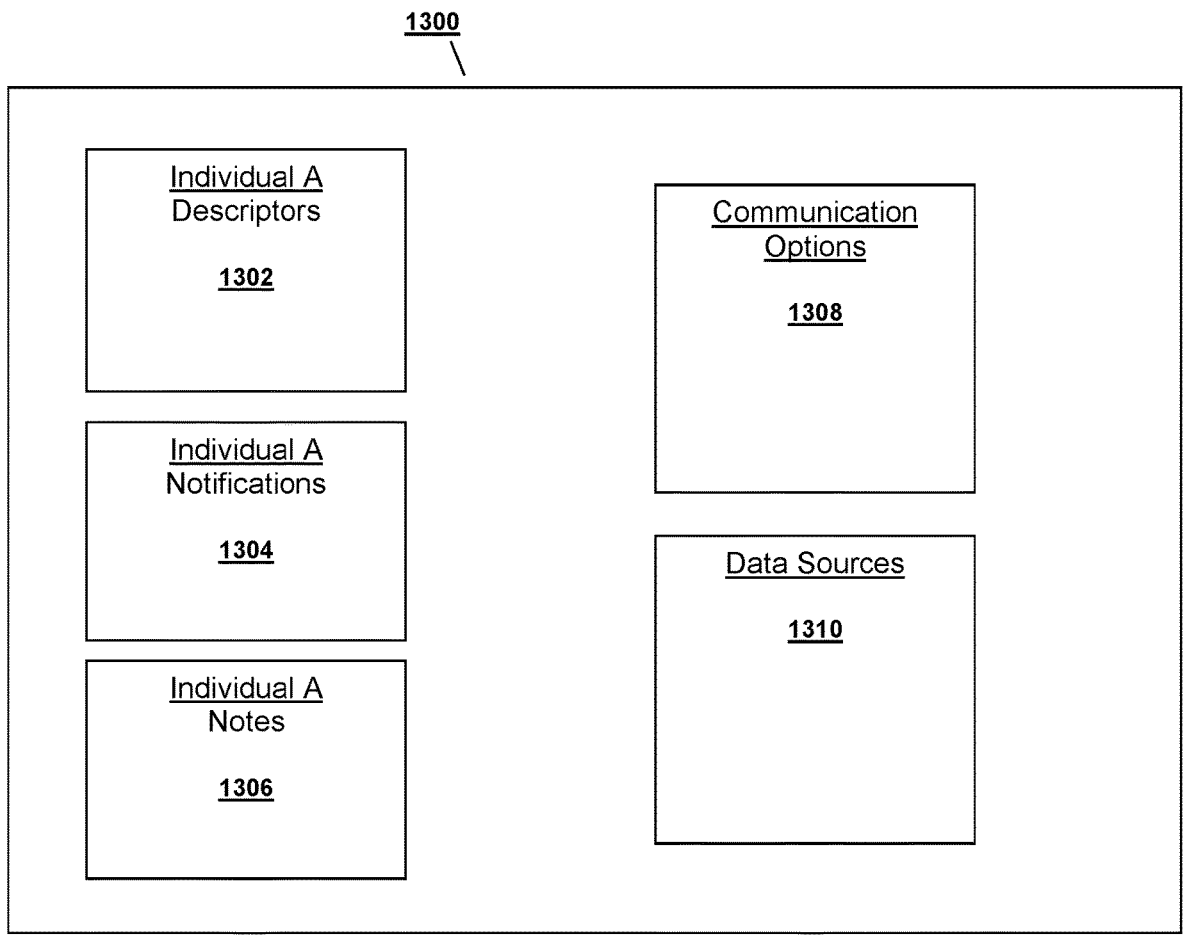
FIG. 13 is a block diagram depicting a sample detail screen for an individual.

FIG. 13 shows an alternative embodiment of a screen related to an individual. Screen 1300 may comprise an individual descriptor window 1302, notifications window 1304, note window 1306, communication options window 1308, and data sources window 1310. Communication options window may contain one more representations of the preferred communications methods for the individual. Preferred communications methods may be determined by frequency of use, stated preferences, or weights assigned by a user. The preferred communications window may also allow a remote user to select a particular one of the preferred communication methods, in order to send a message to the individual. Upon selection, the system may present the user with a communication screen, allowing the user to enter a message, or otherwise communicate with the individual. One or more of these components may be missing, duplicated, or in different positions than shown.

Figure 14:
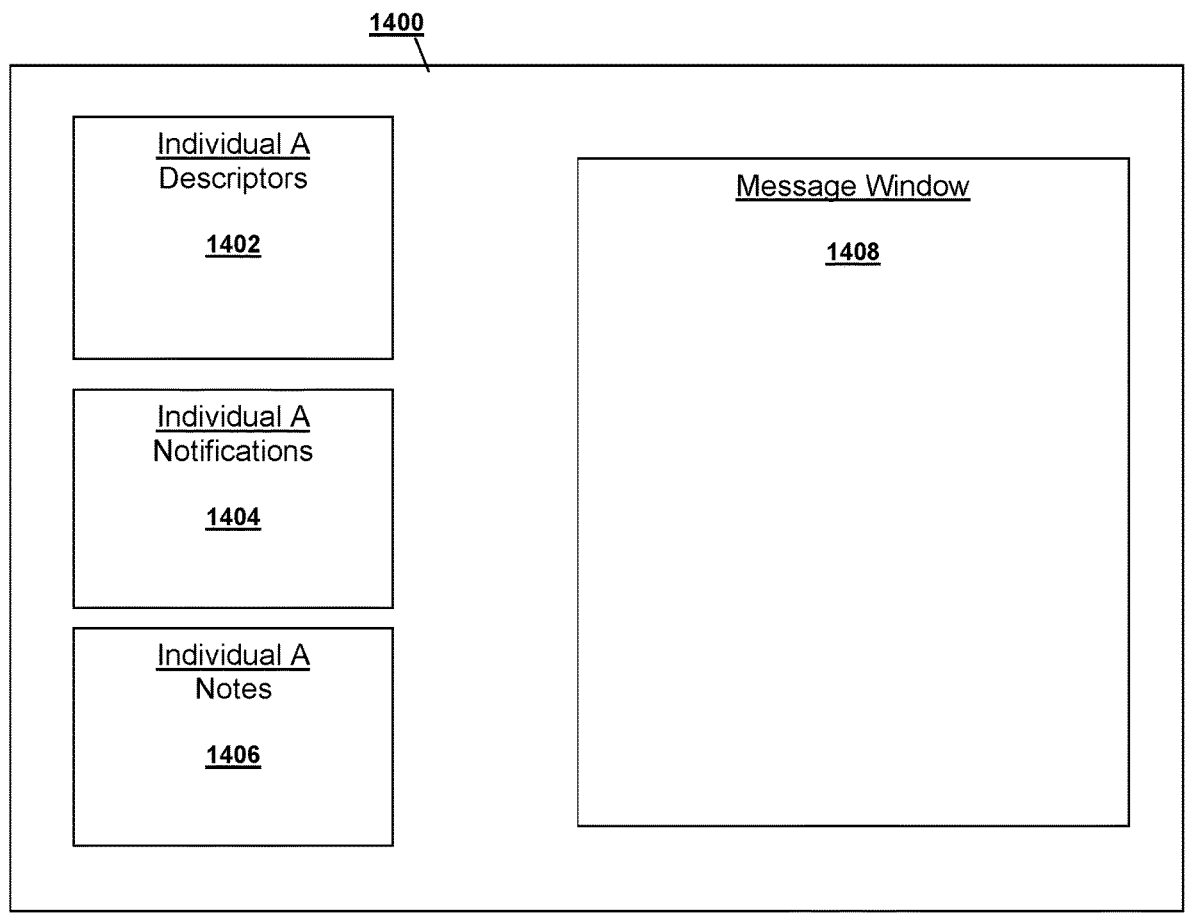
FIG. 14 is a block diagram depicting a sample communication screen for an individual.

FIG. 14 shows exemplary communication screen 1400, allowing a remote user to send a message to the individual. Screen 1400 may comprise an individual descriptor window 1402, notifications window 1404, note window 1406, and message window 1408. Screen 1400 may permit the remote user to enter a message into the message window, or otherwise communicate with the individual. The system may send the message to the individual, using the selected communication medium, such as email, text message, voice message, video, or other communication methods. Alternatively, the system may use existing communication methods such as voice chat, video chat, instant messaging, or phone to permit the user to communicate interactively with the individual. One or more of these components may be missing, duplicated, or in different positions than shown.

Figure 15:
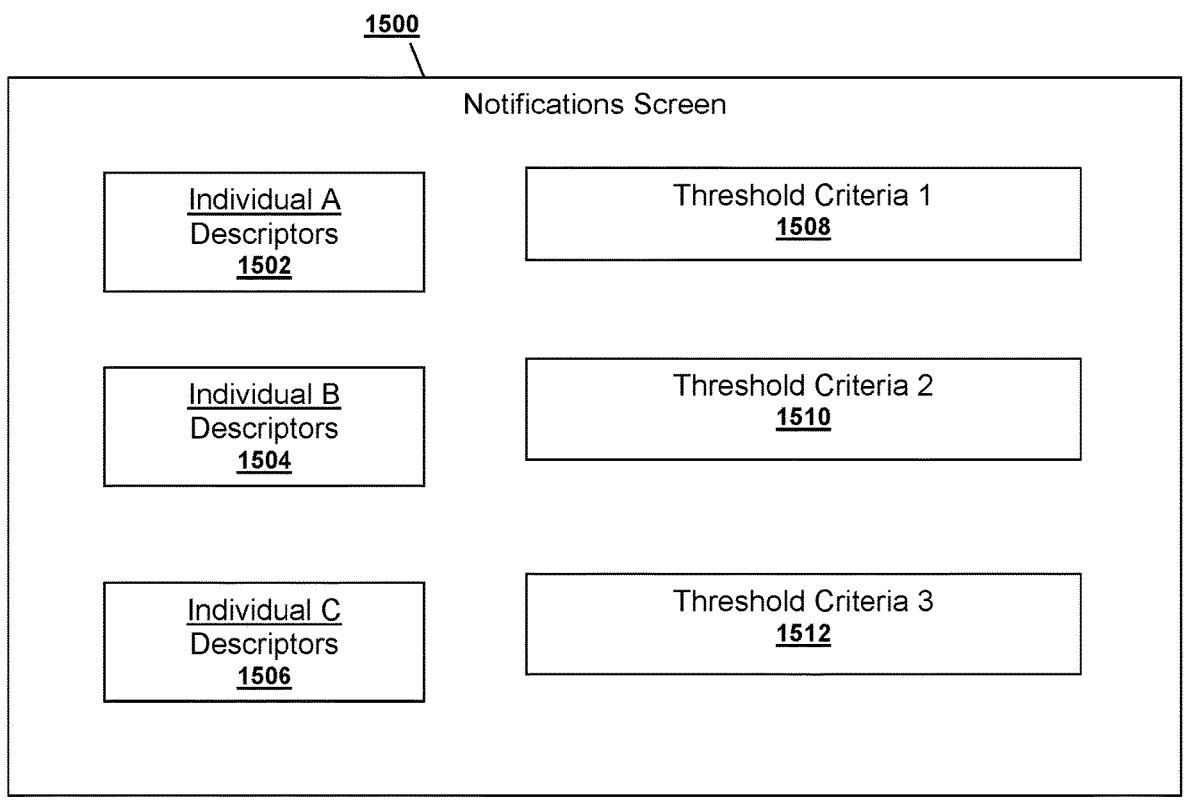
FIG. 15 is a block diagram depicting an example of a general notification screen.

FIG. 15 shows exemplary notification screen 1500, allowing a remote user to view notifications related to multiple individuals. The screen may comprise multiple individual descriptor windows 1502-1506, and one or more threshold criteria windows 1508-1512. Threshold criteria windows 1508-1512 may describe the criteria or event that caused the notifications to be sent. Alternatively or additionally, the threshold criteria windows 1508-1512 may also display one or more data items related to the notification. One or more of these components may be missing, duplicated, or in different positions than shown.

Figure 16:
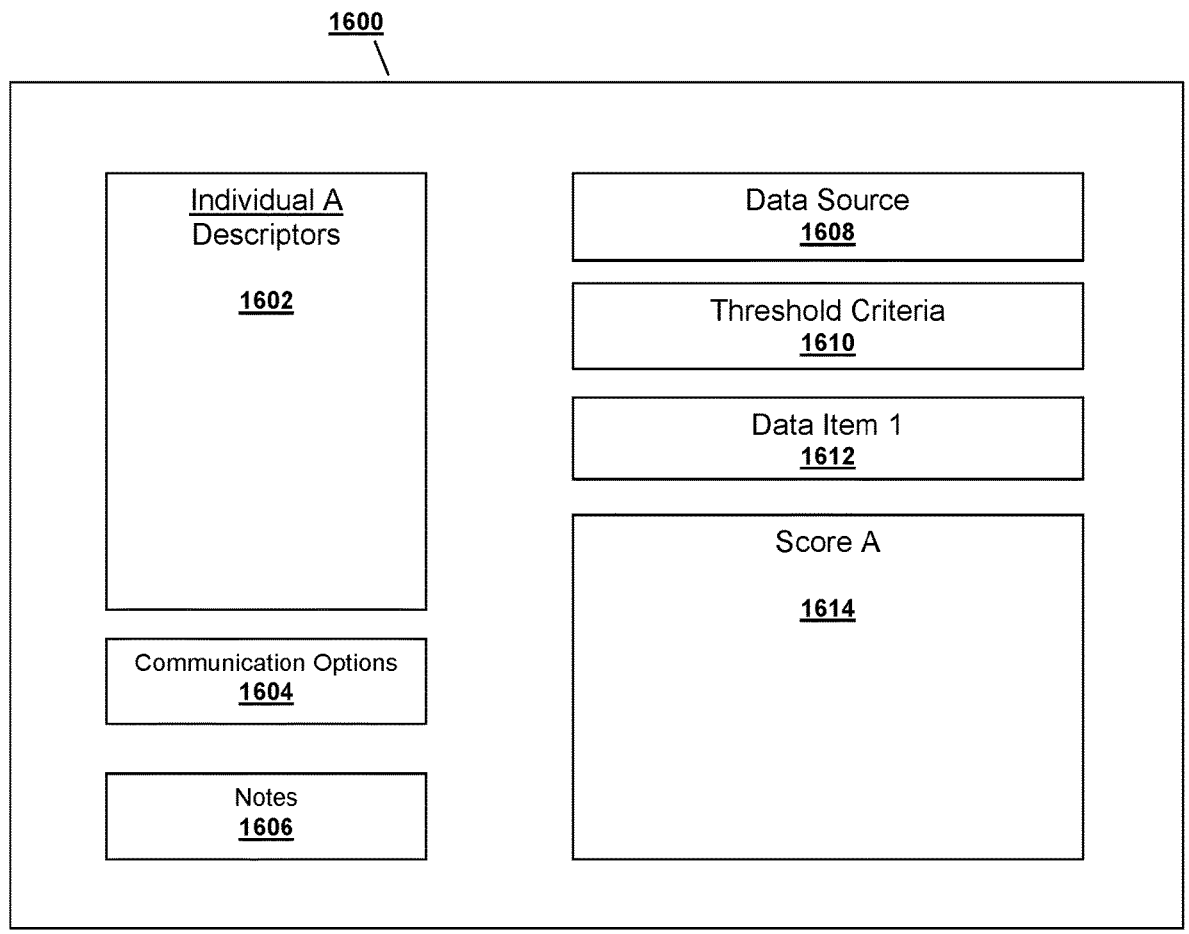
FIG. 16 is a block diagram depicting an example of a specific notification screen for an individual.

FIG. 16 shows exemplary notification screen 1600 for a single individual. The screen may comprise individual descriptor window 1602, communication options window 1604, note window 1606, data source window 1608, threshold criteria window 1610, data item window 1612, and score window 1614. One or more of these components may be missing, duplicated, or in different positions than shown. One or more of these components may be missing, duplicated, or in different positions than shown.

Figure 17:
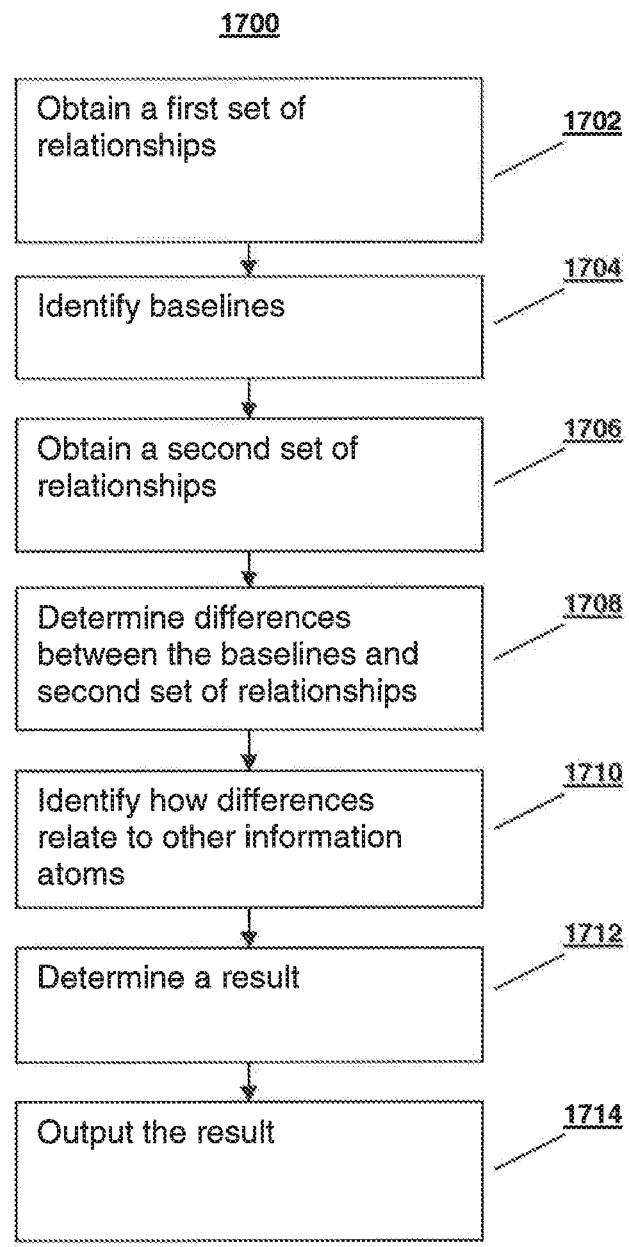
FIG. 17 is a flowchart depicting one process for determining baselines for relationships.
Figure 18:
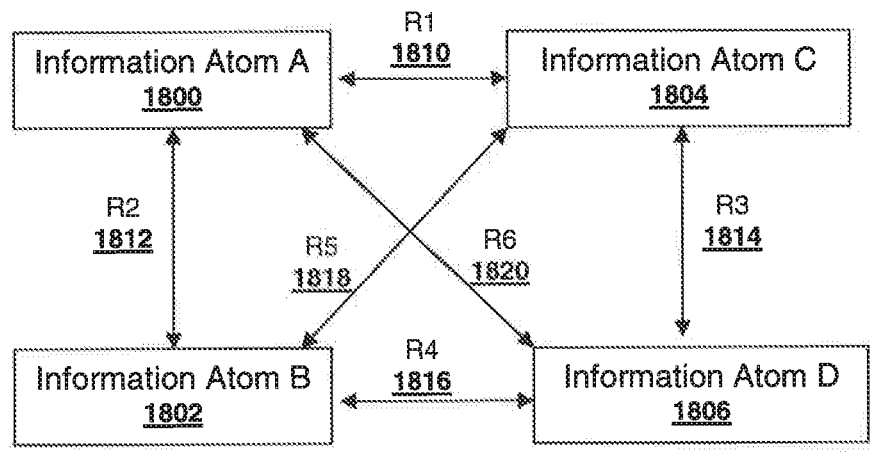
FIG. 18 is a block diagram depicting an example of a first set of relationships between information atoms.

FIG. 17 is a flowchart demonstrating an exemplary process 1700 for determining relationship baselines consistent with the present invention. For example, characteristic-based system 100 may use process 1700 to determine the baseline for relationships between a number of information atoms. As shown in FIG. 17, process 1700 may begin at step 1702 by receiving a first set of relationships between information atoms. This is represented in FIG. 18, showing relationships 1810-1820 between information atoms 1800-1806.

Figure 20:
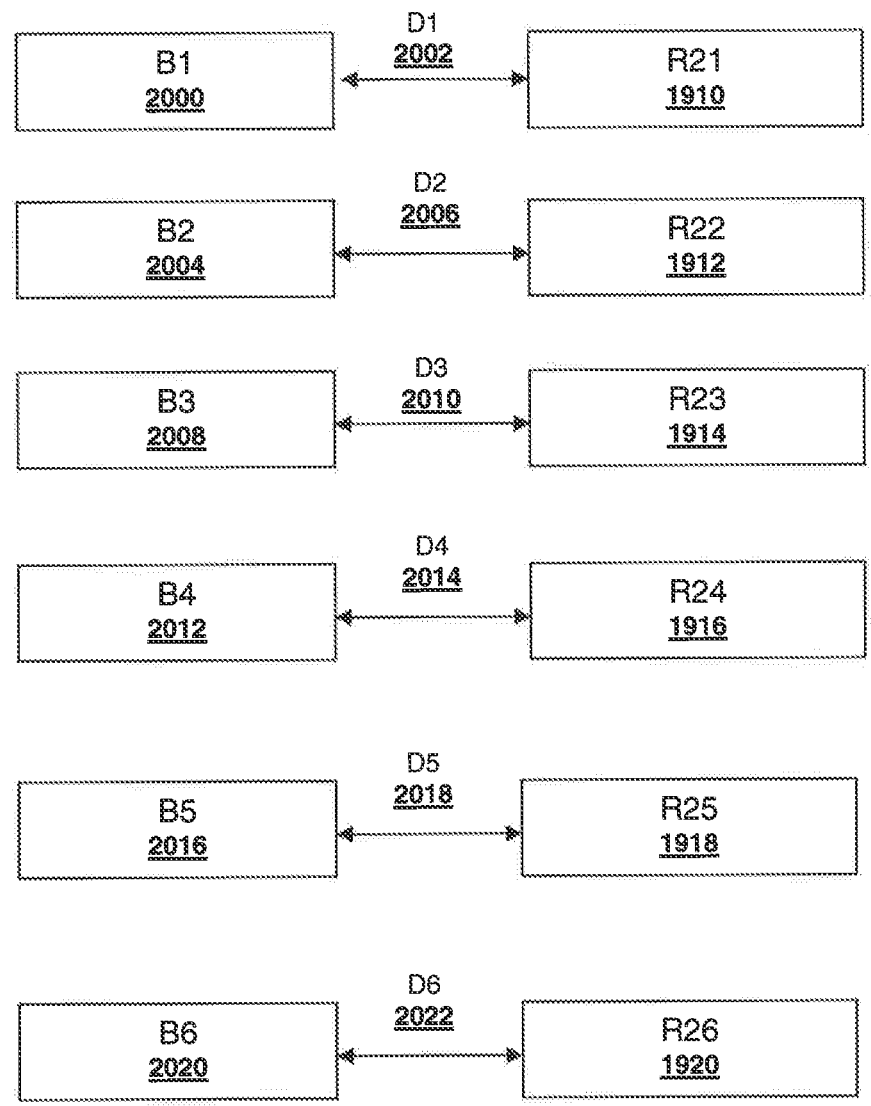
FIG. 20 is a block diagram depicting an example of differences between baselines and relationships.

At step 1704 in FIG. 17, the system may identify baselines for these relationships. These are depicted in FIG. 20 as baselines B1 2000, B2 2004, B3 2008, B4 2012, B5 2016, and B6 2020.

Figure 19:
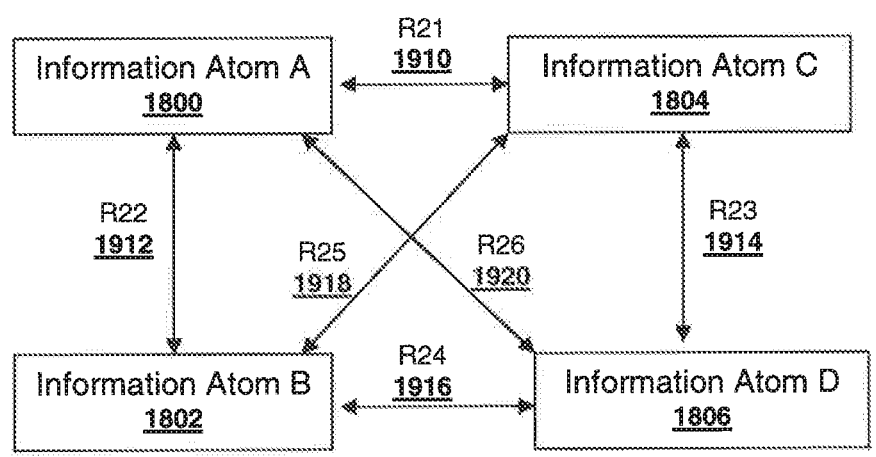
FIG. 19 is a block diagram depicting an example of a second set of relationships between information atoms.

At step 1706 in FIG. 17, the system may receive a second set of relationships between the information atoms. These are represented in FIG. 19 as relationships 1910-1920.

Returning to FIG. 17, at step 1708, the system may determine differences between the baselines and the second set of relationships. These are depicted in FIG. 20, as differences D1 2002, D2 2006, D3 2010, D4 2014, D5 2018, and D6 2022.

Figure 21:
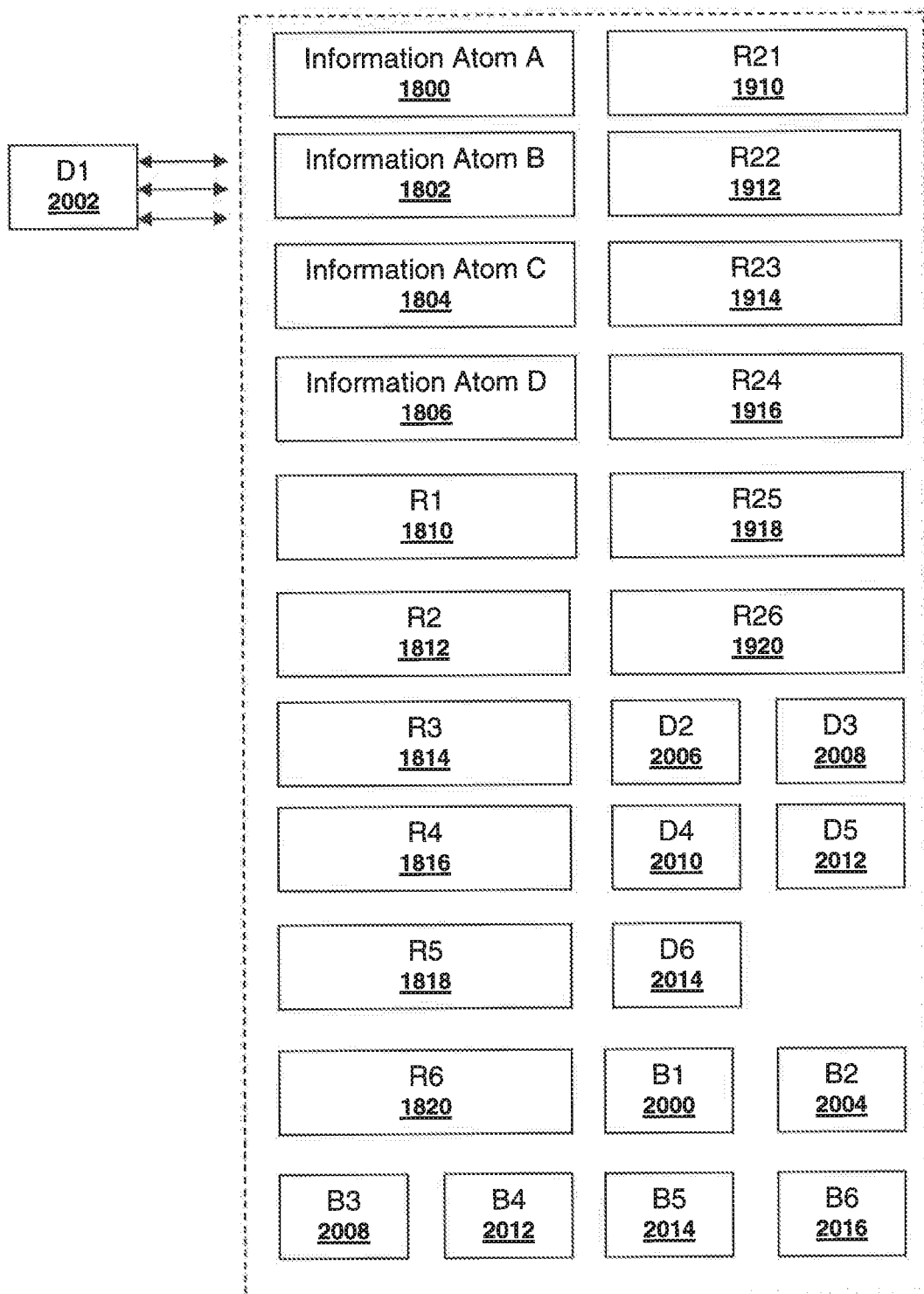
FIG. 21 is a block diagram depicting an example of identified relations between a difference and other information atoms.

At step 1710 in FIG. 17, the system may identify how differences D1 2002-D6 2022 are related to other information atoms. As described above, the term "information atom" broadly refers to any component of information represented in the system, including data items, characteristics, individuals, metrics, sub-metrics, relationships, baselines, differences, or groups thereof. FIG. 21 depicts an example identifying how difference D1 2002 is related to information atoms 1800-1806, first relationships 1810-1820, second relationships 1910-1920, baselines B1 2000-B6 2010, and differences D2 2006-D6 2014. The system may identify how D1 2002 is related, or not related, to the other information atoms. The system may also identify how the other differences D2 2006-D6 2014 are related to the other information atoms.

At step 1712 in FIG. 17, the system may determine a result based on how the differences relate to the other information atoms. At step 1714, the system may output this result. In this manner, the system might identify how differences in the relationships relate to other information atoms. As discussed above, this could allow the system to, for example, identify how a change in sentiment is related to other data such as time, location, recent events, or transactions.

As described above, systems and methods consistent with the invention provide a characteristic-based system that allows an organization to identify, organize, describe, and visualize the relationships between individual descriptors, characteristics, and metrics. As further described below, these relationships, and the information derived from them, may be used for additional purposes, other than identifying the items that are most relevant to a given organization.

In one application, the above system, apparatus, and methods may be used to tailor a businesses' message to one or more individuals, such as existing or potential customers, investors, employees, and others. In one embodiment, the business may wish to send a message only to individuals that have a strong relationship to a certain characteristic or group of characteristics. For example, a business that is starting a new advertising campaign may wish to send an advertisement, along with a free trial of a product to individuals that are the most likely to help spread the campaign. In this case, the business may identify a group of characteristics as the "viral" group. This group may include, for example characteristics associated with an individual's reach (e.g., the number of followers or fans that individual has online, how dense their social network is, etc.), the strength of the individual's connections (e.g., how many people read that individual's messages, how many people forward, post, or discuss those messages, etc.), the impact an individual has on others (e.g., how many people act after reading the individual's messages, how many people stop following an individual after reading their messages, how many people ask questions based on the messages, etc.), and the extent the individual engages in cross-platform posting (i.e., receiving information through one platform or medium, and posting it on a different platform). The business may measure the relationships for this group using the method, system, and apparatus described above. Information regarding these relationships may then be used to identify individuals that have a strong relationship to the desired characteristics, and are therefore likely to spread the communication to a wider audience.

The business may also identify other relationship information regarding these individuals. For example, the business may identify which individuals have a strong relationship to certain products, companies, industries, or other subject matter. In this manner, the business can identify which individuals will be the most likely to spread a message to others, and also interested in the specific subject matter related to the message. This also allows the business to identify individuals that may be critical of the message, in order to avoid sending it to them. Alternatively, a business may wish to target these individuals, in an attempt to change their mind. Likewise, using system, apparatus and methods described above, a business may be able to identify new subject matter that would be likely to spread quickly. This may allow the business to tailor the subject of its message, or identify new opportunities.

In a second application, this system, apparatus, and method may allow organizations to determine the characteristics of multiple individuals, and how they relate to the concerns of that organization. For example, using the disclosed method, system, or apparatus, a sports franchise can identify what type of people, based on their respective characteristics, are sitting in which section of the stadium. It may be that fathers and sons often sit in higher sections where there is substantial turnover in ticket ownership or reselling. Based on this information, an advertisement banner in these sections may become substantially more valuable because the franchise knows that certain companies want to advertise to children, especially those whose fathers enjoy buying them gifts and taking them to football games. Or, the franchise may move an ice cream vendor closer to that section rather than a beer vendor. Additionally, the sport's franchise may use the information gathered about each attendee to send personalized advertisements through email, SMS, MMS, or WiFi to both the child's phone and the Father's phone during a timeout. Using the disclosed system, apparatus and methods, the franchise may identify that the father's cognitive dimension of thinking is "Ambition". Therefore, the franchise may send a video to the father showing how the most successful people in his industry, as well as potential business partners, purchase club-level season tickets. In contrast, the son may receive a video clip of the team's best player making an incredible play, followed by a limited time offer to purchase that player's jersey. In this manner, information regarding the relationships determined above may be used to adjust the services and advertisements that an organization offers its patrons, in real time.

A third application relates to customer rewards or appreciation programs. For example, an organization may use the system, method, and apparatus described above to tailor its miles/rewards program to suit the needs of each respective customer, as most profitable. For example, Sally and Jake may both be platinum-level travelers with a given airline. Yet, Jake may be a father who likes to travel with his children. Thus, Jake may prefer discounted tickets, "child-friendly" security screening lines, and free in-flight entertainment and child-friendly snacks. Sally, however, may be a business traveler with a busy schedule. She may prefer curb-side check-in, free upgrades, expedited boarding, free in-flight WiFi, and room to hang her carry-on garment bag. The airline may use the disclosed system, methods, and apparatus to identify the characteristics of each traveler, and offer each the benefits that will be the most valuable to that individual.

A fourth application relates to recommendation systems. An organization (for example, a retailer, product review website, or salesman) may use the characteristic-based profiling system to recommend or promote products that other individuals with similar characteristic-based profiles purchased. Product recommender systems may recommend additional products to consumers based on how often one product is viewed, purchased, or queried in conjunction with the product that the consumer has already decided to purchase. In this respect, these systems are product focused. In contrast, recommendations based on the claimed system, apparatus, and methods described above may look at which products were purchased by similar individuals. For example, a car dealership may identify that a potential customer is a lawyer, has 3 children, is "neurotic" according to the "Big 5" personality traits, and has large and frequent variations in temperament. Recommender systems not based on the customer's characteristics would consider what car the potential customer has first asked to test-drive. Based on that request, the salesperson may recommend additional cars that are similar to the car first tested. In contrast, a recommender system using the system, method, and apparatus described above may allow the salesperson to see what cars other lawyers, with multiple children, who are neurotic with frequent swings in temperament purchased, and recommend those cars. Thus, the salesperson may suggest a super-charged SUV with a DVD player, even though the potential customer originally requested a hybrid sedan with minimal features.

A fifth application relates to the anonymous use of data about individuals. Many companies, such as financial institutions, credit rating agencies, drugstores, health clinics, or pharmaceutical companies, have substantial customer information but are not able to monetize the information to the fullest extent possible because of laws protecting the identity of the customer. These companies may profile their customers based on demographic and behavioral information in the hopes of monetizing the data they possess without disclosing any individual's identifying information. Unfortunately, these profiles do not provide as robust a profile as possible, greatly inhibiting the potential for financial gain. Using the disclosed system, apparatus, and method described above to include additional profiling data points, including those that are objective, subjective, qualitative, quantitative, structured or unstructured, may enable these companies to increase the value of the data they are trying to sell without ever disclosing an individual's identifying information. For example, a company may be able to sell information based on a customer profile that provides more information about that customer's characteristics, without revealing any sensitive or identifying information about that customer. Likewise, the disclosed system, apparatus, and method may be used to generate a valuable profile of groups of customers, which may be sold to other companies without revealing sensitive or identifying information about any of the individuals related to that group.

A related sixth application is the valuation and sale of information on individuals. It may be valuable to package individuals into portfolios based on each individual's respective set of relationships to the characteristics (a "characteristic map"). In this context, the individuals may be grouped into one or more portfolios prior to integrating a business' data into each individual's respective characteristic map. Through the system, apparatus, and methods disclosed above, a business may assign a score, represented as a letter grade, numerical score, icon, color-coding, or any other scoring method in order to represent how valuable each portfolio is, both generally, and to a specific business. The scoring may be based on a variety of factors, such as data latency, data integrity, data volume, as well as the type of people whose characteristic-based profile is contained in the portfolio. For example, frequent travelers may be more valuable to airlines, hotels, and travel agencies. In another example, portfolios with highly granular characteristic profiles may be more valuable in general than a portfolio with substantial missing links, or "gaps", in the profiles.

Based on these scores, businesses may identify which portfolios of information they wish to purchase, and what price they should pay for accessing the information. Using the disclosed system, apparatus, and methods in this application, the businesses may pay for exclusive access to a certain portfolio. There may be a bidding procedure for access to some or all of the portfolios, or there may be a fixed price for accessing the portfolios for a given period of time.

Individual consumers may also use the disclosed system, apparatus, and methods. In this capacity, the customers may upload their personal information, including information acquired through voluntarily providing access to their social media accounts, contact lists, phone logs, SMS messages, emails, photos stored on an electronic device owned by the individual, and more. The disclosed system, apparatus, and methods may then be able to analyze the data and create a real-time characteristic profile of each individual. This profile may be uploaded wirelessly, through WiFi, cellular connections, RFID, Bluetooth, electromagnetic frequencies, or other wireless connections to a central data repository, such as a data warehouse, data mart, or even a personal cloud-storage facility owned exclusively by the individual. The data may then be transferred to the disclosed system, apparatus, or method, which would generate the profiles. Additionally, or alternatively, the individual may decide to store his or her personal data on a local or personal storage device in the cloud and may review the data before uploading to the analytics engine. The individual may even sift through the data, removing datum that the individual wishes to keep private. Doing so, however, would lower the score of the individuals profile and, therefore, decrease its value to a potential business.

A seventh application relates to determining the value of an organization's connections and affiliations on social media platforms. The above system, apparatus, and methods may be used to understand and measure characteristics such as an affiliated individual's reach, the strength of the connection between the individual and the organization, the strength of the connection between the individual and his or her personal social network and sub-networks, the trustworthiness of the connection with the individual, and the density of the organization's social network and that of its "fans", "followers", and "likes." Based on the measured relationships, an organization may measure its connections to understand which connections reach the most people, have the greatest impact on people (and which people), have the greatest ability to motivate action in others, and are interested in topics affiliated or connected (either directly or indirectly) with the organization. All of this may then be correlated back to the organization's own metrics, so that it may know who is a valuable social media connection, when, and for what reason.

In an eighth application, the system, method, and apparatus disclosed herein can be applied in the recruiting and human resources fields. The ability to analyze objective, subjective, quantitative, qualitative, structured, and unstructured data, may enable a company to identify a job applicant's or an existing employee's characteristics, such as personality type, cognitive methods of thinking, temperament and moodiness, as well as others. These data points can be observed unobtrusively through linguistic analytics, body language analytics, content analytics, and contextual analytics, among other methods known in the art, in order to determine (1) which characteristics and (2) which group of characteristics are positively or negatively correlated with factors the organization is interested in. For example, high or low performing employees, or employees who are correlated (either positively or negatively) with attrition. Moreover, a business may perform this analysis with respect to subordinate, mid-level, senior, or executive-level managers. As a result, when recruiting prospective employees, a company using the above system, method, and apparatus may gain a better understanding of how a given job applicant will fit into the business. For example, the ways in which the applicant is likely to contribute to the business, which other employees the applicant is likely to collaborate best with, whether the applicant is likely to progress through the company ranks and the manner that progression may occur, and which assignments, groups, departments, and responsibilities may cause the applicant the most difficulty.

For example, an engineering job applicant may have all the desired qualifications on paper, but, in truth, the applicant may be highly extraverted and open to new experiences, two personality characteristics of the "Big 5." As a result, this may indicate that, if hired for the engineering position the company is looking to fill, the applicant is likely to get bored and leave the company shortly after joining.

In a second example, the disclosed system, apparatus and methods can help identify existing employees who have a high correlation with other individuals that have already succeeded at higher levels of management. This enables a company to begin "grooming" those employees sooner, or ensure that they do not leave the company before being given an opportunity to receive a more senior management role.

In a third example, the disclosed system, method, and apparatus can be used to identify individuals who, based on their respective characteristics, work well together as a team, which problems they are most likely to encounter, and which problems they are encountering—in real time.

In a fourth example, the disclosed system, apparatus, and methods also helps human resource departments and managers avoid the "fundamental attribution error." Specifically, by identifying an individual's characteristics, that individual can be placed in a situation where she is most likely to succeed. Bold, inspiring, and visionary executives may be best suited for leading a company through a crisis, while a detailed-oriented, focused task manager may be better equipped to steward a business through stable periods.

In a fifth example, the disclosed system, apparatus, and methods can track how an employee's characteristics change over time, thereby enabling a business to identify, non-linear progression and development. Companies use performance benchmarks based on seniority, time with the company, experiences, and other factors to determine what skills an employee should have developed to "be on track." The disclosed system, apparatus, and methods, however, enables the business to understand that some employees may not progress in such a linear fashion, and may acquire what are typically considered more advanced skill sets before acquiring other more rudimentary skill sets.

A sixth example would be use by government agencies, defense contractors, or others tasked with protecting national security. Characteristic based screening may be used to identify which individuals have a greater propensity to be a terrorist, sex-offender, or spy. The disclosed system, apparatus, and methods may be used to develop a profile of an individual, or group of individuals in order to determine which individuals or groups have a stronger relationship to anti-social behavior, and should not be trusted.

In all of these examples it is important to remember that the disclosed system, apparatus, and methods may be used to identify characteristics such as personality type, cognitive dimensions of thinking, temperament, mood, and interests without requiring a written examination, psychological evaluation, or other time consuming and expensive process. All this information may be updated in real-time so that a company is able to monitor how these characteristics change amongst their employees over time. For example, management may discover that many of their employees within a specific division are becoming highly irritable and erratic in their temperament. This may signal that an environmental factor may be having a negative impact on the employees, or maybe even that a new supervisor is proving ineffective.

A ninth application relates to determining the effectiveness of an advertisement or message in the social media context. Using the system, apparatus, and methods disclosed above, an organization may (1) create a profile for an individual based on the characteristics that individual has the strongest relationships with and (2) embed within a message the necessary tools to identify each individual user's characteristic-based profile. These tools may include instructions to identify an individual either directly (based on information identifying a specific individual such as a username), or indirectly (based on information that does not identify any specific individual, but is related to a known individual, already stored in the system). These tools may also include instructions to create a new individual, and a new characteristic-based profile for that individual, if the user's information does not correspond to any individuals already stored in the system. The tools may further include instructions to alter the appearance or content of the advertisement or message, based on that particular user's profile. This ability to dynamically recognize the probability that a user will be more responsive to one type of content versus another, may be achieved through embedding certain characteristic-based profiling techniques within the advertisement, through creating a database of each user's characteristic-based profile that the advertisement is programmed to inspect before appearing in the user's inbox or on their social media webpage. Simultaneously, the software company, its advertisement agency, or the social media platform may receive reports regarding the behavior and response of each user as it pertains to a given advertisement or message. In this manner, a company may quickly identify if users with a specific type of characteristic profile are generally responsive or engaged by the advertisement, or are unaffected by it. Based on this information, the company may alter the message that each user with a strong positive correlation to that characteristic profile would receive. Additionally, or alternatively, the company may wish to ensure that users with that characteristic profile are unable to open or view a given advertisement. In this manner, the disclosed system, apparatus, and methods may be used to increase the relevancy of a message to each individual.

For example, User 1 (we do not even need to know a user's name to create the characteristic-based profile), could have the following characteristics: 51 years old, Female, A member of the "Bayside High School Group" on a social media platform, Has an above average positive correlation with the cognitive mode of "Family", Has a strong positive correlation with neuroticism, a Big 5 personality trait, and Has a social network that overlaps substantially with that of User 2, a 17 year old female who is also a member of the "Bayside High School Group".

From this, the above system, apparatus, and methods may be used to create a characteristic-based profile for User 1. For example, an organization may wish to send an advertisement regarding new software to streamline drafting college applications. When the advertisement is received by User 1, the embedded tools may recognize the characteristic-based profile of User 1 and highlight the importance of applying to colleges early in the application process. User 1 may then forward that content to User 2, a fact that the software vendor may or may not know. Nevertheless, because the above system, apparatus, and methods can embed within the advertisement the ability to identify a user's characteristic-based profile, the advertisement would be able to recognize that User 2 is strongly correlated with the cognitive dimension of "Social Relationships", is 17 years old, a female, possesses a volatile and erratic temperament (and particularly so immediately before or after communicating with User 1), and has a strong negative correlation with the Big 5 personality trait of "Agreeableness." Thus, upon opening the message sent from User 1, the advertisement contained therein may actually highlight how the software will enable User 2 to complete the application process faster, providing more time to spend with friends and less time having to argue with her parents about completing the applications.

The same example may be applied with respect to advertisements sent to smart phones, mobile phones, tablet computers, PDAs, etc., even though different data points may be identified and used to create the characteristic-based profile of the user or owner of the device.

As another example, the disclosed system may provide a characteristic-based profile of one or more donors to identify an individual, type of individual, or group of individuals, that is naturally more likely to increase the amount, value, or frequency of a donation. This propensity may be based on various characteristics and data items, including the donor's personality (e.g., extroverted); current financial status (e.g., any recent or anticipated changes thereto and the extent thereof); interests; temperament; geographical location; and causes that positively influence the donor's generosity. Non-profit organizations, or other organizations seeking donations, may use the above system, apparatus, and methods to identify marketing, advertising, communication, and business strategies, such as new causes, campaigns, endorsements, sponsors, marketing promotions, and third-party partners and affiliates, that will increase the likelihood of the organization, (1) receiving more value from existing donors, (2) identifying and preventing donor attrition, and (3) acquiring new donors.

In one embodiment, the disclosed system may be used to determine the best way for an organization to seek donations from a particular group of individuals. For example, using the disclosed system, the organization may note that some individuals are motivated by public recognition. Accordingly, the organization may decide to publicly recognize existing donors when it solicits new donors motivated by public recognition. In another embodiment, the disclosed system may identify introverted donors who prefer to make anonymous donations or donors who ignore invasive solicitation yet respond generously to subtle tactics.

In a second embodiment, the disclosed system may be used to identify a specific course of conduct to take when communicating with a specific donor group, such as whether to use physical or electronic mail. This may further enable organizations to identify the best time the day, week, month, or year to solicit donations from donors. For example, the disclosed system may determine a relationship between certain characteristics (e.g., communication preference, motivational factors, etc.) and the donors. This information may allow the organization to not only identify when to solicit donations, but also how to present the solicitation (e.g., what purpose is likely to elicit the most donations or what reward most influences those donors.)

In a similar embodiment, the disclosed system may allow organizations to identify the most cost-effective method, or the potentially most effective communication method, of reaching a donor with its message at a specific moment in time. For example, given the profiled characteristics of a donor (e.g., active on a social network), the disclosed system may alert the organization of the donor's propensity to absorb or respond to information via social networks, or a specific social network, and encourage the user to adopt such methods in soliciting donations from that donor.

In a third embodiment, the disclosed system may notify the organization to solicit donations at an opportune moment in time. For example, based on characteristics that indicate a donor is likely to donate more or less at certain times (e.g., donors give more during moments of success, happiness, grief, or sympathy), the disclosed system may identify individuals or groups of individuals who have a relationship with those characteristics. In this manner, the disclosed system may identify individuals or groups of individuals who are, for example, likely to donate (or increase donations) during moments of success or grief. Thus, should an event occur that could have an emotional impact on that group of individuals (e.g., a child's graduation, defeating a life-threatening illness, or a major natural disaster in a remote part of the world), the system may notify the organization to promptly solicit donations from those individuals.

This embodiment is not limited to the example above, but encompasses use of the disclosed system to monitor and notify the organization when a group or individual exhibits any change in propensity to donate (either positive or negative), crosses a threshold (e.g., earns within a certain income bracket), behaves in contravention to individuals with similar characteristic-based profiles, or even takes a desired course of action (e.g., makes a donation).

In a fourth embodiment, the disclosed system may enable organizations to increase donations by identifying and supporting causes important to its existing donors. For example, the disclosed system may reveal to the organization that its existing donors are sympathetic towards struggling military families. As a result, the nonprofit may increase donation amounts—or reduce donor attrition—by highlighting its efforts to support charitable services for military families.

In a fifth embodiment, the disclosed system may be used to identify geographically concentrated regions of high-value donors, or donors with a high propensity to make donations. For example, based on information related to individual donations, the system may identify and then group geographic locations related to those donations Additionally, other areas that have a high population of individuals that are similar to a specific group of existing donors could be identified. For example, the system could identify a new city that the organization does not have any donors in, but that has a high population of individuals with similar characteristic-based profiles as an existing group of large donors. Similarly, the disclosed system could identify regions where a high population of individuals have a high propensity to donate with respect to other characteristics or metrics, such as a specific marketing campaign. This may help the nonprofit determine precisely where it should geographically focus a majority of its efforts or resources.

The disclosed system, methods, and apparatus may also be applied in a similar manner with respect to digital media, regardless of geographic region. That is, the disclosed system may be used to determine the relationships between groups of existing donors and specific types of digital media, such as social media platforms, gaming platforms, interactive platforms, informative platforms, etc. In this manner, the organization may determine which digital media platform or channel can be best leveraged with respect to its existing donors. Similarly, the organization may also identify groups of similar non-donors that it wishes to target on these platforms.

Although the above examples are written with regard to donors, it should be obvious that the system may also be used to profile any individual or group of individuals (such as volunteers, supporters, advocates, stakeholders, affiliates, fans, etc. of any organization, or other individuals), product, brand, marketing campaign, promotion, advertisement, or geographic location or region. For example, in one embodiment, the disclosed system may be used by a celebrity actress to create a characteristic-based profile of her constituents in order to understand which companies, products, brands, movies, etc. she should partner with, sponsor, or otherwise work with because her constituents are, or could be, valuable to that company, product, brand, movie, etc. In another embodiment, the disclosed system may create a characteristic-based profile of the residents, business owners, employees, and other constituents who live or work in a specific geographic location or region for a real estate developer constructing a mixed-use real-estate development project. The real estate developer can use the known characteristic-based profiles to attract valuable commercial tenants, adjust or create pricing strategies, or alter the design of the building to remove or add features to better suit to the constituents with the specific characteristic-based profile that live or work, or are migrating into or towards, the location or region of the development project.

In addition, the constituents of one organization may be profiled for the benefit of a second organization. For example, a for-profit organization may determine, based on the characteristic-based profiles of the constituents of a nonprofit, whether it should partner with, support, or establish a relationship with that nonprofit. A similar use of the disclosed system can be used by companies looking for a celebrity sponsor. In this embodiment, the company may use the disclosed system to create a characteristic-based profile of the constituents of various celebrities to identify the one whose constituents are the most valuable to the company.

In this sixth embodiment, a large corporation may profile constituents of any number of nonprofit organizations. Using these profiles, the corporation may identify characteristics that are of interest to the corporation. For example, the corporation may identify overlapping characteristics between the constituents and the corporation's current customer base; constituents having certain characteristics that effectively promote or engage the corporation's brand; or constituents who may serve as ideal focus-group candidates or future customers.

The corporation may also identify other beneficial information regarding these constituents. For example, the corporation may identify constituents with a specific characteristic in a certain geographic region. Further, based on the characteristics of owners of a certain product and data items related to that product (e.g., price, sales locations, etc.) the corporation may determine which constituents may have a high propensity to purchase that product, over a specific sales channel, or are willing to pay a higher price for that product.

In a seventh embodiment, an organization may use the disclosed system to attract certain sponsors based on the characteristic profile of its constituents. For example, the disclosed system may reveal characteristics of its constituents that appeal to corporate sponsors. In this embodiment, the disclosed system may act as a proxy for a matchmaker between the nonprofit organizations and for-profit corporate sponsor. It may also act as a proxy for a nonprofit organization to recruit the types of constituents who may be most beneficial to a targeted corporate donor.

For purposes of explanation only, certain aspects and embodiments are described herein with reference to the components illustrated in FIGS. 1-21. The functionality of the illustrated components may overlap, however, and may be present in a fewer or greater number of elements and components. Further, all or part of the functionality of the illustrated elements may co-exist or be distributed among several geographically dispersed locations. For example, each "module" may be embodied as a software component, a hardware component, or a combination of a software component and a hardware component. Moreover, embodiments, features, aspects and principles of the present invention may be implemented in various environments and are not limited to the illustrated environments.

Further, the sequences of events described in FIGS. 1-21 are exemplary and not intended to be limiting. Thus, other process stages may be used, and even with the processes depicted in FIGS. 1-21, the particular order of events may vary without departing from the scope of the present invention. Moreover, certain process stages may not be present and additional stages may be implemented in FIGS. 1-21. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Section II

This section relates generally to systems and methods for analyzing and displaying large amounts of data. For example, and without limitation, systems and methods displaying data related to consumers.

Description of the Related Art

Customer profiling systems are known in the art. Traditional systems include consumer rewards cards, credit card purchase information, demographic profiling, behavioral profiling, and customer surveying. Some businesses supplement these traditional systems with website and social media analytic tools that profile the business's fans and followers according to factors such as "likes," "click-through rates," and search engine queries, among others. Generally, these systems attempt to determine products, promotions, and advertisements that are most likely to appeal to a specific customer or broad customer segment. This information helps businesses forecast future market behavior, manage their product portfolio and inventory levels, adjust product pricing, design marketing strategies, and determine human resource and capital investment needs in order to increase revenue, market share, and profitability. For example, advertising targeted at customers who are most likely to purchase a product may be more effective than advertising targeting broader audiences. Likewise, products that are related to one another are likely to be purchased by the same customer and may sell better if offered at the same time, whether as a package or as separate items. Online retailers often use a similar approach, suggesting items that other customers frequently purchase in conjunction with the selected item.

Summary

Various solutions exist for viewing and manipulating statistical information, such as customer profile data. But these tools typically do not allow users to easily identify relevant patterns, trends, and other important meanings from large volumes of information. Further, existing systems cannot respond to user manipulations, or provide information in real-time. Existing systems also do not provide users the ability to interact with the system from a mobile computing device. Thus, users cannot perform the type of analysis provided by these systems when and where it may be the most important.

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The present disclosure provides improved systems and methods for analyzing and displaying large quantities of data.

In accordance with some embodiments, improved techniques are provided for analyzing, manipulating, presenting, storing, sharing, managing, and displaying large amounts of data.

In additional embodiments, a computer-implemented method is disclosed for viewing existing and potential customers of a business who have similar characteristics. The method comprises displaying one or more personas, comprising groups of relationships between individuals and characteristics. The method further comprises determining a number of the individuals who are related to a persona and are also existing customers of a business. The method still further comprises displaying the number of the individuals who are related to the persona and are also existing customers of the business.

Some embodiments of this method may comprise determining a number of the individuals who are related to a persona and who are not existing customers of a business, and displaying the number of individuals related to the persona who are not existing customers of the business.

In accordance with additional embodiments of the present disclosure, a computer-implemented method is disclosed for viewing existing and potential customers of a business who have similar characteristics. The method comprises displaying one or more personas, comprising groups of relationships between individuals and characteristics. The method further comprises displaying the individuals and the characteristics related to at least one of the personas. The method still further comprises displaying a score for at least one of the personas. The method still further comprises receiving an updated score for at least one of the personas, and changing the displayed individuals and characteristics based on at least one of the updated scores.

Additional embodiments may also comprise displaying only the individuals associated with scores greater than or equal to the updated score, and displaying only the characteristics related to the displayed individual. The updated score may encompass a range of scores.

Some embodiments of this method may further comprise displaying only the individuals associated with scores that are within the updated range of scores, and displaying only the characteristics related to the displayed individuals.

In accordance with additional embodiments of the present disclosure, a computer-implemented method is disclosed for viewing existing and potential customers of a business who have similar characteristics. The method comprises displaying one or more personas, comprising groups of relationships between individuals and characteristics. It further comprises displaying information associated with the individuals who are related to the personas. The method still further comprises displaying a score for at least one of the personas.

The information in this method may include at least one of: products or services that the individuals related to the personas are likely to purchase, communication mediums that the individuals related to the personas are likely to use, geographic regions where the individuals related to the personas are located or are likely to make purchases from, a number of the individuals related to the personas who are related to a specific characteristic, a number of the individuals related to the personas who are related to the personas who are not existing customers of a business, or images representing the individuals related to the personas. The method further comprises changing the displayed images and characteristics, based on at least one of the updated scores.

In some embodiments, the products or services the individuals related to the personas are likely to purchase may comprise at least one of: products or services previously purchased by at least one of the individuals, products or services previously purchased by other individuals who are similar to at least one of the individuals, or products or services related to the products or services previously purchased by other individuals who are similar to at least one of the individuals.

In some embodiments, changing the displayed information may comprise displaying only the information associated with the individuals who are associated with scores that are equal to or greater than the updated score. The updated score may comprise a range of scores, and changing the displayed information may comprise displaying only the information associated with the individuals who are associated with scores within the updated range of scores.

In accordance with additional embodiments of the present disclosure, a computer-implemented method is disclosed for viewing a group of related characteristics. The method comprises displaying one or more personas, comprising groups of relationships between individuals and characteristics. The method further comprises receiving a selection of at least one of the personas. The method still further comprises displaying the individuals related to the selected persona. The method even further comprises determining categories of the characteristics. The method further comprises grouping the characteristics based on the categories. The method further comprises displaying the grouped characteristics comprising the selected persona.

Additionally, this method may comprise displaying a score for the selected persona, receiving an updated score, and dynamically changing the displayed information based on the updated score.

In some embodiments, dynamically changing the displayed information may further comprise displaying only the information related to the individuals associated with a score that is equal to or greater than the updated score. The updated score may comprise a range of scores, and dynamically changing the displayed information may further comprise displaying only the information related to the individuals associated with scores that are within the updated range of scores.

In accordance with additional embodiments of the present disclosure, a computer-implemented method is disclosed for displaying geographic regions of individuals related to specific groups of characteristics. The method comprises displaying a map. The method further comprises receiving a selection of at least one of the groups of characteristics. The method still further comprises identifying the individuals related to at least one of the selected groups who are also existing customers of a business. The method further comprises determining geographic regions related to the identified individuals, and displaying at least one of the determined geographic regions on the map.

According to some embodiments, the method may further comprise identifying the individuals associated with at least one of the selected groups who are also not existing customers of a business.

The method may also comprise assigning color to each of the selected groups and displaying at least one of the determined geographic regions on the map, using the colors assigned to all the groups related to that region.

In some embodiments, this method may also comprise receiving a selection of a region, and changing the map to show the selected region and displaying the individuals and the characteristics that are related to the groups in the selected region.

In accordance with additional embodiments of the present disclosure, a computer-implemented method of communicating with individuals related to specific groups of characteristics is disclosed. The method comprises receiving a group of characteristics. The method further comprises displaying the individuals related to the group. The method further comprises determining a communication preference for at least one of the individuals related to the group. The method still further comprises displaying at least one of the communication preferences. The method also comprises receiving a message to be sent to at least one of the individuals, and sending the message to at least one of the individuals, using the communication preference for that individual.

According to some embodiments, the method may further comprise determining which of the communication preferences the individual is likely to use, and sending the message to at the individual using the determined communication preferences.

Additionally, the method may further comprise determining which of the communication preferences the individual is likely to respond to and sending the message to the individual using the determined communication preferences.

In some embodiments, the communication preference may comprise email, SMS, MMS, phone, RMS, postal mail, or social media platforms such as Facebook, Twitter, or LinkedIn.

In accordance with additional embodiments of the present disclosure, a computer-implemented method is disclosed for viewing sub-groups of relationships between individuals and characteristics. The method comprises receiving a request to view a group of relationships between individuals and characteristics. The method further comprises creating one or more sub-groups of the relationships, based on the characteristics. The method still further comprises outputting at least one of the sub-groups.

In accordance with additional embodiments of the present disclosure, a computer-implemented method is disclosed for viewing sub-groups of relationships between individuals and characteristics within a larger group. The method comprises receiving a request to view a group of relationships, wherein at least one of the relationships comprises a strength. The method further comprises receiving a threshold and creating one or more sub-groups of the relationships, based on the threshold and the strength. The method still further comprises outputting at least one of the sub-groups.

In accordance with additional embodiments of the present disclosure, a computer-implemented method is disclosed for automatically configuring administrative credentials on a remote system. The method comprises receiving a user request for administrative credentials on a remote system. The method further comprises receiving the user's account information. The method still further comprises accessing the remote system and requesting administrative privileges for the user. The method still further comprises determining what information is necessary to complete the user's request and sending the necessary information to the remote system.

In some embodiments, the method may further comprise receiving the user's credentials for an organization and sending the information regarding the organization and the user's credentials for an organization to the remote system.

According to some embodiments, the method may further comprise determining that the necessary information has not been provided and prompting the user to supply the necessary information.

For example, when first launching the application, downloading its software, or registering for a cloud-based version of the software, the user may be brought to an administration and setup page. Here, the user may enter their social media credentials for any of the social media platforms they would like included in the GUI, as well as the organization's name and all accompanying organizational credentials. The application may then automatically enter the information in the appropriate place on the user's admin page of each one of those social media platforms. At this time, the user may be prompted with information explaining that by proceeding he or she may be providing the GUI with administrative rights and access to such profile. This process may substantially reduce the burden on the user or their organization to provide such access by going through the actual steps for each social media platform individually and also provides the GUI with the ability to access all necessary information as any administrator could. Most importantly, all of this may be done without the user or the user's organization having to leave the GUI application.

In accordance with additional embodiments of the present disclosure, a computer-implemented method is disclosed for viewing relationships between two groups of relationships. The method comprises receiving a first group and displaying at least one of the relationships from the first group in a first region. The method further comprises receiving a second group and displaying at least one of the relationships from the second group in a second region. The method still further comprises determining which of the relationships are common to both the first group and the second group, and displaying the common relationships in a third region, indicating that they are common to both groups.

In some embodiments of the present disclosure, a computer-implemented method is disclosed for viewing sub-groups of relationships between two data elements. The method comprises receiving a group of relationships between the data elements and displaying at least one of the relationships from the group. The method further comprises receiving a request to split the group. The method still further comprises creating a first sub-group of relationships in the group, based on the strength of at least one of the relationships. The method further comprises creating a second sub-group of relationships in the group, based on the strength of at least one of the relationships.

According to some embodiments, this method further comprises displaying at least one of the relationships from the first sub-group in a first region, and displaying at least one of the relationships from the second sub-group in a second region.

Additionally, some embodiments of the method may further comprise identifying relationships that are common to both the first sub-group and the second sub-group and displaying at least one of the identified relationships in a third region.

The method may further comprise identifying a number of relationships that are common to both the first sub-group and the second sub-group and displaying the number in a third region.

In accordance with additional embodiments of the present disclosure, a computer-implemented method is disclosed for granting a user access to a system. The method comprises displaying a number of elements, comprising icons, colors, shapes, or alphanumeric symbols. The method further comprises receiving a selection of one of the elements and indicating that the element has been selected. The method still further comprises displaying a history of the selected elements, comprising the indications associated with each selected element. The method further comprises permitting access to the system, once the elements have been selected in a correct sequence. According to some embodiments, indicating that an element has been selected may comprise using a different indication for each element. The elements may comprise a color, shape, or alphanumeric symbol. The method may further comprise identifying the user associated with the correct sequence and loading the identified user's information.

In accordance with additional embodiments of the present disclosure, a computer-readable medium is disclosed that operates to perform at least one of the foregoing disclosed methods.

In accordance with additional embodiments of the present disclosure, a system is disclosed for manipulating and displaying data on remote devices. The system comprises an analysis server, for gathering data and determining a number of relationships. The system further comprises one or more data sources, from which the analysis server receives data. The system further comprises a user terminal, for displaying data and relationships to a user. The user terminal may comprise a general-purpose computer, such as a laptop, a cell phone, a tablet, or a server. The user terminal may comprise multi-purpose software running on a remote device. The multi-purpose software may comprise a web browser. The user terminal may comprise application software running on a remote device. The user terminal may retrieve data from the analysis server, and manipulate data locally on the user terminal. The user terminal may request the analysis server to analyze data stored on the analysis server, and receive only the results of the analysis.

Further features or variations may be provided in addition to those set forth herein. For example, the present invention may be directed to various combinations and sub-combinations of the disclosed features, or combinations and sub-combinations of several further features disclosed below in the detailed descriptions.

Detailed Description

Reference will now be made in detail to embodiments of the present disclosure, examples of which are illustrated in the accompanying figures. The discussion will use the same reference numbers included in the drawings to refer to the same or like parts. It is apparent, however, that the embodiments shown in the accompanying drawings are not limiting, and that modifications may be made without departing from the spirit and scope of the invention.

In this disclosure, the use of the singular includes the plural, unless specifically stated otherwise. Also, in this disclosure, the use of "or" means "and/or," unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Embodiments of the present disclosure provide improved systems and methods for analyzing and displaying large amounts of data. Specifically, the present disclosure provides systems and methods for viewing, manipulating, presenting, storing, sharing, and managing large amounts of statistical information. The underlying concepts related to the calculation of relationship values and scores, as used in the presently disclosed methods and systems, is discussed at length in U.S. patent application Ser. No. 13/461,670, issued as U.S. Pat. No. 8,341,101, which is hereby incorporated by reference. The embodiments presented in the present disclosure are related to analyzing and visually displaying the data in a meaningful and easy-to-understand way.

The system for analyzing and displaying data is a characteristic-based system. A characteristic-based system may define a number of characteristics. As used herein, the term characteristic broadly refers to any attribute, trait, value, or other factor associated, whether objectively or subjectively, with an individual or group of individuals. The detailed description below provides further examples of such characteristics. When receiving information about an individual, the characteristic-based system may use a suitable relationship-determining module (i.e., a software component, a hardware component, or a combination of a software component and a hardware component) comprising relationship-determining algorithms known in the art to determine the relationship between the information and the characteristics. This relationship may be described using both a magnitude and a direction. Further, the description may be represented by a numerical value, textual identifier, graphical icon, color, opacity, or any other suitable method of representing the relationship. The magnitude may represent how strongly the information is related to the characteristics, including the lack of any relationship at all.

The system may also receive a plurality of descriptors, identifying or describing specific individuals. The system may use a similar relationship-determining module to identify which individual, or individuals, are the most strongly related to the information. In this way, the system may further determine the relationship between the individuals and the characteristics. These relationships may be accumulated over time to develop a better understanding of the individual, based on multiple data points.

Further, the system may use the relationship-determining modules to identify new relationships and patterns in the data. The system may use these relationships and patterns to create new characteristics, which will be used when evaluating the received data. Likewise, over time the system may identify characteristics that generally do not relate to the data. It may flag these characteristics as irrelevant with respect to certain data or relationships. The system may then skip the irrelevant characteristics, increasing performance.

The system may also use the relationship-determining module to identify characteristics that are related to each other. The system may group these related characteristics together into personas. A title may be given to this persona. As used herein, the term persona refers to a group of relationships between individuals and characteristics. The system may use the relationship-determining module to determine the relationships between the groups of characteristics or personas and the characteristics, data, individuals, and the other groups of characteristics. In this manner, personality types may be identified and analyzed.

In addition, the system may receive a metric, representing an overall goal or interest of a particular organization. As used herein, the term metric broadly refers to any attribute, measurement, goal, strategy, or other information of interest to an organization. The metric may also consist of a number of sub-metrics. As used herein, the term sub-metric broadly refers to any attribute, measurement, goal, strategy, or other information related to the metric. The system may use a suitable relationship-determining module to identify the relationship between the metric and the characteristics. In this way, the system may further determine the relationship between the metrics and the individuals. The system may also determine the relationship between groups of characteristics and the metric, personas and the metric, and individuals and the metric. In this manner, the organization may gain information on how personality types or individuals contribute to the metric it is interested in. In additions, the system may compute a score. The score may reflect the average propensity of the individuals who fit within a persona to also fit within a metric or sub-metric. Thus, the score reflects the likelihood that an individual within a persona would also fit within the desired attributes, goals, strategies, or other information of interest to an organization, for example being likely to purchase an organization's products.

Further, a visualization module (i.e., a software component, a hardware component, or a combination of a software component and a hardware component) may be used to develop a representation of any relationship, group of relationships, or personas. The user may select two areas of interest. The selections may comprise one or more metrics, sub-metrics, personas, characteristics, groups of characteristics, individuals, data items, data sources, or any grouping of the same. Once both selections have been made, the system may use the relationships for those selections to calculate an overall relationship between the two. The system may then represent this overall relationship as a single value or descriptor. Further, the user may assign weights to one or more of the selection items, or change the assigned weights. When the weights are changed, the system may re-calculate all relationships and values associated with the weights. The system may use these weights accordingly when calculating the overall relationship between the selections. The system may also determine the relationships between one selection and the underlying items comprising the other selection. The system may then compute a single value or descriptor for the underlying items. In this manner, the user is able to determine how the underlying items contribute to the overall relationship between the selections.

The system may also receive a plurality of threshold criteria. As used herein, the term threshold criteria broadly refers to any value, score, term, event, or descriptor related to one or more data items, data sources, individuals, characteristics, groups of characteristics, relationships, groups of relationships, or personas. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed. The system may output notifications when any threshold criteria are met.

Figure 22:
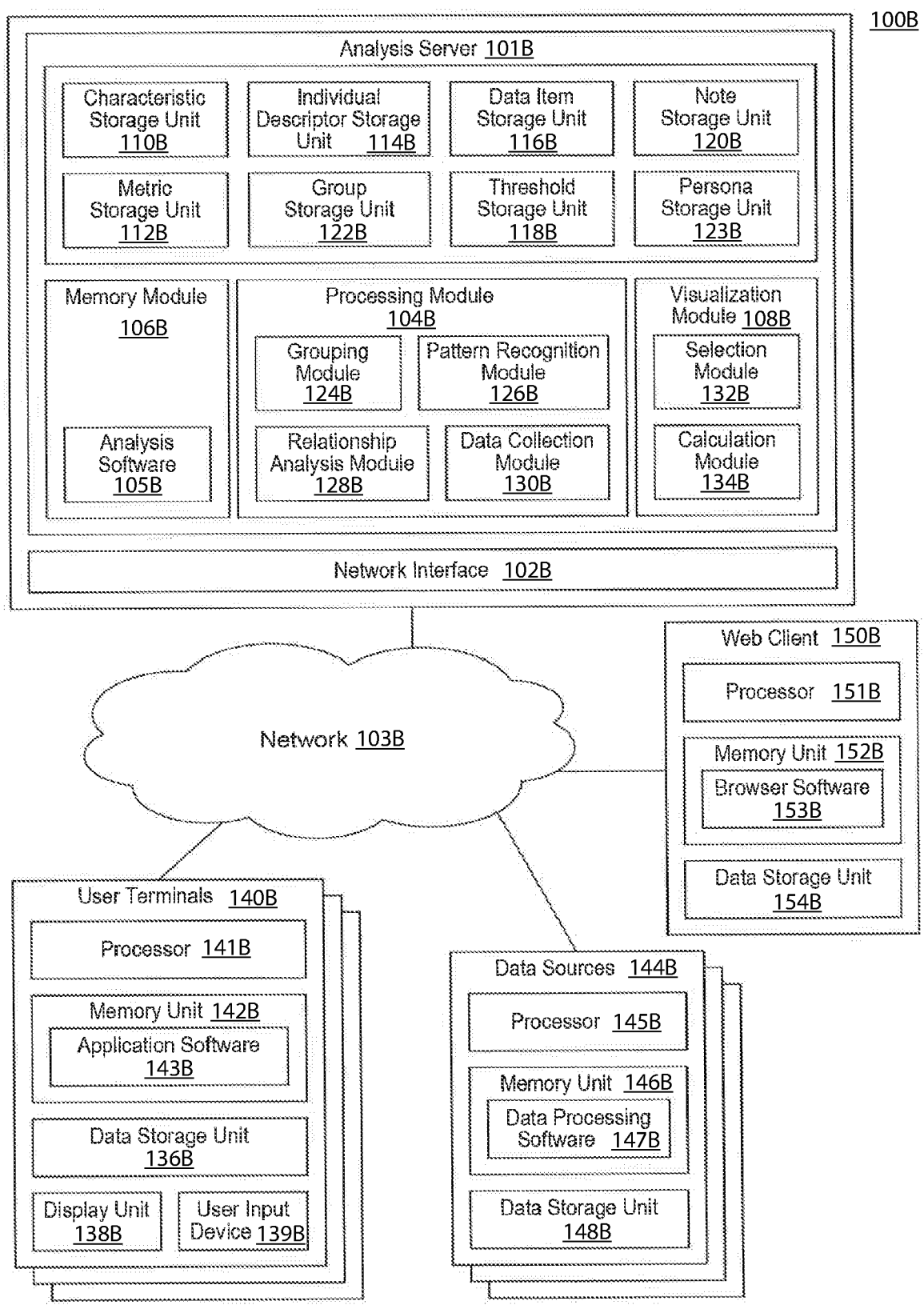
FIG. 22 is a block diagram of an exemplary embodiment of a system for analyzing and displaying data.

FIG. 22 is a block diagram of an exemplary embodiment of a system 100B for analyzing and displaying data. One skilled in the art will appreciate that system 100B may be implemented in a number of different configurations without departing from the spirit and scope of the present invention. System 100B may include an analysis server 101B, a network interface 102B, a network 103B, user terminals 140B, data sources 144B, and a web client 150B.

As shown in FIG. 22, analysis server 101B may include a network interface 102B, a memory module 106B, a processing module 104B, a visualization module 108B, and one or more interconnected information storage units, such as, for example, a characteristic storage unit 110B, a metric storage unit 112B, an individual descriptor storage unit 114B, a data item storage unit 116B, a threshold criteria storage unit 118B, a note storage unit 120B, a group storage unit 122B, and a persona storage unit 123B. While the information storage units are illustrated in FIG. 22 as interconnected, each information storage unit need not be interconnected. Moreover, rather than separate storage units, analysis server 101B may include only one database that would include the data of storage units 110B-123B. Likewise, while the data storage units are shown as part of server 101B, in another embodiment, one or more storage units may be separate units, connected to analysis server 101B through network interface 102B.

Network interface 102B may be one or more devices used to facilitate the transfer of information between analysis server 101B and external components, such as user terminals 140B, data sources 144B, and web client 150B. Network interface module 102B may receive user requests from a user terminal 140B, and route those requests to processing module 104B or visualization module 108B. The user terminals 140B may be either local user terminals or remote user terminals. The data sources 144B may also be local data sources or remote data sources. In exemplary embodiments, network interface module 102B may be a wired or wireless interface to a local-area network connecting one or more local user terminals 140B and local data sources 144B, or to a wide-area network such as the Internet, connecting one or more remote user terminals 140B, or remote data sources 144B. Network interface module 102B may allow a plurality of user terminals 140B, local or remote or both, to connect to the system, in order to make selections and receive information, alerts, and visualizations consistent with this disclosure. Network interface module 102B may also allow the system to connect to one or more data sources 144B, local or remote or both, by way of local area networks or wide area networks, to connect to the system 100B.

Memory module 106B may represent one or more non-transitory computer-readable storage devices that maintain information that is used by processing module 104B and/or other components internal and external to characteristic-based server 100B. Memory module 106B may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. Further, memory module 106B may include analysis software 105B that, when executed by processing module 104B, perform one or more processes consistent with embodiments of the present invention. Memory module 106B may also include configuration data that may be used by processing module 104B to present user interface screens and visualizations to user terminals 140B.

Analysis software 105B may be leveraged by the processing module 104B to connect with remote systems, such as data sources 144B, via network interface 102B, to extract data using standard interfaces and protocols such as HTTP, HTTPS, RSYNC, FTP, IMAP and SMTP, oAuth, or others. In one embodiment, the analysis server 101B need not store the data. Rather, the content may remain at a remote location, such as the data storage unit 148B of data source 144B. The analysis software 105B may cache a limited subset of data in, for example, the data item storage unit 116B, and reference the source of record when necessary to get the content. The analysis software 105B may also continuously synch with the data sources 144B to maintain up-to-date data. In another embodiment, the analysis server 101B may obtain copies of the data from data sources 144B, and store these copies in data item storage unit 116B. In a third embodiment, data may be entered directly into the analysis server 101B, and stored in data item storage unit 116B. The analysis software 105B may also store metadata, synthesized data, and transformed data in data item storage unit 116B.

Analysis software 105B may also process the data, through module 104B, to determine the relationships between the data elements, as discussed in detail below. These relationships may also be stored in data storage units 110B-123B. Analysis software 105B may also respond to requests received from user terminals 144B and web client 150B. In response to these requests, analysis software 105B may leverage the processing module 104B to calculate new relationships between the data elements, groups of data elements, and/or existing relationships. Analysis software 105B may send data elements, relationships, personas, groups, metrics, etc. to user terminal 140B or web client 150B, through network 103B. Analysis software 105B may also store a record of what information has been sent, in order to send only the information that is new or has changed.

Processing module 104B, as shown in FIG. 22, may include one or more processors for processing data according to analysis software 105B stored in memory module 106B. The functions of each processor may be provided by a single dedicated processor or by a plurality of processors. Processing module 104B may further include a data collection module 130B, a grouping module 124B, a pattern recognition module 126B, and a relationship analysis module 128B. Data collection module 130B may include components for collecting data items from data sources, using network interface 102B. As described in more detail below, data items collected by the data collection module may include any information pertaining to an individual. Relationship analysis module 128B may include components for determining the existence and strength of a relationship between two items. For example, and as described in greater detail below, relationship analysis module 128B may include a natural-language processing component for determining the relationship between two items. Grouping module 124B may include components for identifying groups of related items. For example, and as described in greater detail below, grouping module 124B may use relationships identified by relationship analysis module 128B to identify groups of related items. Pattern recognition module 126B may include components for identifying patterns in the received data. For example, and as described in greater detail below, pattern recognition module 126B may include pattern recognition algorithms known in the art to identify new characteristics based on patterns of received data.

As shown in FIG. 22, analysis server 101B may also include a plurality of interconnected storage units, 110B-123B. In this regard, analysis server 101B may include a storage unit module (not shown) having components for controlling access to storage units 110B-123B. Such a storage unit module may include a query function that, in response to a match request, may query information stored in one or more of storage units 110B-123B to identify characteristics, personas, data items, or metrics meeting specified criteria. Storage units 110B-123B may be configured using any appropriate type of unit that facilitates the storage of data, as well as the locating, accessing, and retrieving of data stored in the storage units.

Characteristic storage unit 110B may store general characteristics of individuals. As used herein, the term characteristic broadly refers to any attribute, trait, value, or other factor associated, whether objectively or subjectively, with an individual or group of individuals or persona. For example, a characteristic may reflect a number of attributes that may be applicable to one or more individuals, such as types of previously or currently held fields of work (e.g., salesperson), professional or personal values (e.g., environmentalism), location (e.g., New York), social interactions (e.g., trendsetter), emotional traits (e.g., generally negative), user-defined characteristics, or others.

Data item storage unit 116B may store data collected by data collection module 130B. Data item storage unit 116B may also store metadata associated with the data items, describing the data items. For example, metadata may include the data source the data item was collected from, the time the data item was posted or created, the time the data item was collected, the type of data item (e.g., a blog post), or the individual with which the data is associated. Data item storage unit 116B may also store data items received, or created by analysis server 101B.

Metric storage unit 112B may store metrics and sub-metrics for an organization. As used herein, a metric broadly refers to any measurement, criteria, goal, or information of interest to an organization. For example, a given organization may be interested in a "brand awareness" metric, or how likely a given person is to recognize the organization's brand. The metric may also be comprised of sub-metrics. As used herein, a sub-metric refers to any information further characterizing a metric. For example, sub-metrics further characterizing brand awareness may include "internet mentions" for that brand, how widely those mentions are distributed, how the mentions describe the brand, number of sales, or others.

Persona storage unit 123B may store personas. As used herein, the term persona refers to a group of relationships between individuals and characteristics. Personas may be determined by the relationship-analysis module 128B or by the grouping module 124B. The organization of individuals into personas based on their relationship to characteristics allows users to more easily identify and understand, manipulate, and analyze categories of individuals.

Individual descriptor storage unit 114B may store descriptors of specific individuals. As used herein, an individual descriptor includes any information that identifies a specific individual, as opposed to a group of people. Descriptors may include names, addresses, employee numbers, driver's license numbers, credit card and other banking account information, social security numbers, behavioral profiles, relationship or social network information, linguistic styles or writing, voice recognition, image recognition or any other unique identifiers. In this manner, each descriptor or group of descriptors may be used to identify a unique individual.

Threshold criteria storage unit 118B may store the threshold criteria used to determine when a notification should occur. Threshold criteria may include any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed.

Note storage unit 120B may store notes, comprising information entered by one or more users, that are associated with one or more individual descriptors, groups, relationships, personas, metrics, sub-metrics, data items, or data sources. The information may include textual, graphical, audio, or video information. For example, a user may enter a textual description of a specific group or persona, such as the "treehugger" group. This description may allow users to more easily refer to, and understand the characteristics that comprise that group.

Group storage unit 122B may store groups, consisting of a plurality of characteristics, or other groups. These groups may allow users to more easily identify and understand categories of individuals.

Visualization module 108B, as shown in FIG. 22, may further include a selection module 132B and a calculation module 134B. Selection module 132B may include components for receiving user selections from network interface module 102B. For example, selection module 132B may allow users on user terminals 140B to make selections. User selections may consist of one or more individual descriptors, metrics, sub-metrics, characteristics, groups, personas, data items, data sources, or groups thereof. Calculation module 134B may include components for determining the relationships between the selected groups or personas and the remaining groups, personas, data items, metrics, sub-metrics, characteristics, data sources, and individuals. This may include using the relationships to calculate an overall relationship for a group with respect to the other groups, personas, data items, metrics, characteristics, data sources, and individuals. This may also include using the relationships to calculate an overall relationship for a persona with respect to the other groups, personas, data items, metrics, characteristics, data sources, and individuals. Calculation module 134B may also receive weights associated with a group, persona, data item, metric, sub-metric, characteristic, data source, or individual, and use the weights in conjunction with the stored relationships when determining the overall relationship for a selection. Visualization module 108B may use the calculated values for a selection to build a screen containing at least one selection, and a representation of the overall relationship between that selection and at least one other selection. Calculation module 134B may also receive scores associated with personas, and use the scores in conjunction with the stored metrics for determining the relationship between personas and metrics. Visualization module 108B may also include additional information about the selection in the screen. For example, and as discussed in more detail below, selection module 132B may receive a selection of an individual and a selection of a metric. Calculation module 134B may determine the overall relationship between the individual and metric based on the stored relationships. Visualization module 108B may return a screen containing information about the individual and a single descriptor of the overall relationship. Further, selection module 132B may receive a selection of a persona. Calculation module 134B may determine the score for the persona. Visualization module 108B may return a screen containing information about the persona and the calculated score.

Data collection module 130B may be configured to collect data from data sources 144B. Data collection module 130B may optionally comprise search engine tools known in the art, operable to find data sources 144B and data items relevant to the search criteria, such as an individual or a persona.

Analysis server 101B may comprise a single computer or mainframe, containing at least a processor, memory, storage, and may either contain or be connected to a network interface 102B. Analysis server 101B may optionally be implemented as a combination of instructions stored in software, executable to perform the steps described below, and a processor connected to the software, capable of executing the instructions. Alternatively, analysis server 101B may be implemented in a number of different computers, connected to each other either through a local-area network (LAN) or wide-area network (WAN). Storage units 110B-123B may comprise any computer-readable medium known in the art, including databases, file systems, or data sources.

Data sources 144B may contain a processor 145B, a memory unit 146B, and a data storage unit 148B. Data sources 144B may comprise internal data sources (e.g. crm, payroll, etc.), privately-shared sources (e.g., suppliers, partners, etc.), user-authorized data sources (e.g., social media accounts, etc.), public data sources (e.g., blogs, tweets, etc.), or purchased data sources (e.g., data aggregators, credit card db, etc.). As discussed above, the purchased data sources may also contain characteristics, metrics, or individual descriptors. In another embodiment, the system may only access data from sources that have been marked as relevant for one or more individual descriptors, metrics, groups, or sub-metrics.

Data storage unit 148B may also include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. Data storage unit 148B may contain data items. Data items may be both structured and unstructured data. Data items may also qualitative and subjective, quantitative and objective, or a combination of both. Structured data broadly refers to any data that is placed into a pre-existing structure such as a database, spreadsheet, or form. Unstructured data broadly refers to data that does not have a defined structure, such as prose, news articles, blog posts, comments, messages, emoticons, images, video, audio, or other freely-entered data. Quantitative and objective data broadly concerns factual, measurable subjects. For example, quantitative data may be described in terms of quantity, such as a numerical value or range. In comparison, qualitative and subjective data broadly describes items in terms of a quality or categorization wherein the quality or category may not be fully defined. For example, qualitative and subjective data may describe objects in terms of warmth and flavor.

Memory unit 146B may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. Memory unit 146B may include data processing software 147B. Data processing software 147B may leverage the processor 145B to gather and transmit data stored in data storage unit 148B to analysis server 101B through network interface 102B over network 103B.

Processor 145B may include one or more processors for processing and transmitting data according to data processing software 147B stored in memory unit 146B. Processor 145B may interface with the analysis server 101B through network interface 102B over network 103B. The processor may gather and transmit data to the analysis server 101B.

User terminals 140B may include a processor 141B, memory unit 142B, data storage unit 136B, a display unit 138B, and a user input device 139B. User terminals 140B may comprise a general-purpose computer, such as a laptop, a cell phone, a tablet, or a server.

Memory unit 142B may comprise any type of RAM or ROM embodied in a physical storage medium, such as magnetic storage including floppy disk, hard disk, or magnetic tape; semiconductor storage such as solid state disk ('SSD') or flash memory; optical disc storage; or magneto-optical disc storage. Memory unit 142B may include application software 143B.

Application software 143B may include a web browser for interfacing with the web client 150B. The application software 143B may further include software for interfacing with the analysis server 101B through the network interface 102B over the network 103B. Application software 143B may send requests to the analysis server 101B. These requests may be requests to send data, or may be requests to have the analysis server 101B manipulate data and send only the results. Application software 143B may also leverage processor 141B to manipulate data received from the analysis server 101B on user terminal 140B. Application software 143B may further include a browser, e-mail client, messaging client, application or any other instructions for presenting content to a user. In one embodiment, application software 143B may be an application installed on the mobile device. In this embodiment, application software 143B may be implemented using one or more technologies such as Objective C, C, C++, Java, C #, or others. In another embodiment, application software 143B may provide a web browser, similar to browser software 153B, discussed in detail later. Application software 143B may provide one or more graphical user interfaces to display the data and for the user to select, manipulate, enter, and/or view information, as described in detail below.

Processor 141B may include one or more physical hardware processors for interfacing with analysis server 101B or with web client 150B. Processor 141B may be further configured to locally manipulate data retrieved from analysis server 101B. Processor 141B may manipulate data locally on the user terminal 144B, and may also request that the analysis server 101B, through processing module 104B, analyze data stored in the storage units 110B-123B. In this scenario, processor 141B may receive only the results of the analysis from analysis server 101B.

Data storage unit 136B may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. Data storage unit 136B may be configured to store data received by processor 141B from the analysis server 101B. Data storage unit 136B may further be configured to store the results of data analysis conducted by processing module 104B in the analysis server 101B.

Display unit 138B comprises a screen for displaying a user interface. Display unit 138B may be configured to display the appropriate user interface to allow a user at user terminal 140B to view data and results in the desired fashion. The details of the various user interfaces that may be viewed on the display are discussed in detail below.

User input device 139B may comprise a keyboard, touch screen, and/or mouse. User input device 139B is configured to allow a user to interface with user terminal 140B and application software 143B as previously described. User input device 139B may allow a user to request data from the analysis server 101B, to locally manipulate data stored in data storage unit 136B, and to view the data and results in the desired fashion on display unit 138B.

Web client 150B may include a processor 151B, a memory unit 152B, and a data storage unit 154B. Web client 150B may be configured to be accessed directly be a user, or by a user through a user terminal 140B. Web client 150B may be used similarly to a user terminal, for remotely accessing the analysis server 101B over network 103B. Web client 150B may further include a display unit and/or user input device (not shown) similar to those described with reference to the user terminals 140B.

Memory unit 152B may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. Memory unit 152B may store browser software 153B for execution by processor 151B.

Browser software 153B may be implemented using one or more technologies such as JAVA, Apache/Tomcat, Ruby on Rails, Perl, Python, etc. Browser software 153B may include a set of instructions executable by a processor to provide the methods, features, and interfaces disclosed herein. Browser software 153B may allow a user to manipulate and view data stored in analysis server 101B over network 103B. Browser software 153B may further provide one or more graphical user interfaces for the user to select, manipulate, enter, and/or view information, as described in the attached Appendices. The graphical user interface may also allow the user to request additional information, or enter metadata, notes, reminders, or other information.

Processor 151B may include one or more processors for interfacing with analysis server 101B or with user terminals 140B. Processor 151B may be further be configured to locally manipulate data. The processor 151B also may request that the analysis server 101B, through processing module 104B, analyze data stored in the storage units 110B-123B. In this scenario, processor 151B would only receive only the results of the analysis.

Data storage unit 154B may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. Data storage unit 154B stores at least a portion of the data and/or instructions for implementing the methods, features, and interfaces provided by browser software 153B. The web client may either contain or be remotely connected to data storage unit 154B. Data storage unit 154B may store data received from analysis server 101B, or may store the results of data manipulation conducted by processing module 104B in analysis server 101B.

FIGS. 23-27 illustrate exemplary embodiments of displaying data in a user interface. The user interface may be a part of application software 143B or browser software 153B, as discussed previously. The user interface may be displayed on display unit 138B, if being displayed at user terminal 140B.

Figure 23:
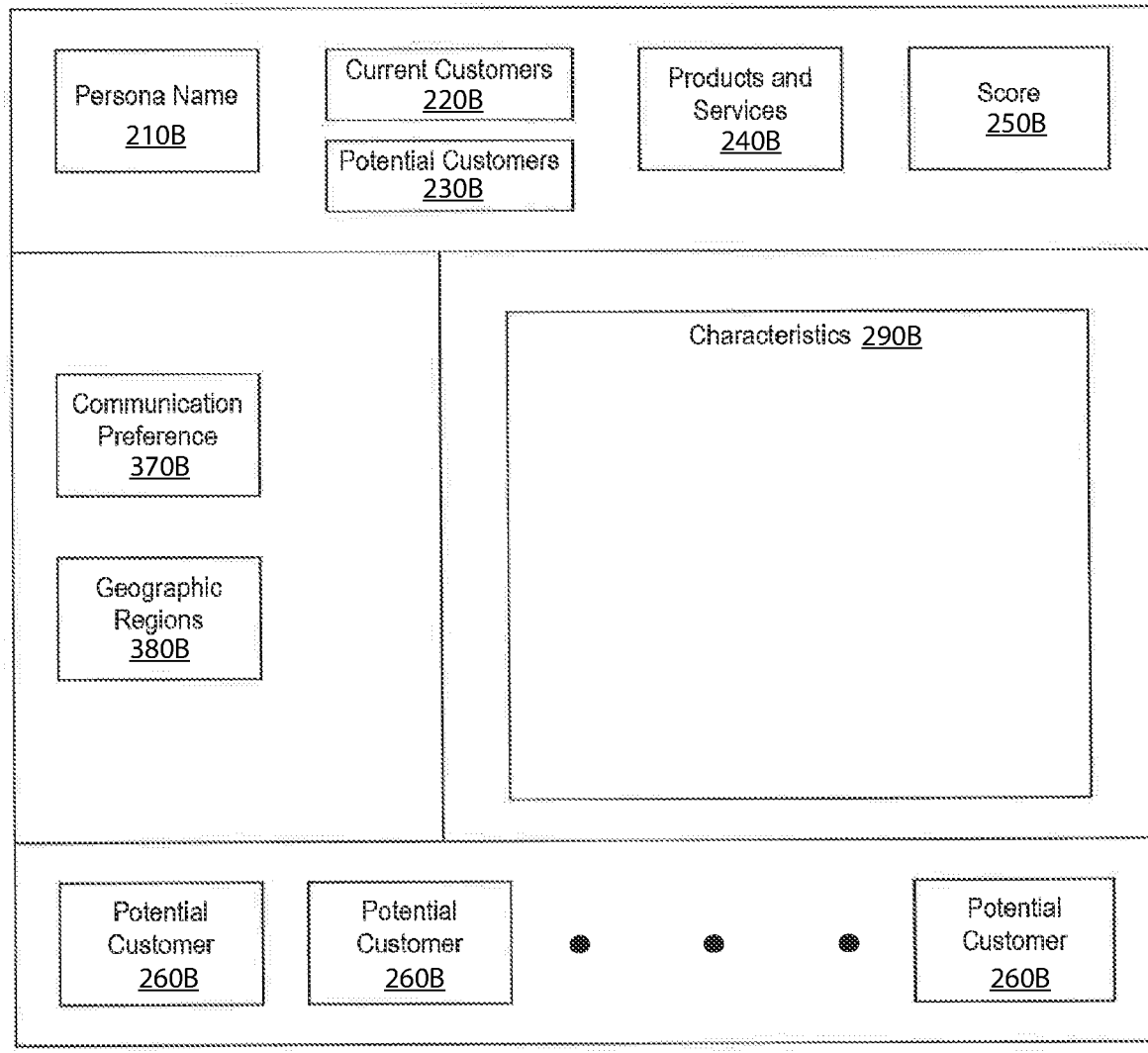
FIG. 23 is an exemplary persona display.

FIG. 23 shows an exemplary persona display 200B. Persona display 200B provides a way to display a persona. The persona display 200B may include the persona name 210B, a number of existing customers 220B, a number of potential customers 230B, products and services 240B, a score 250B, characteristics 290B, potential customers 260B, communication preferences 270B, and geographic regions 280B. The displayed data may be stored in storage units 110B-123B, in data storage unit 136B in user terminal 140B, or in data storage unit 154B in web client 150B.

Persona name 210B identifies the displayed persona (e.g., "Military Spouses").

Number of existing customers 220B and number of potential customers 230B may be determined by processing module 104B, or may be determined locally by either processor 141B in user terminal 140B or processor 151B in the web client 150B. Further, this data may be retrieved directly by the data collection module 130B from data sources 144B. This data may be stored in storage units 110B-123B, or within data storage unit 136B of user terminal 140B or data storage unit 154B of web client 150B.

Displayed products and services 240B comprise products and/or services that individuals of the displayed persona are likely to purchase. The displayed products or services 240B that the individuals are likely to purchase may be based on each individual's previous purchases, or products or services that are related to, or similar to, that individual's previous purchases. The displayed products or services 240B may also be based on products or services purchased by other individuals who are related to individuals of the displayed persona, or may be based on products and services that are related to, or similar to, products and services purchased by individuals related to individuals of the displayed persona. Lastly, the displayed products and services 240B may be based on other behavior indicating that individuals of the displayed persona are likely to purchase a product, such as placing a product in a shopping cart, searching for a product online, adding a product or service to a wish list, or any other behavior that indicates an individual is considering the product or service. The products or services 240B may be determined by processing module 104B, or may be determined locally by either processor 141B in the user terminal or processor 151B in the web client. Further, this data may be retrieved directly by the data collection module 130B from data sources 144B. This data may be stored in data item storage unit 116B, or within data storage unit 136B of user terminals 140B or data storage unit 154B of web client 150B.

Score 250B may reflect the average propensity of the individuals who fit within that persona to become a customer or to otherwise take the action desired, such as purchasing products or services. Score 250B may be calculated by analysis server 101B, and more specifically by relationship analysis module 128B within processing module 104B.

Displayed characteristics 290B are characteristics related to individuals within the displayed persona. Characteristics 290B may reflect a number of attributes, such as types of previously or currently held fields of work (e.g., salesperson), professional or personal values (e.g., environmentalism), location (e.g., New York), social interactions (e.g., trendsetter), emotional traits (e.g., generally negative), user-defined characteristics, or others. Characteristics 290B may be determined by processing module 104B, or may be determined locally by either processor 141B in user terminal 140B or processor 151B in the web client 150B. Further, this data may be retrieved directly by the data collection module 130B from data sources 144B. This data may be stored in characteristic storage unit 110B, or within data storage unit 136B of user terminals 140B or data storage unit 154B of web client 150B.

Communication preferences 270B may reflect the individuals' preferences for receiving communications. Communication preferences 270B may comprise, for example, email, SMS, MMS, phone, RMS, postal mail, or social media platforms such as Facebook, Twitter, or LinkedIn.

Geographic regions 280B may reflect the geographic regions associated with individuals within the persona, such as the regions where they reside, make frequent purchases from, work, etc.

Potential customers 260B may reflect individuals within the displayed persona who are not existing customers of a business, but who are likely to become existing customers, or who may otherwise be of interest to a business. People who may be of interest to a business may include people who would be valuable customers, even if they are not likely to become existing customers. Other people who may be of interest to a business may also include, in some circumstances, people unlikely to become existing customers of a business. This may give a user the ability to analyze and understand individuals who are unlikely to become existing customers. Potential customers 260B may be displayed, for example, as pictures of individuals.

Potential customers 260B, communication preferences 270B, and geographic regions 280B represent visualization tools. Each of these components may be selected by the user, for example by utilizing user input device 139B. When selected by the user) these tools may allow a user to change to a different user interface display. For example, selecting geographic regions 280B may prompt the user interface to display the geographic location display 400B, shown in FIG. 25 and discussed in detail below.

In some embodiments, score 250B may be updated based on the user's selections. For example, a user may select one or more of the displayed products or services 240B by providing input through user input device 139B (FIG. 22). If the user's selection would result in a new score, different than the score currently displayed, score 250B will change. For example, selecting one or more products or services may result in a higher score, based only on the selected products or services. Score 250B may then be changed to reflect the new score. Other information on display 200B may also be changed, so that only information related to score 250B is displayed. For example, information related to score 250B may include information with a score equal to, above, or below score 250B, or within the range of score 250B. These changes may allow the user to understand how the overall score for a persona is influenced, and/or focus only on information related to a certain score, or range of scores. For example, changing to a higher score may cause only those individuals who are likely to purchase the selected product or service to be displayed. The user may also change the score directly by selecting the score itself. The user may then be prompted to enter a new score using, for example, user input device 139B. For example, a user may select a new score that is higher than the currently displayed score 250B. Based on the user's selected score, score 250B may change, as well as any other information on display 200B including characteristics 290B, current customers 220B, potential customers 230B, and potential customers 260B. In this manner, a user may filter the displayed information, for example in order to only display those individuals within a persona that have a higher propensity to become a customer or take a desired action. In this manner, a user's selections may easily filter the displayed information, so that only the most relevant information is displayed.

The display shown in FIG. 23 may allow a user to quickly understand the type of individuals who fall within a persona, how much of a business' customer base consists of people falling within a persona, how much growth potential a given persona has, the products or services the individuals characterized by this persona are likely to purchase. Some embodiments may also allow a user to determine whether the persona is trending up or down, meaning growing or shrinking in terms of size, and the extent of such a trend. In some embodiments, the user may be able to alter the displayed data to see how to maximize the value provided by each persona. For example, by selecting specific products or services or by updating the score, a user may be easily able to manipulate and understand the data.

Figure 24:
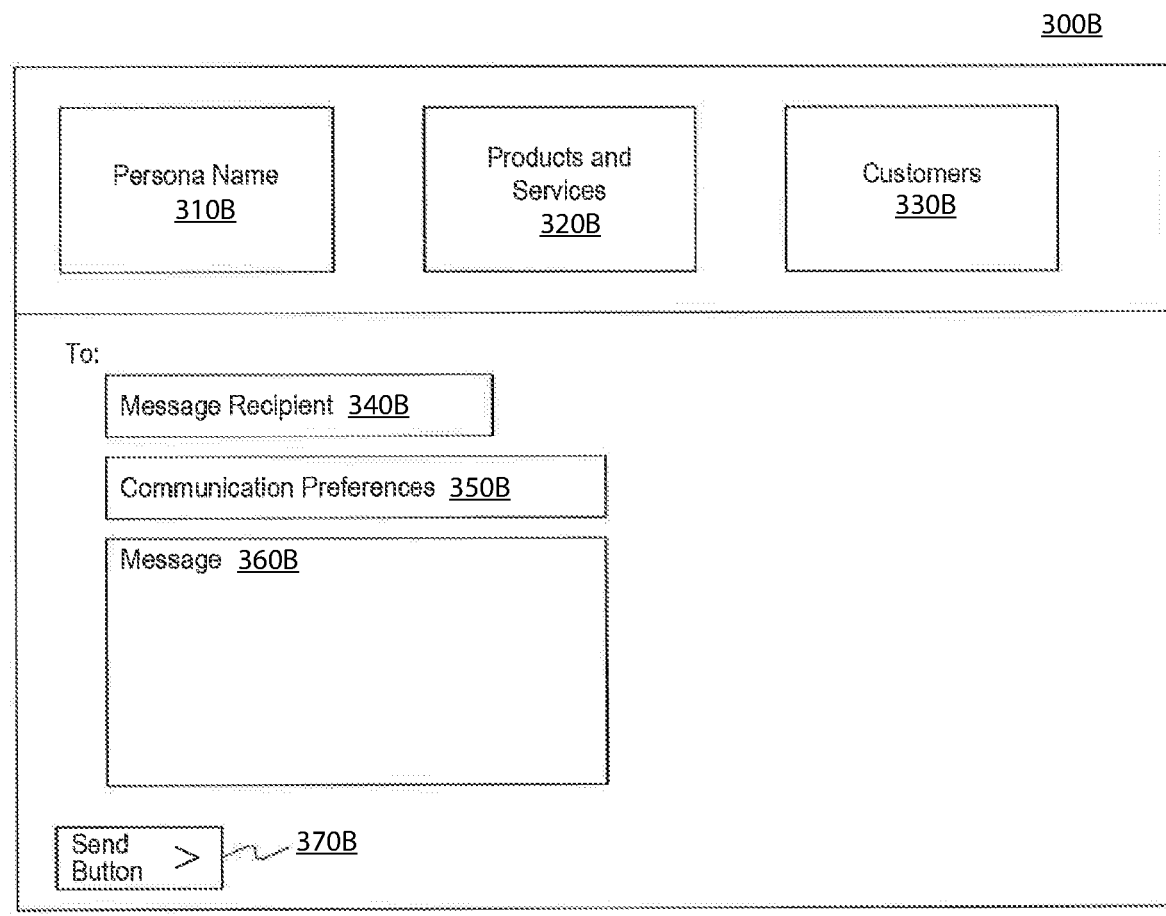
FIG. 24 is an exemplary communication display.

FIG. 24 shows an exemplary communications display 300B. Communications display 300B provides a way for a user to view the communications preferences of an individual, group of individuals, or a persona. It further allows users to send communications to individuals, groups of individuals, or personas. The groups of individuals may be a filtered group of individuals. The filtering may be done on by the processing module 104B or by processor 141B in user terminal 140B or by processor 151B in web client 150B. For example, a filtered group of individuals may comprise only those individuals with selected characteristics. Likewise, a filtered group of individuals may comprise only those individuals with a score above a certain threshold regardless of what persona they fit into.

The communications display 300B may include the persona name 310B, a number of customers 330B, products and services 320B, message recipients 340B, communication preferences 350B, and a message 360B. The displayed data such as persona name 310B, number of customers 330B, products and services 320B, and communication preferences 350B, may be stored in storage units 110B-123B, in data storage unit 136B in user terminal 140B, or in data storage unit 154B in web client 150B. Additional data, such as geographic location, characteristics, and score, may also be displayed on communications display 300B.

Persona name 310B, products and services 320B, and number of customers 330B reflect the same data as may be displayed on a persona display 200B, as shown in FIG. 23 and previously discussed in detail. Products and services 320B and number of customers 330B are data items related to the displayed persona name 310B.

Message recipients 340B include the individuals to whom the communication will be sent. Message recipients 340B could be a persona, an individual, or a group of individuals, as discussed above.

The communication preferences 350B for the selected individual, group of individuals, or persona may be displayed. Communication preferences 350B may include, for example, email, SMS, MMS, phone, RMS, postal mail, or social media platforms such as Facebook, Twitter, or LinkedIn. Communication preferences 350B comprise the selected individuals' preferences for receiving communications. The user may select one or more desired communication preferences from the communication preferences 350B, via which the message will be sent. For example, once the user selects a communication preference 350B, the system may then automatically create an RSS feed, JSON file, CSV file, or other necessary file of each individual and his/her respective email address, Twitter handle, or mailing address and feed that information directly into user's marketing platform, such as Eloqua, Constant Contacts, Mail Chimp, Twilio, or any other similar platforms. If these or similar platforms are not used, then the user may send a message directly to the message recipients 340B directly from the communications display using the selected methods. In some embodiments, the communication preferences 350B may be ranked (e.g., in order of most likely to be effective to least), for each message recipient. Thus, if a user selects more than one communication preference 350B, the system may only communicate with each individual using the highest ranked preference that was chosen.

Message 360B may comprise a text box or other region into which a user may enter the desired message to be communicated to the message recipients 340B. The user may be able to input the message by using, for example, user input device 139B at user terminal 140B.

Send button 370B may be selected by the user to prompt the system to send message 360B to the selected individuals via the selected communication preferences 350B. In some embodiments, the system may give feedback to the user that the message has been sent successfully, after the selection of send button 370B. This feedback may be, for example, a visual on-screen notification or an audio tone.

In additional embodiments, the communications display 300B may enable a user to send communications to colleagues. The communications display 300B may further enable a user to program the titles, roles, or names, of specific colleagues (not shown) into message recipient 340B portion of the display. Having programmed titles may make it easier for a user to send a message to the correct recipient. A user will not have to worry about typing in the address to send the message, but instead can select from a pre-programmed list. Because the user will not have to bother typing in a full address, there is no risk of mistakenly mistyping the recipient's name or address and sending the message to an incorrect location.

Figure 25:
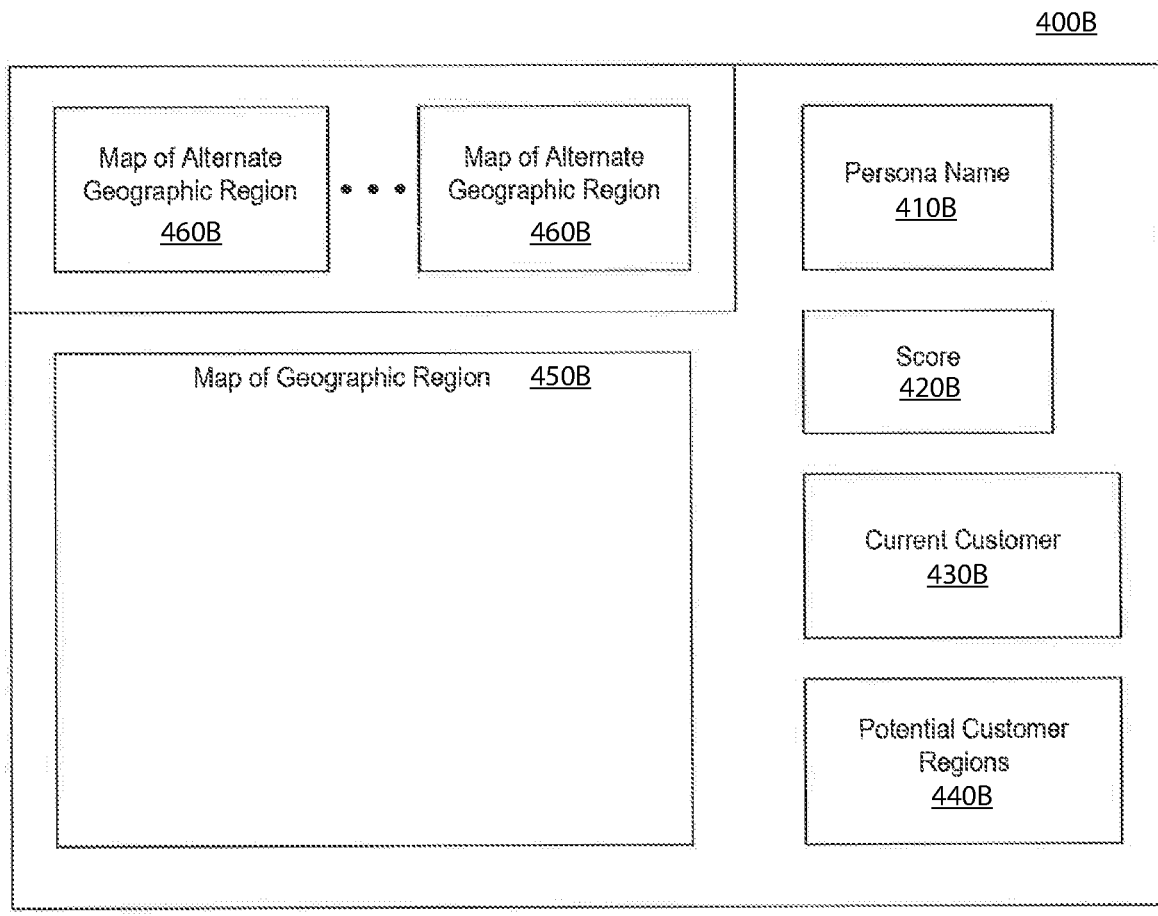
FIG. 25 is an exemplary geographic region display.

FIG. 25 shows an exemplary geographic region display 400B. Geographic region display 400B provides a way for users to graphically display the geographic region data related to the individuals within a persona. Geographic region display 400B may include a persona name 410B, a score 420B, existing customer regions 430B, potential customer regions 440B, a map of a geographic region 450B, and one or more maps of alternate geographic regions 460B. The displayed data such as persona name 410B, and score 420B may be stored in storage units 110B-123B, in data storage unit 136B in user terminal 140B, or in data storage unit 154B in web client 150B. Additional data, such as characteristics and/or products and services may also be displayed on geographic region display 400B. Persona name 410B and score 420B are the same data as persona name 210B and score 250B in persona display 200B, as shown in FIG. 23 and previously discussed in detail.

Existing customer regions 430B may comprise a list of geographic regions and the number of existing customers within the displayed persona 410B associated with each region. This data may be stored in storage units 110B-123B, in data storage unit 136B in user terminal 140B, or in data storage unit 154B in web client 150B. Existing customer regions 430B may be determined by relationship analysis module 128B or grouping module 124B.

Potential customer regions 440B may comprise a list of geographic regions and the number of potential clients within the displayed persona 410B associated with each region. This data may be stored in storage units 110B-123B, in data storage unit 136B in user terminal 140B, or in data storage unit 154B in web client 150B. Potential customer regions 430B may be determined by relationship analysis module 128B or grouping module 124B.

Map 450B comprises a map of a geographic region where existing or potential customers reside, are likely to make purchases from, work, etc. Map 450B may be a broad geographic region (i.e. country, continent) or may be a narrower geographic region (i.e. state, county, city, neighborhood). Specific geographic regions where existing or potential customers reside may also be displayed within a broader geographic region, and may be displayed as circles around specific geographic regions on map 450B. Further, the user may be able to zoom in on a specific location, for example by reverse pinching, using a slider or a scroll wheel, or by selecting a specific circle or specific region on map 450B. In some embodiments, the circles or specific regions may be color-coded to represent personas. Each circle may represent a single persona. Therefore, this display may be configured to display multiple personas on the same map 450B. Further, arch circle may have multiple colors, representing various personas that are found in each location. In some of these embodiments, the colors may be represented as segments of a pie chart.

Maps of alternate geographic regions 460B may also be displayed. Alternate maps 560B may show different geographic regions from across the globe where individuals within the displayed persona 410B may also reside. By selecting one of these alternate geographic regions, the user may change the map 450B displayed. In some embodiments, if there is an issue or pattern which the user should be alerted of, within a region in an alternate map 460B the alternate map 460B may glow and/or blink to indicate to the user that he or she may wish to select an alternate region 460B.

Figure 26:
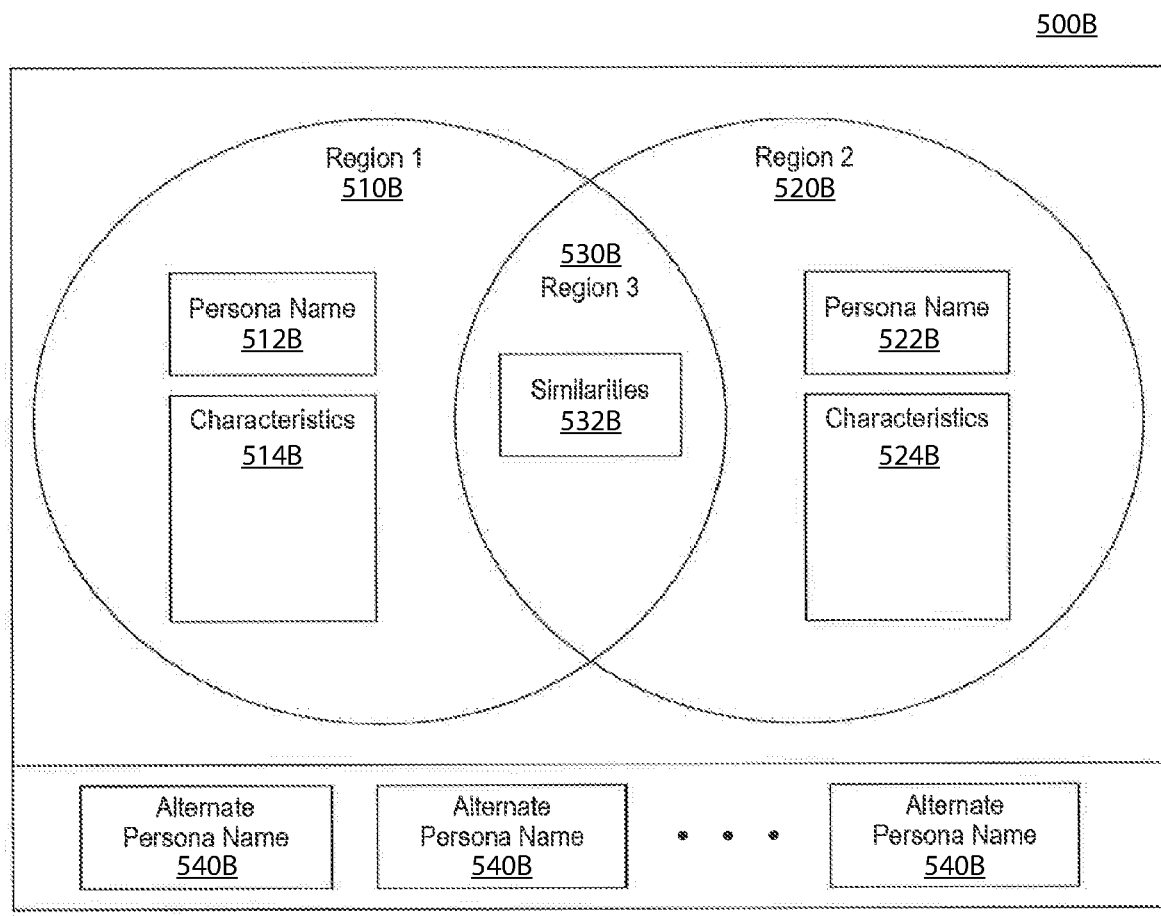
FIG. 26 is an exemplary relationship display.

FIG. 26 shows an exemplary relationship display 500B. Exemplary relationship display 500B displays data about two or more personas and displays the similarities between them. Exemplary relationship display 500B may include at least two persona names 512B 522B, at least three regions 510B 520B 530B, and alternate persona names 540B.

Region one 510B displays one persona name 512B and the characteristics 514B associated with persona name 512B. The characteristics 514B may be stored in characteristic storage unit 1101B, data storage unit 136B in user terminal 140B, or data storage unit 154B in web client 150B. Processing module 104B, processor 141B in user terminal 140B, or processor 151B in web client 150B determine which characteristics are associated with persona name 512B. Region one 510B may be displayed as a circle, but could also be any other geometric shape.

Region two 520B displays a second persona name 522B and the characteristics 524B associated with persona 522B. The characteristics 524B may be stored in characteristic storage unit 110B, data storage unit 136B in user terminal 140B, or data storage unit 154B in web client 150B. Processing module 104B, processor 141B in user terminal 140B, or processor 151B in web client 150B determine which characteristics are associated with persona 522B. Region two 520B may be displayed as a circle, but could also be any other geometric shape.

Regions one 510B and two 520B, may be displayed as a Venn Diagram, so that an overlapping region three 530B is created by the overlap. Region three 530B may display common information such as similarities 532B between the displayed personas 512B 522B. Similarities 532B may comprise any type of similarities between the two regions, for example the characteristics that are exhibited by both personas 512B 522B. Pattern recognition module 126B may determine the similarities between the displayed personas 512B 522B. The similarities 532B displayed in region three 530B may be displayed as an integer value (i.e. "4 Similarities"). Alternatively, the similarities 532B may be displayed as the actual characteristics that are shared by both displayed persona. In another example, region three 530B may display the number of individuals, or actual individuals, that may be existing customers, potential new customers, or both, that have been, are, or have a strong likelihood of being grouped into both the displayed personas. Grouping module 124B, for example, may determine the number of individuals that have been, are, or have a strong likelihood of being grouped into both the displayed personas.

Alternate personas 540B may also be displayed in the relationship display 500B. Alternate personas 540B may be selected by the user to replace either persona 512B or persona 522B, or may be selected to add an additional persona to the display. Alternate personas 540B may glow or blink in order to identify that there may be significant relationships between the information currently displayed with respect to the selected persona and the information that would be displayed if the user chose the glowing or blinking persona. Significant relationships may be determined by the relationship analysis module 128B within the analysis server 101B based on the data stored in storage units 110B-123B. Glowing or blinking alternate personas 540B prevent a user from wasting time trying to find relationships that may or may not exist between personas and the information that is associated with respect to such personas.

Figure 27:
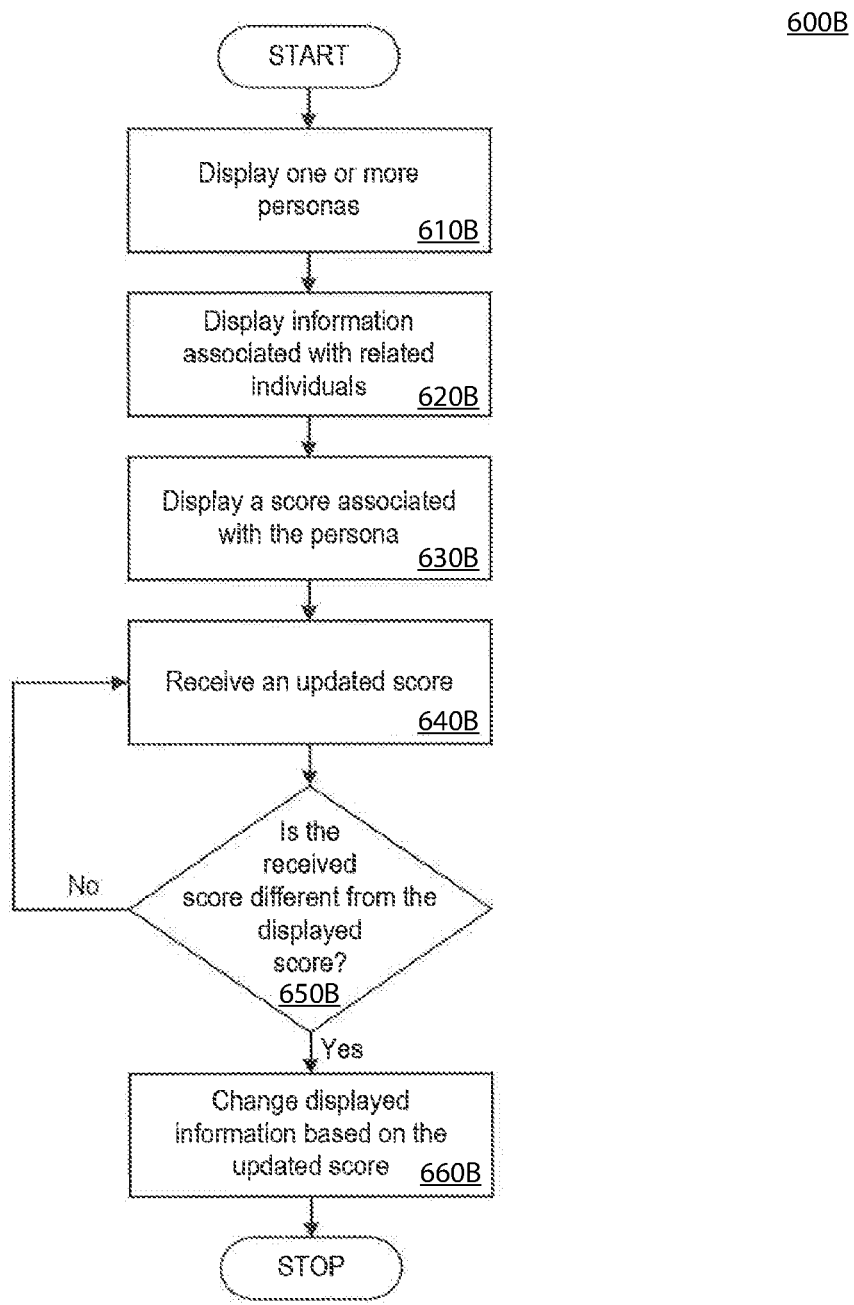
FIG. 27 is a flowchart of an exemplary method for displaying data.

FIG. 27 is a flowchart of an exemplary method for viewing a persona 600B. The exemplary method 600B may be performed by a computer processor executing instructions encoded on a computer-readable medium storage device. The method may be implemented in system 100B shown in FIG. 22. For example, the method may be implemented in the visualization module 108B, in user terminal 140B, or in web client 150B.

In step 610B, a system may display one or more personas. For example, the interface display shown in FIG. 23.

In step 620B, the system may display information associated with related individuals. For example, FIG. 23 shows an exemplary user interface displaying characteristics 2908, products and services 240B, potential customers 260B, communication options 270B, and geographic regions 280B related to the displayed persona. Also displayed with respect to the persona may be the number of existing customers and/or the number of potential customers within the persona.

In step 630B, the system may display a score associated with the persona. The score may reflect the propensity (e.g., an average propensity) of the individuals who fit within that persona to become a customer or to otherwise take the action desired by the business, such as purchasing products or services, as discussed in detail previously. The score may be displayed as shown in FIG. 23.

In step 640B, the system may receive an updated score. Step 650B determines whether the score received in step 640B is different than the score that is presently being displayed. If the received score is different than the presently displayed score, step 660B updates the displayed score to reflect the received score. Steps 640B, 650B, and 660B may be repeated to accommodate multiple score updates as requested by the user. The user may request score updates through the user input device 139B of the user input terminal 640B, through the web client 650B, or through the selection module 132B.

In step 660B, the system may change the displayed information based upon the updated score. For example, the displayed information may be updated to only show the information relevant to the individuals within the persona who meet the updated score criteria.

Figure 28:
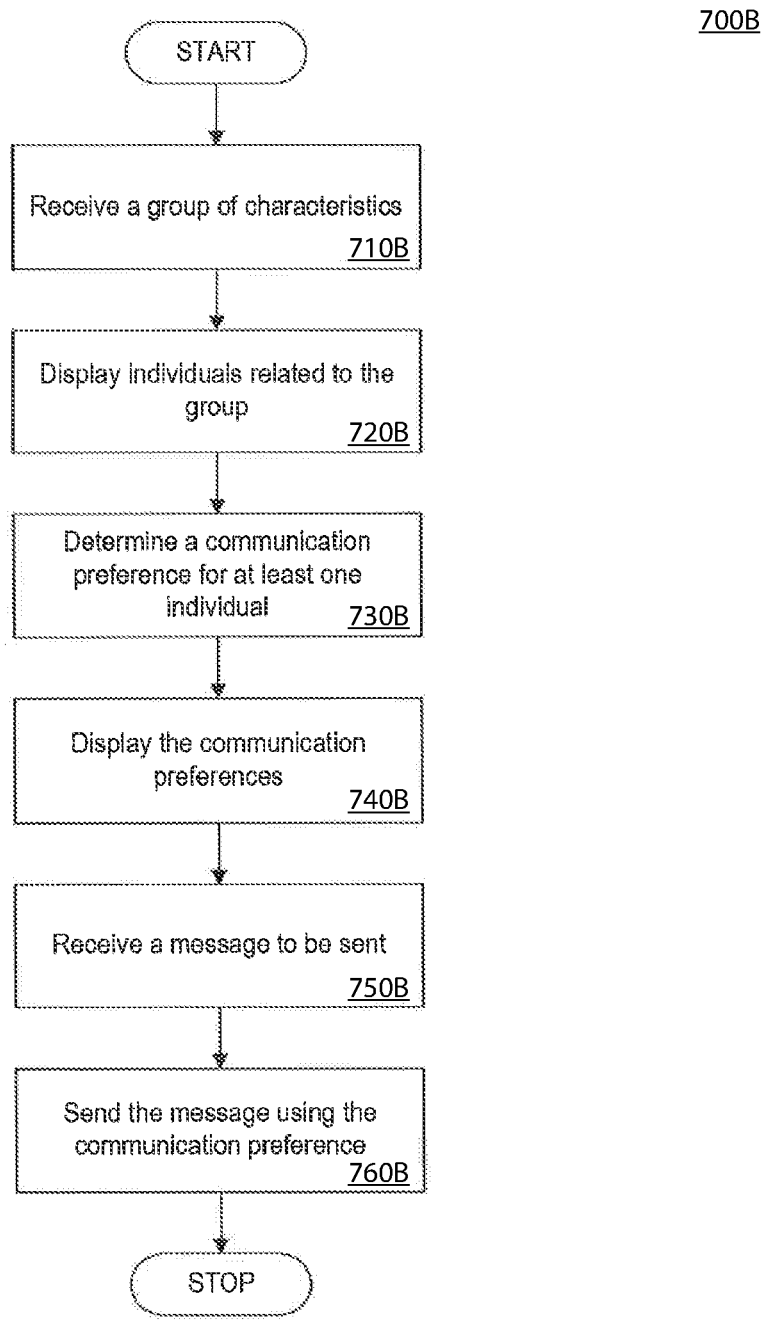
FIG. 28 is a flowchart of an exemplary method for communicating with individuals.

FIG. 28 is a flowchart of an exemplary method for communicating with individuals 700B. The exemplary method 700B may be performed by a computer processor executing instructions encoded on a computer-readable medium storage device. The method 700B may be implemented in system 100B shown in FIG. 22. For example, the method may be implemented in the visualization module 108B, in user terminal 140B, or in web client 150B.

In step 710B, the system may receive a group of characteristics. Grouping module 124B may configure the group of characteristics. The group of characteristics may be received by the analysis server 101B from data sources 144B. The group of characteristics may also be received by the user terminal 140B or web client 150B from the characteristic storage unit 110B within the analysis server 101B.

In step 720B, the system may display the individuals related to the group of characteristics. The relationship analysis module 128B may determine which individuals are related to the particular group of characteristics. The data may be displayed by the user interface, as discussed previously.

In step 730B, the system may determine a communication preference for at least one individual. This determination may be made by the processing module 104B, or by processors 141B or 151B in the user terminal 140B or web client 150B, respectively. The communication preference related to the at least one individual may be stored in storage units 110B-123B within the analysis server, or may be stored in data storage units 136B or 154B in the user terminal 140B or web client 150B, respectively.

In step 740B, the system may display the communication preference or preferences for the at least one selected individual. The communication preference or preferences may include, for example, email, SMS, MMS, phone, RMS, postal mail, or social media platforms such as Facebook, Twitter, or LinkedIn. The communication preferences may reflect the selected individual's preferred method of communication.

In step 750B, the system may receive a message to be sent. The message may be input by the user, for example using the user input device 139B. As shown in FIG. 24, the message may be entered into a message box or text box.

In step 760B, the system may send the message using the communication preference. If more than one communication preference is determined for the individual, the user may select the desired communication preference for sending the message. Once the user makes a selection, the system may then automatically create an RSS feed, JSON file, CSV file, or other necessary file of each individual and his/her respective email address, Twitter handle, or mailing address and feed that information directly into user's marketing platform, such as Eloqua, Constant Contacts, Mail Chimp, Twilio, or any other similar platforms. If these or similar platforms are not used, then the user may send a message directly to the individual using the selected preference. In some embodiments, if more than one communication preference is determined, the communication preferences may be ranked (e.g., in order of most likely to be effective to least), for each message recipient. In this embodiment, the system may only communicate with each individual using the highest ranked preference.

Figure 29:
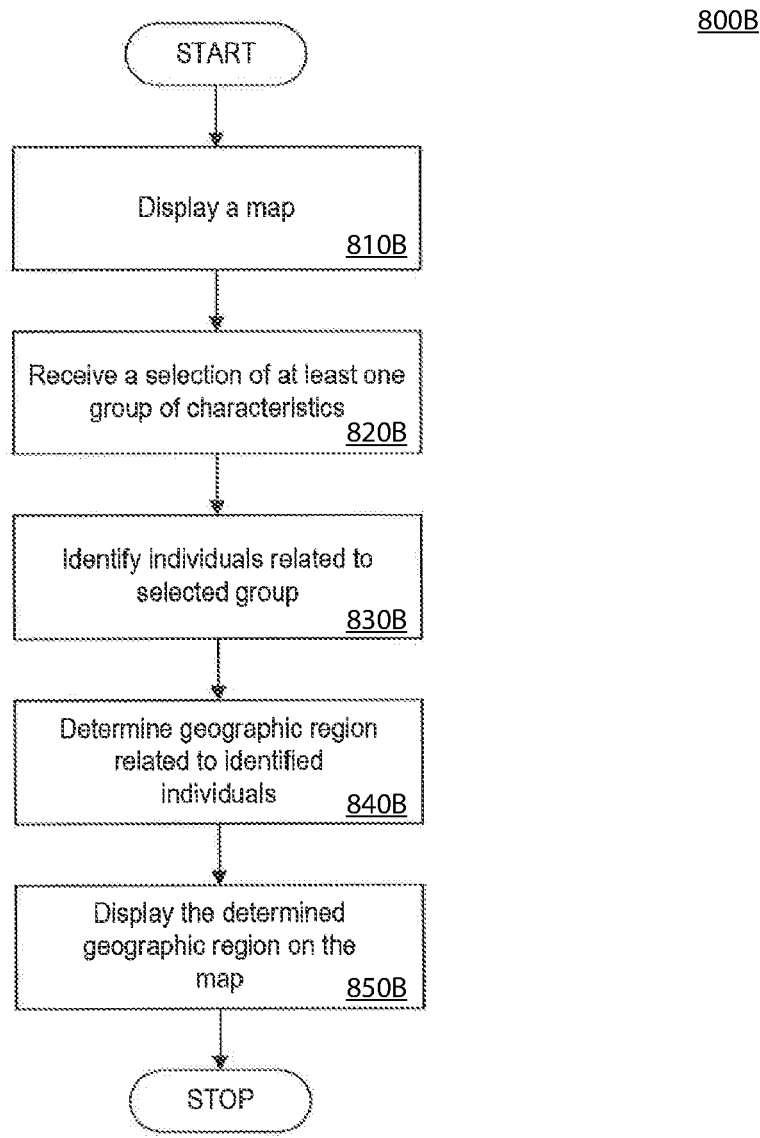
FIG. 29 is a flowchart of an exemplary method for displaying geographic regions related to personas.

FIG. 29 is a flowchart of an exemplary embodiment of a method for displaying geographic regions 800B. The exemplary method 800B may be performed by a computer processor executing instructions encoded on a computer-readable medium storage device. The method 800B may be implemented in system 100B shown in FIG. 22. For example, the method may be implemented in the visualization module 108B, in user terminal 140B, or in web client 150B.

In step 810B, the system may display a map. In some embodiments, the user may select a geographic location that may be displayed on a persona display, as shown in FIG. 23, in order to prompt the system to display a map. Alternatively, the map that is displayed in step 810B may be that which is most relevant to the user. For example, if the user generally focuses on a specific region, then a map of that region may load initially upon entering the geography view. Data indicating which region a particular user may focus on may be stored, for example, in data storage unit 136B on user terminal 140B or in data storage unit 154B in web client 150B. Alternatively, if the user generally focuses on a specific persona, then a map of the geographic region with information most pertinent to the persona may be displayed in step 810B. Data indicating which persona a particular user may focus on may be stored, for example, in data storage unit 136B on user terminal 140B or in data storage unit 154B in web client 150B.

In step 820B, the system may receive a selection of at least one group of characteristics. The group of characteristics may be characteristics related to a persona. The characteristics related to a persona may be stored, for example, in characteristic storage unit 110B, and accessed by processing unit 104B.

In step 830B, the system may identify individuals related to the selected group. Data indicating which individuals are related to the selected group of characteristics may be stored, for example, in individual descriptor storage unit 114B or in characteristic storage unit 110B. This data may be accessed and analyzed by processing module 104B, and more specifically by relationship analysis module 128B, to determine which individuals are related to the group of characteristics.

In step 840B, the system may determine the geographic region related to the identified individuals. Data indicating which individuals are related to the selected group of characteristics may be stored, for example, in individual descriptor storage unit 114B or in characteristic storage unit 110B. This data may be accessed and analyzed by processing module 104B.

In step 850B, the system may display the determined geographic region on the map. The determined geographic region may be displayed as circles around specific geographic regions on the map displayed in step 810B. Further, the user may be able to zoom in on a specific location, for example by reverse pinching, using a slider or a scroll wheel, or by selecting a specific circle or specific region on map. In some embodiments, the circles or specific regions may be color-coded to represent groups of characteristics. Each circle may represent a single group. Therefore, this display may be configured to display multiple groups on the same map. In additional embodiments, each circle may have multiple colors, representing various groups that are found in each location.

Figure 30:
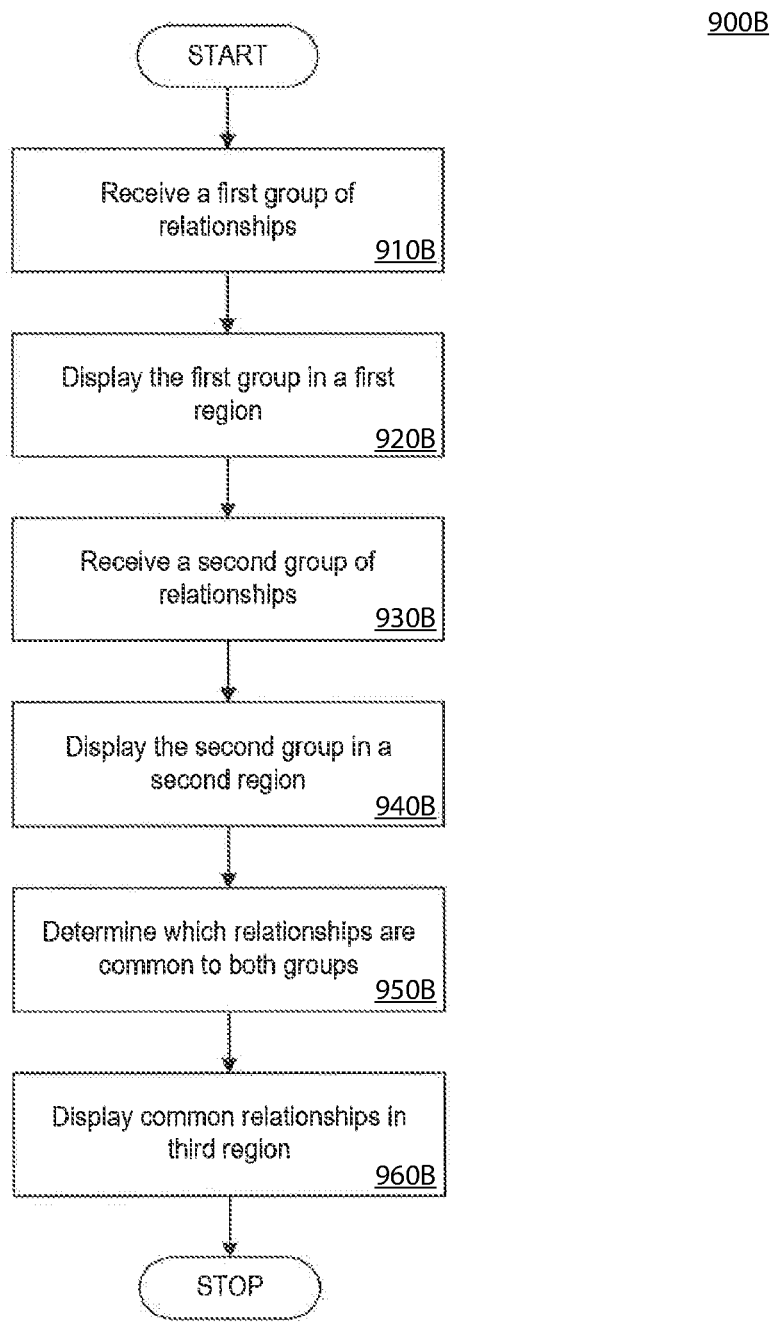
FIG. 30 is a flowchart of an exemplary method for displaying relationships between personas.

FIG. 30 is a flowchart of an exemplary method for viewing relationships 900B. The exemplary method 900B may be performed by a computer processor executing instructions encoded on a computer-readable medium storage device. The method 1000B may be implemented in system 100B shown in FIG. 22. For example, the method may be implemented in the visualization module 108B, in user terminal 140B, or in web client 150B.

In step 910B, the system may receive a first group. The group may be, for example, a group of relationships, a persona, a group of individuals, or a group of characteristics. The received group may be stored, for example, in characteristic storage unit 110B or persona storage unit 123B. This information may be accessed and supplied by processing module 104B.

In step 920B, the system may display the first group in a first region. The first region may be a circle, but could also be any other geometric shape.

In step 930B, the system may receive a second group. The second group may be, for example, a group of relationships, a persona, a group of individuals, or a group of characteristics. The second group may be stored, for example, in characteristic storage unit 110B or persona storage unit 123B. This information may be accessed and supplied by processing module 104B.

In step 940B, the system may display the second group in a second region. The second region may be a circle, but could also be any other geometric shape.

In step 950B, the system may determine items that are common or related to both groups. The common items may, for example, comprise the relationships that are exhibited by both the groups displayed in regions one and two. Pattern recognition module 126B or relationship analysis module 128B, for example, may determine the common items to be displayed in region three.

In step 960B, the system may display the common items in a third region. The first and second regions may be displayed as a Venn Diagram, so that the third region is created by the overlap. An exemplary display is shown in FIG. 26, discussed in detail above.

Figure 31:
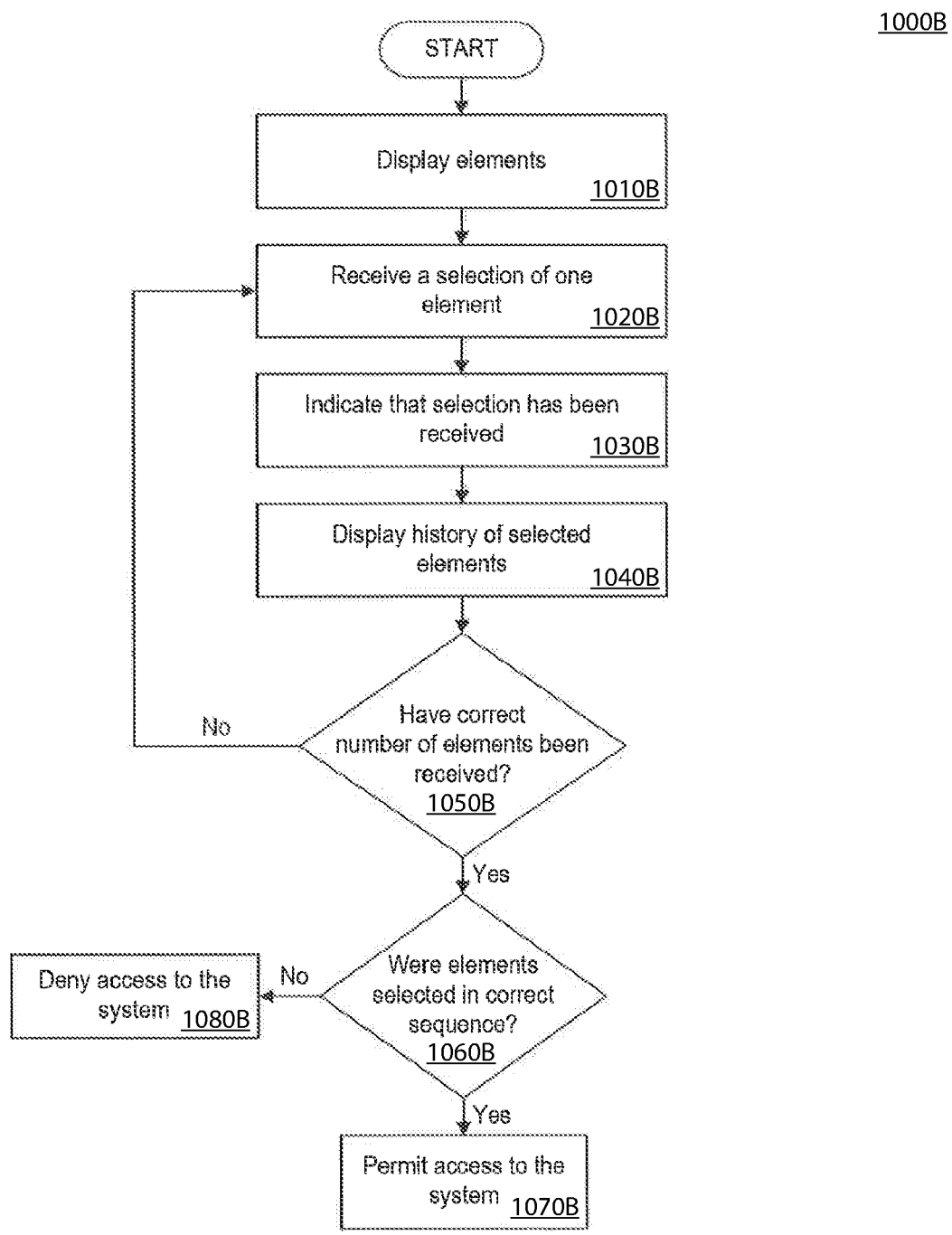
FIG. 31 is a flowchart of an exemplary method for allowing users access to a secured system.

FIG. 31 is a flowchart of an exemplary method for allowing users access to a secured system 1000B. The exemplary method 1000B may be performed by a computer processor executing instructions encoded on a computer-readable medium storage device. The method 1000B may be implemented in system 100B shown in FIG. 22. For example, the method may be implemented in the visualization module 108B, in user terminal 140B, or in web client 150B. Method 1000B may be implemented, for example, on analysis server 101B, user terminal 140B, or web clients 150B to allow a user access to system 100B.

In step 1010B, the system may display elements. The elements may be letters, numbers, images, and/or colors. In one embodiment, the elements may be large, easy-to-read, and easy-to-select icons.

In step 1020B, the system may receive a selection of one element. The selection may be made by the user, for example, by using the user input device 139B.

In step 1030B, the system may indicate that the selection has been received. The selection may be indicated by immediately, and for a somewhat lengthy period of time, flashing a bright color. The bright and lengthy flash may allow the user to easily identify which element has been selected. This visual indication may be displayed, for example, on display unit 138B. Additionally, an auditory indication may be given to the user. The auditory indication may be a signal or tone.

In step 1040B, the system may display a history of the selected elements. In some embodiments, the history may be placed at the bottom of the screen, or in another reserved location. The history of selected elements may make it easier for the user to identify which element has been selected. The history of selected elements may show how many elements need to be selected, and also show how many elements have been selected so far.

Step 1050B tests whether the correct number of selected elements has been received by the system. If the correct number of selected elements has been received, step 1060B then tests if the selected elements were entered in the correct sequence. If the correct number of selected elements has been received in the correct sequence, the system may then allow access to the user. If the correct number of selected elements has not been received, the system repeats beginning at step 1020B, and receiving an additional selection of one element. If the correct number of selected elements has been received, but the elements were not selected in the correct sequence, in step 1080B, the system may deny the user access.

The present disclosure of a method for accessing a secured system may be easier on the user's eyes. It may make it easier for the user to select each element as a result of its size. The combination of elements may also be easier for a user to remember, while still maintaining necessary security standards, by using a pattern that results from a combination of number, letters, images, and colors. The present disclosure may also remove the username requirement.

In some examples some none or all of the logic for the above-described techniques may be implemented as a computer program or application or as a plug-in module or sub component of another application. The described techniques may be varied and are not limited to the examples or descriptions provided. In some examples applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

It is intended, therefore, that the specification and examples be considered as exemplary only. Additional embodiments are within the purview of the present disclosure and sample claims.

Section III

This section relates generally to the assisted onboarding of complex datasets. More specifically, example embodiments relate to graphical user interfaces configured for creating scripts that onboard multiple complex datasets into a cohesive single dataset used for predictive analytics.
Background There is a growing trend among companies to use large quantities of information collected about customers and consumers. For example, such information may be analyzed to increase sales, through more efficient advertising. Companies advertise products online in a variety of different ways, including websites (e.g., social. media site, search engines, news sites), social media sites (e.g., Facebook, Twitter, instagram, LinkedIn, Pinterest, Tumblr, flickr, meetup), and online marketing platforms (e.g., Constant Contact, AWeber, Benchmark, BigHip, Boomerang, Compaigner, iContact, MailChimp). The focus of most companies is usually increasing sales or visibility of the company, by utilizing one or more of the aforementioned internet resources. However, these resources also generate a lot of information that can be used to learn more about the people who visit these sites, and the types of products that they may or may not be interested in purchasing.

Predictive analytics may be used to identify relationships and trends from this collected information. However, this collected information may be widely dispersed within an organization. As a non-limiting example, resources may store information in differing formats, schemas, field names, and values. Consequently, processing the stored information into a useable form may require significant time and effort. As a result, there is a need for systems and method for assisting in the processing of such data into a system for analysis.
Summary The disclosed embodiments may include systems, computer-implemented. methods, and non-transitory computer-readable media are provided for on-boarding client data received from multiple information sources. These systems, methods, and media may include a graphical user interface that receives metadata concerning information from one or more information sources. Instructions may be provided using the graphical user interface for mapping the information onto a schema of a trait-based modeling system. These instructions may be used to generate a script for onboarding the client data. The script may be provided to a server, which may execute the script, causing the resulting information to be provided to a trait-based modeling system to optimize a field in the schema of the trait-based modeling system.

The disclosed embodiments may include, for example, a computer-implemented method for onboarding information received from information sources. The method may include receiving metadata on information received from one or more information sources. The method may include receiving instructions for mapping the information onto a schema of a trait-based modeling system, generating a script based on the received instructions, and providing the script for execution. Execution of the script may generate information for provision to the trait-based modeling system. The trait-based modeling system may use the generated information to optimize a field in the schema of the trait-based modeling system.

The disclosed embodiments may include providing for concurrent display a first representation of the schema and a first representation of the metadata. The first representation of the schema may include objects representing fields of the trait-based modeling system displayed in an expandable list format, and the first representation of the metadata may include objects representing databases in the received information. The databased may be displayed in an array. In certain aspects, the disclosed. embodiments may include receiving a user selection of one of the databases in the received information, and responsive to the user selection, providing for display a second representation of the metadata. Receiving instructions may include receiving a user association between the first representation of the schema and the second representation of the metadata.

In certain aspects, the second representation of the metadata may include elements representing fields of the selected database, and the user association may include the user selection of a field of the trait based modeling system, and a field of the selected database. In some aspects, the objects representing databases in the received information may include an indication of a quality of the database. In various aspects, the elements representing the fields of the selected database may include i) at least one indication of the content of the field, and ii) an indication of a quality of the field. In some aspects, generating a script may include generating a script to optimize the selected field using the trait-based modeling system. In certain aspects, generating a script may include generating a script to perform natural language processing on the contents of the selected field using the trait-based modeling system.

The disclosed embodiments may further include providing for display a first representation of the schema including objects representing fields of the trait-based modeling system displayed in an expandable list format. The disclosed embodiments may also further include receiving a user selection of an object in the first representation representing a first field of the trait-based modeling system, and responsive to the user selection, providing for display a first representation of the metadata including at least one indication of the relevance of the metadata to the first field of the trait-based modeling system.

The disclosed embodiments may further include providing for display a representation of the metadata comprising elements representing fields of a database in the received information. In certain aspects, the disclosed embodiments may also further include receiving a user selection of a field of the database to filter. In various aspects, the disclosed embodiments may also include, responsive to the user selection, providing for display filtering options based on the contents of the selected field and receiving user instructions for filtering the selected field based on the filtering options. Generating a script may include generating a script to filter the selected field of the database.

The disclosed embodiments may further include providing for display a first representation of the metadata including elements representing fields of a first database in the received information. In certain aspects, the disclosed embodiments may also include receiving a user selection of a field of the first database as a first merger field. In various aspects, the disclosed embodiments may further include providing for display a second representation of the metadata comprising elements representing fields of a second database in the received information, responsive to the user selection of the first merger field. In some aspects, disclosed embodiments may include receiving a user selection of a second field in the second database as a second merger field corresponding to the first merger field, and responsive to the user selection of the second merger field, providing for display an indication of a connection between the first database and the second database. Generating a script may include generating a script to create a third database by merging the first database and the second database by the first merger field and the second merger field. In certain aspects, the second representation of the metadata indicates suitable merger fields, based on the selection of the first merger field.

The disclosed embodiments may further include providing for display a first representation of the metadata including elements representing fields of a first database in the received information. In certain aspects, the disclosed embodiments may include receiving a user selection of at least one first field in the first database, providing first prescriptive metric options based on the contents of the selected at least one first field, and receiving first instructions for creating the prescriptive metric responsive to the first prescriptive metric options. Generating a script may include generating a script to create the prescriptive metric based on the first instructions and to include the prescriptive metric in the resulting information provided to the trait-based modeling system.

The disclosed embodiments may further include providing for display a second representation of the metadata comprising elements representing fields of a second database in the received information. In certain aspects, the disclosed embodiments may include receiving a user selection of at least one second field in the second database, providing second prescriptive metric options based on the contents of the at least one selected second field, and receiving second instructions for creating the prescriptive metric responsive to the second prescriptive metric options. Generating a script to create the prescriptive metric based on the first instructions may include generating the script to create a prescriptive metric based on the first instructions and the second instructions.

The disclosed embodiments may further include providing for display a list of supplementary sources of information and receiving a user selection of at least one supplementary source of information. Generating a script may include generating a script to include the selected at least one supplementary source of information in the resulting information provided to the trait-based modeling system.

It is to be understood that both the foregoing general description and the following detailed description are exemplary and explanatory only and are not restrictive of the disclosed embodiments, as claimed.

Detailed Description

Reference will now be made in detail to exemplary embodiments, which are illustrated in the accompanying drawings. Wherever possible, the same reference numbers will be used throughout the drawings to refer to the same or like parts. It is apparent, however that the embodiments shown in the accompanying drawings are not limiting, and that modifications may be made without departing from the spirit and scope of the present disclosure.

Exemplary System

Figure 32:
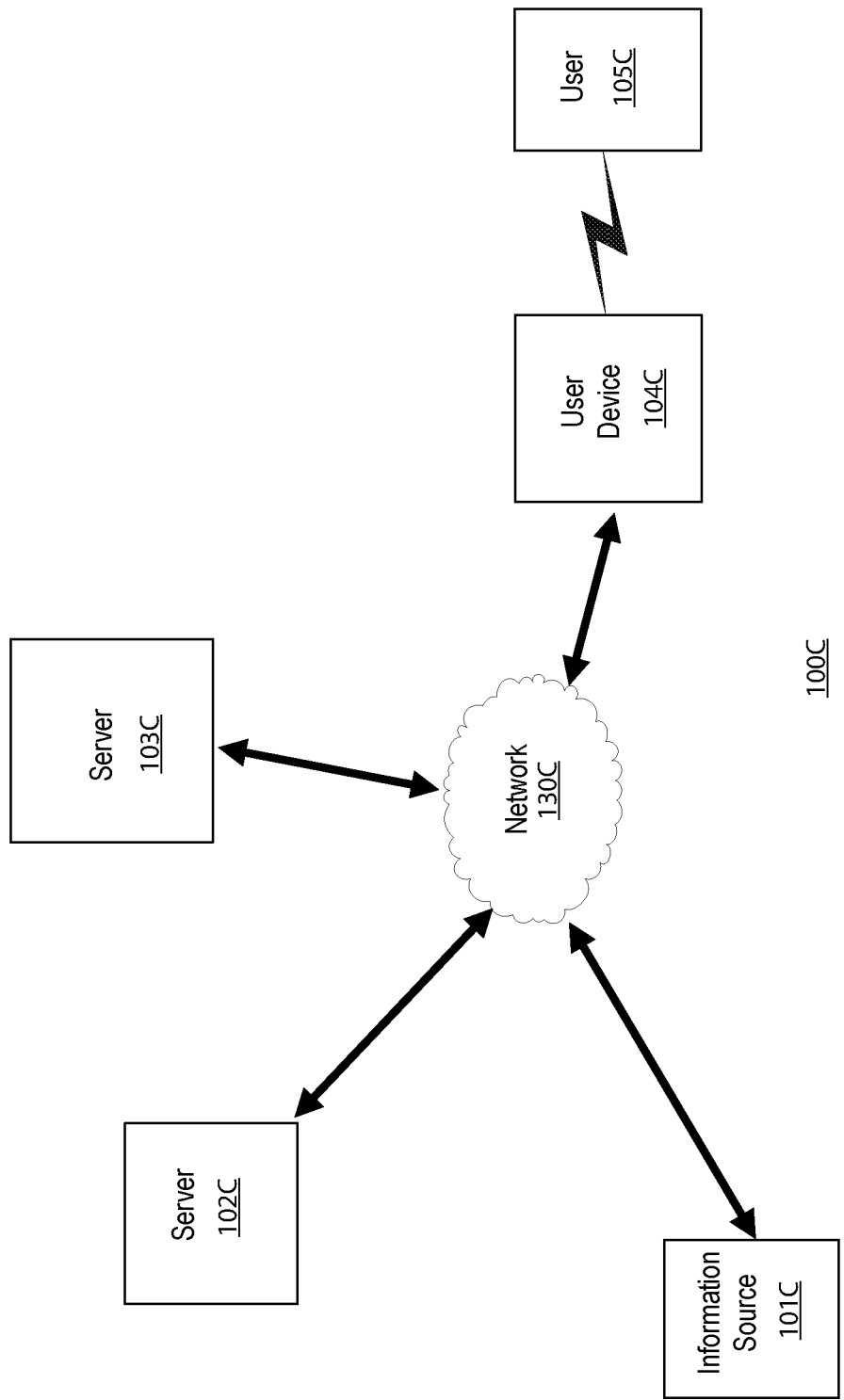
FIG. 32 depicts an exemplary system consistent with an embodiment of this disclosure.

According to some embodiments, the system and methods consistent with this disclosure provide a system for onboarding client data. FIG. 32, for example, depicts an exemplary system 100C consistent with an embodiment of this disclosure. In system 100C, one or more information sources 101C may provide information over network 130C to a server 102C that stores data for an entity (e. g., a client, business, agency, organization, etc.). This information may be provided over network 130C and may come in a variety of forms. For example, the information may include one or more of the following: a response to an application program interface (API) request, spreadsheets, text files, reports, website analytics, sales data, social media data, customer databases, tables, user profiles, etc. Server 102C may include one or more applications that automatically break the provided information into tables. For example, the server 102C may use artificial intelligence to classify the information into categories and/or sub-categories.

Figure 33:
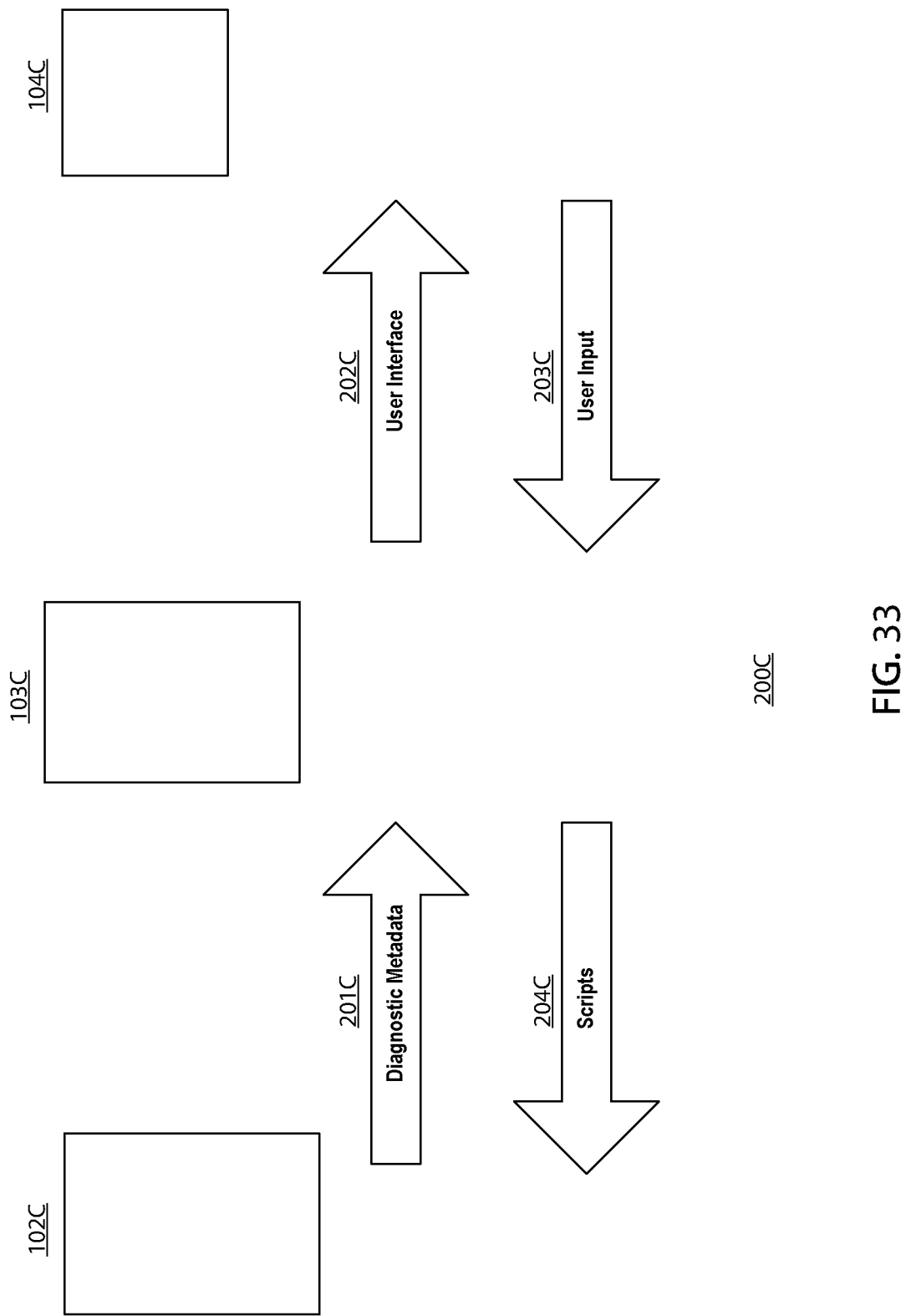
FIG. 33 depicts an exemplary flow of information between components consistent with an embodiment of this disclosure.

In an embodiment, server 102C may include one or more applications or scripts that generate metadata from the provided information. For example, the application or script may generate metadata about the type, structure, content, and/or attributes of the provided information. As shown in element 201C of FIG. 33, the diagnostic metadata may be provided to a server 103C for conducting the on-boarding or mapping process, which will be discussed in further detail below.

Server 103C may include one or more applications for conducting the on hoarding or mapping process. For example, server 103C may contain, or be connected to, one or more web servers that, as shown in element 202C, provide instructions for generating a user interface to a user device 104C. The user device 104C may include, for example, one or more of a personal computer, laptop, tablet, smartphone, mobile device. The user device 104C may include one or more of a processor, a memory, computer readable storage medium, a display, and user interfaces. The user device 104C may include a web browser that generates a user interface based on the instructions from the one or more web servers.

A display of user device 104C may present the user interface to a user 105C. The user interface may be designed to interact with user 105C to conduct an on-boarding or data mapping process. The user 105C may provide user input using the user interface, and the user device 104C may present the user input, as shown in element 203C, to server 103C. Server 103C may use the user input to generate one or more scripts for processing the information stored (or to be stored) in server 102C. As shown in element 204C, these scripts may be provided by server 103C to server 102C. Server 102C may then execute the scripts to complete the on-boarding or mapping process. If the one or more information sources 101C provide additional information, server 102C may use instructions from the scripts to process (e.g., filter) the additional information as it is received. These scripts may improve the stored information in one or more of the following ways: (i) the scripts may identify relationships between one or more data fields; (ii) the scripts may join data from multiple sources; (iii) the scripts may filter data; and (iv) the scripts may instruct a cleansing routine to be performed on information that remains after the scripts are processed.

In one embodiment, the information stored in server 102C may be used by a trait-based system for identifying, visualizing, predicting, and optimizing relationships between a company's objectives and a company's existing and potential customer base. To this end, the trait-based system may define a number of traits. As used herein, the term trait may refer broadly to any attribute, characteristic, value, or other factor associated with an individual or group of individuals. The detailed description below provides further examples of such traits.

For example, when receiving information about an individual, the trait-based system 100C may comprise a relationship-determining component, implemented in software, hardware, firmware, or a combination of the three. The relationship-determining component may comprise relationship-determining algorithms that may determine correlations, between the information collected about an individual and traits that the individual may or may not have. These correlations may be described using a numerical value, textual identifier, graphical icon, color, opacity, or other suitable method of representing the relationship. The correlations may represent how strongly the information is related to the traits, including the lack of any relationship at all. The relationship may also be identified as positive, negative, or neutral. The term "positive" may broadly refer to a relationship where the existence of, or a change in, one member of the relationship corresponds to a similar existence of or a similar change in, the other members. The term "negative" may broadly refer to a relationship where the existence of, or a change in one member of the relationship corresponds to a lack of the existence of, or an inverse change in, the other members. The term "neutral" may broadly refer to a relationship where the existence of, or a change in one member of the relationship does not correspond to any existence or change in the other members.

In some embodiments, the system 100C may also be configured to receive a metric, representing an overall goal or interest of a company. As used herein, the term metric broadly refers to any attribute, measurement, goal, strategy, or other information of interest. The metric may also consist of a number of sub-metrics. As used herein, the term sub-metric broadly refers to any attribute, measurement, goal, strategy, or other information related to the metric. For example, the system may use a relationship-determining component to identify relationships between one or more metrics and the traits of an individual. The system may also determine the relationship between groups of traits and the metric, and individuals and the metric. In this manner, the organization may gain information on how personality types or individuals contribute to a metric of interest.

The system 100C may also contain a visualization component that may be used to display the correlations between traits that an individual, or group of people, may or may not possess, and the information collected about that person or group of people.

All components of FIG. 32 may be disposed for communication with one another via electronic network 130C, which may comprise any form or combination of networks for supporting digital communication, including the Internet. Examples of such an electronic network include a local area network (LAN), a wireless LAN (e.g., a "WiFi" network), a wireless Metropolitan Area Network (MAN) that connects multiple wireless LANs, a wide area network (WAN) (e.g. the Internet), and/or a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, the electronic network may also include one or more mobile device networks, such as a 4G network, LTE network, GSM network or a PCS network, that allow a computing device or server system, to send and receive data via applicable communications protocols, including those described above.

The various components of the system of FIG. 32 may include an assembly of hardware, software, and/or firmware, including memory, a central processing unit ("CPU"), and/or a user interface configured to perform their disclosed function. For example, they may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. A CPU may include one or more processors for processing data according to a set of programmable instructions or software stored in memory. The functions of each processor may be provided by a single dedicated processor or by a plurality of processors. Moreover, the components may include any type or combination of input/output devices, such as a display monitor, keyboard, touch screen, and/or mouse.

Exemplary On-Boarding or Mapping Process

In one embodiment, a method for on-boarding or mapping information into a schema of another system (e.g., the trait-based system discussed above) is disclosed. The method or portions of the method, discussed below, may be repeated for each information source 101C. While discussed as a particular sequence of steps, a person of ordinary skill in the art would understand that the process could be performed by combining, removing, or reordering the steps.

Figure 34:
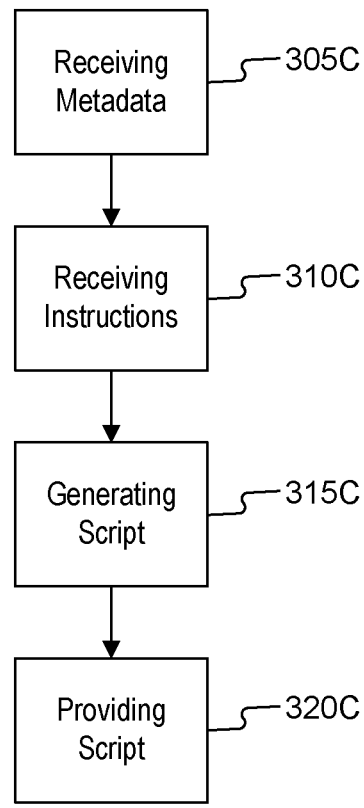
FIG. 34 depicts an exemplary process of on-hoarding or mapping information consistent with an embodiment of this disclosure.

FIG. 34 shows an exemplary method of generating or modifying a script to onboard client data consistent with disclosed embodiments. As discussed above, in the step of receiving metadata 305C, server 103C may receive from server 102C diagnostic metadata 201C. This diagnostic metadata may be generated by server 102C from information received by server 102C from information sources 101C. Server 103C may use diagnostic metadata 201C to generate a user interface 202C for on-boarding or mapping the information onto the schema of another system. In some embodiments, this system may be a trait-based modeling system.

The exemplary method may comprise a further step of receiving instructions 310C from the user device 104C. These instructions may be received in response to the generated user interface provided by server 103C. In some embodiments, these instructions may specify associations between fields of the trait-based modeling system and the received information. In other embodiments, these instructions may specify tables containing fields similar to an indicated a field of the trait-based modeling system. In another embodiment, these instructions may specify filtering of received information. These instructions may specify generation of a third table based on a first table and a second table in the received information in another embodiment. These instructions may specify generation of a prescriptive metric in another embodiment. In some embodiments, these instructions may specify provision of supplementary sources of information to the trait-based modeling system.

The method may comprise a step of presenting, on user device 104C, the user 105C with an option of implementing the instructions consistent with the disclosed embodiments. Server 103C may use these instructions to generate a script (step 315C). As discussed above, that script may then be sent to server 102C and executed on the information (step 320C). For example, the script may join information based on the mapping identified using the user interface. Running the script may also include running one or more cleansing processes on the resulting set of information. The resulting information may be provided by server 102C to the trait-based system for modeling. In some embodiments, this step may be completed without modifying the underlying information. These steps and further variations on these steps are described in greater detail below.

Figure 35:
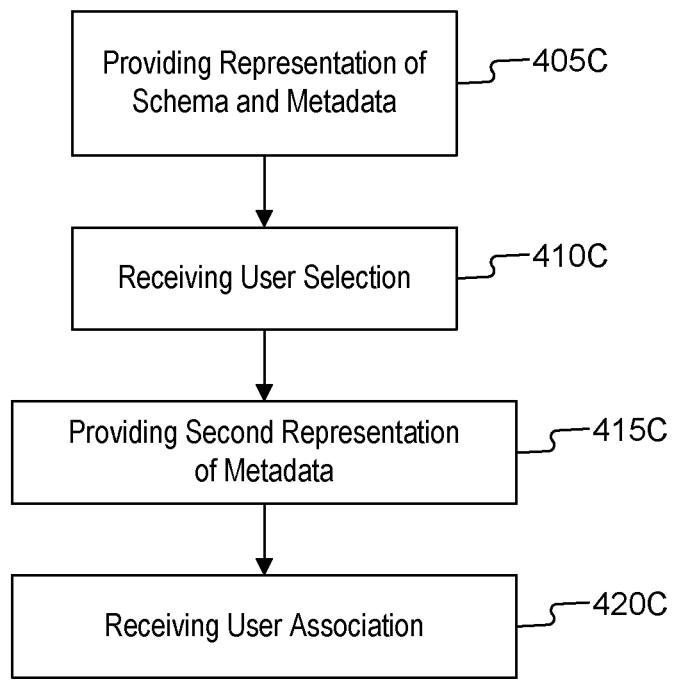
FIG. 35 depicts an exemplary method of providing concurrent display of the schema and the diagnostic metadata for on-boarding information consistent with disclosed embodiments.

FIG. 35 shows an exemplary method of on-boarding or mapping client data consistent with the disclosed embodiments. In some embodiments, this method comprises providing for concurrent display on the user device 104C multiple representations of data (step 405C). In such embodiments, the multiple representations may include a first representation of the schema of the trait-based modeling system. This first representation may comprise objects representing fields of the trait-based modeling system. These objects may be displayed in an expandable list format for convenient navigation by the user 105C. For example, objects corresponding to a first hierarchical level of the trait-based modeling system may be displayed, each object associated with a display control. In such an example, user selection of the display control associated with the object may cause the user interface to display a second hierarchical level of the trait-based modeling system. In a further example, user selection of a display control associated with an object in the second hierarchical level may cause the user interface to display a third hierarchical level of the trait-based modeling system, and so forth. In alternative embodiments, the user may select an object of the current hierarchical level corresponding to an element of the trait-based modeling system in order to map client data to that element. In some embodiments, the multiple representations may include a first representation of the diagnostic metadata 201C received from the server 102C. In such embodiments, this first representation of the metadata may comprise objects representing tables in the received information. This first representation of the metadata may be displayed concurrently with the first representation of the schema of the trait-based modeling system. In further such embodiments, these objects may be grouped by information source and displayed in an array. In additional embodiments, the objects representing tables in the received information may comprise indications of a quality of the table. For example, fields may be low quality if they are empty, incomplete, and/or contain data errors (e.g., a state field that contains zip codes).

This method may comprise the step 410C of receiving a user selection 203C consistent with disclosed embodiments. In some embodiments, user selection 203C may indicate an object in the first representation of the metadata. The selected object may correspond to a table in the received information.

This method may comprise the step 415C of providing for display on the user device 104C a second representation of metadata consistent with the disclosed embodiments. In some embodiments, this second representation may be provided for concurrent display with the first representation of the schema of the trait based modeling system. In such embodiments, this second representation may show fields in the selected table. In some embodiments, the second representation of the table is a matrix with a row for each field in the table. In these embodiments, the elements of the matrix may comprise at least one indication of the content of the field and an indication of the quality of the field. In some embodiments, such content indications may include matrix elements displaying additional metadata associated with the selected table. This additional metadata may include identifiers, datatypes, number of datapoints, and number of distinct datapoints for each field. Quality of a field may be indicated at least by one or more of the color, font, size, placement, or shape of at least one or more matrix elements. The second representation may include a mapping column for associating a field of the selected table and a field of the trait-based modeling system.

This method may comprise the step 420C of receiving a user association between a field of the selected table and a field of the trait-based modeling system. In some embodiments, this association may comprise indicating the trait of the trait-based modeling system and indicating the field of the selected table. In such embodiments, this indication may be effectuated through any number of user actions familiar to one of ordinary skill in the art. For example, as described above, user 105C may interact with user device 104C to indicate a field of the trait-based modeling system by pressing a keyboard key, clicking a mouse button, or gesturing on a touch-sensitive interface. User 105C may similarly interact with the user device 104C to indicate a field of the selected table. In some embodiments, a single user action may indicate both the field in the trait-based modeling system and the field of the selected table. For example, user 105C may tap and drag a representation of the indicated field of the trait-based modeling system from a first location to a second location of a touch-sensitive interface of user device 105C. In such embodiments, the first location may correspond to the field of the trait-based modeling system. The second location may correspond to an element of the matrix. In such embodiments, the column of this element may be the mapping column and the row may correspond to the selected field of the table.

This method may comprise the step of providing, for display on user device 104C, an indication of the association between the field of the trait-based modeling system and the field of the table consistent with disclosed embodiments. This indication may be provided in the matrix for the table. In some embodiments, this indication may be provided in the element of the mapping column corresponding to the indicated field of the selected table. For example, this element of the mapping column may be populated by the representation of the trait-based modeling system dragged from the expandable list.

As described above, this method may comprise a script generation step consistent with disclosed embodiments. In some embodiments, the server 103C may generate a script based on the instructions received from the user device 104C. In some embodiments, this script may specify the optimization of the selected field of the table using the trait-based modeling system. In other embodiments, this script may specify performing natural language processing on the content of the selected field using the trait-based modeling system. The schema for the trait-based modeling system may differentiate between content provided to a third party and content received from a third party. For example, the natural language processing may be performed on solicitations provided to third parties to identify effective language. As an additional example, natural language processing may be performed on complaints received from customers to identify weaknesses in customer service.

As described above with reference to FIG. 34, process 400C may comprise a provision step in which the server 103C provides the script to the server 102C. Server 102C may execute the script, generating resulting information for provision to the trait-based modeling system.

Figure 36:
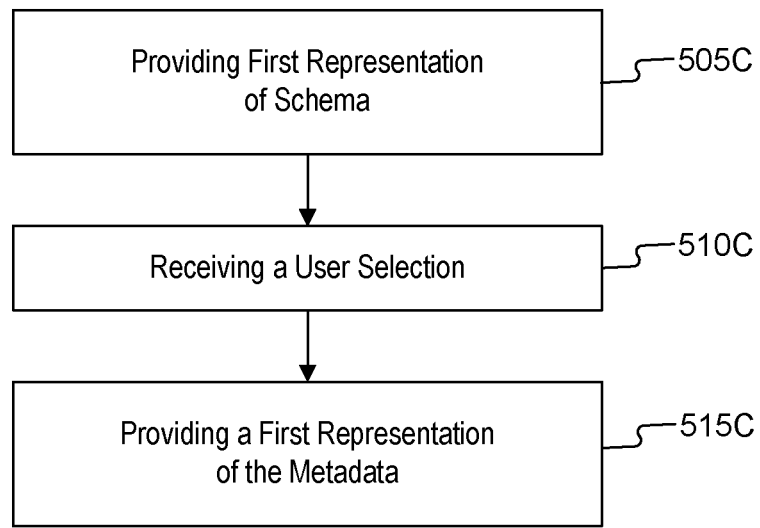
FIG. 36 depicts an exemplary method of indicating relevant client data consistent with the disclosed embodiments.

FIG. 36 shows an exemplary method of indicating relevant client data consistent with the disclosed embodiments. This method may comprise a step 505C of providing a first representation of the schema of the trait-based modeling system. User 105C may interact with the user device 104C using a control displayed on the user interface to instruct the server 103C to display on the user device 104C suitable data (step 510C). User 105C may also interact with the user device 104C to select a field in the schema of the trait-based modeling system. Responsive to the user selection 203C, server 103C may provide a first representation of the diagnostic metadata 201C (step 515C). This representation may include an indication of the relevance of the metadata. Such an indication may distinguish more relevant metadata from less relevant metadata in terms of color, font, size, or position. For example, server 103C may receive user selections 203C of the field "username" in the schema for the trait-based modeling system and the control labeled "Help me tag it." In this example, server 103C may provide for display by the user device 104C a first representation of the descriptive metadata 201C indicating the presence of "username" data in information received from multiple information sources. In some embodiments, the first representation may comprise objects corresponding to the tables in the received information. In such embodiments, the objects corresponding to tables containing "username" information may be colored differently from the other objects of the first representation. As a further example, the hue of the objects corresponding to relevant metadata may be the same as hue of the objects representing the selected field of the schema, while another color property, such as brightness or saturation, may vary according to a second characteristic of the relevant data, such as the quality of the relevant fields. In other embodiments, an icon may be displayed to indicate the relevance of the objects, such as a check mark or a plus sign.

Figure 37:
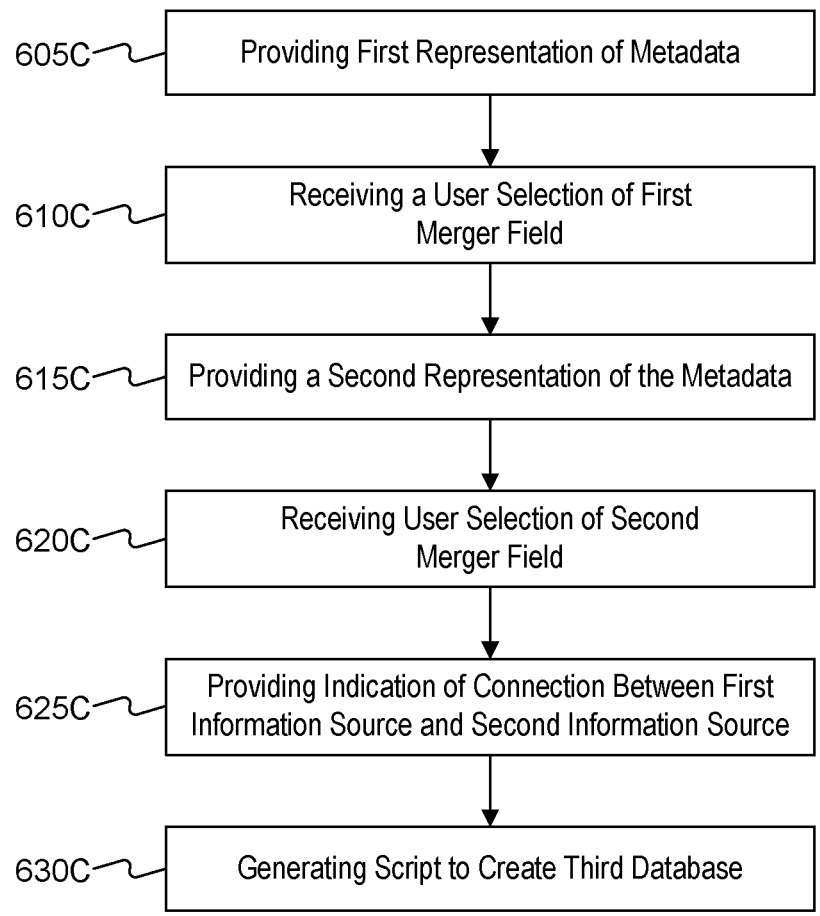
FIG. 37 depicts an exemplary method of generating or modifying a script to combine client data consistent with the disclosed embodiments.

FIG. 37 shows an exemplary method of generating or modifying a script to combine client data consistent with the disclosed embodiments. In some embodiments, the script generated may specify that the third table include the fields from the first database and the field from the second database combined according the values of the first merger field and the second merger fields. This method may include the step 605C of providing a first representation of the diagnostic metadata 201C for display on the user device 104C consistent with the disclosed embodiments. In some embodiments, this representation of the diagnostic metadata 201C may represent fields of a first table in the received information.

This method may further include the step 610C of receiving a user selection 203C of a first merger field. In some embodiments, this user selection may be effectuated through any number of user actions familiar to one of ordinary skill in the art. For example, user 105C may interact with user device 104C to indicate the first merger field by pressing a keyboard key, clicking a mouse button, or gesturing on a touch-sensitive interface.

This method may further include the step 615C of providing a second representation of the diagnostic metadata 201C for display on the user device 104C. In some embodiments, this representation of diagnostic metadata 201C may represent fields of a second table. In some embodiments, the second representation of the table is a matrix with a row for each field in the table. In these embodiments, the elements of the matrix may comprise at least one indication of the content of the field and an indication of the relevance of the field. In some embodiments, such content indications may include matrix elements displaying additional metadata associated with the selected table. This additional metadata may include identifiers, datatypes, number of datapoints, and number of distinct datapoints for each field. Relevance of a field may be indicated at least by one or more of the color, font, size, placement, or shape of at least one or more matrix elements. For example, rows of the matrix corresponding to relevant fields may be placed at the top of the matrix. In some embodiments, such rows may be further called out with icons, such as plus signs. The determination of relevance may be made according to artificial intelligence methods. The second representation may include a mapping column for associating the first merger field and a second merger field. User 105C may interact with the user device 104C to indicate a second merger field in the second table by any number of user actions familiar to one of ordinary skill in the art (step 620C). For example, user 105C may interact with user device 104C to indicate the first merger field by pressing a keyboard key, clicking a mouse button, or gesturing on a touch-sensitive interface. In some embodiments, the fields of the first table and the fields of the second table may be concurrently displayed. In such embodiments, a single user action may indicate both the first merger field of the first table and the second merger field of the second table. For example, user 105C may tap and drag a representation of the indicated field of the trait-based modeling system from a first location to a second location of a touch-sensitive interface of user device 105C. In such embodiments, the first location may correspond to the first merger field of the first table. The second location may correspond to an element of the matrix. In such embodiments, the column of this element may be the mapping column and the row may correspond to the selected second merger field of the second table.

This method may further comprise the step 625C of providing, for display on user device 104C, an indication of the relationship of the first table and the second table consistent with disclosed embodiments. In such embodiments, this indication may show that the script may specify the combination of the first table and the second table according to the values of the first merger field of the first table and second merger field of the second table. In some embodiments, this indication may be provided in the matrix for the second table. For example, the row of the mapping column corresponding to the merger field may include an indication of the combination, such as a field identifier for the first merger field. In other embodiments, the server 103C may provide user device 104C a third representation of diagnostic metadata 201C, indicating that the script will specify the combination of the first table and the second table. In such embodiments, the indication distinguishing the second table from tables not combined with the first table may include at least one of color, placement, or font, or the addition of an icon to the representation of the second table. For example, the third representation of the second table may include a check mark or plus sign to indicate that it will be combined with the first table.

As described above, the method may further comprise the step 630C of generating or modifying a script to create a third table. This script may specify the creation of the third table from the second table and the first table by merging according to the values of the first and second merger fields. The script may specify that the third table include every field in either the first or second table. For each unique value of the first and second merger fields, a record may be created in the third table.

Figure 38:
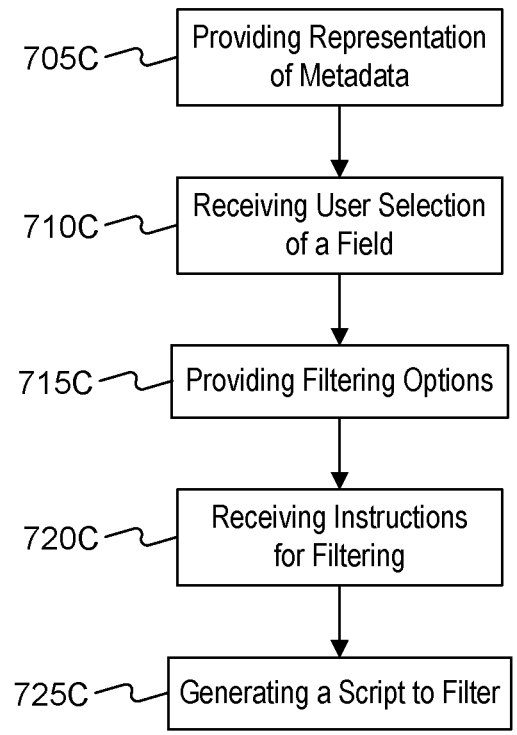
FIG. 38 depicts an exemplary method of generating or modifying a filtering script consistent with disclosed embodiments.

FIG. 38 shows an exemplary method of generating or modifying a filtering script consistent with disclosed embodiments. The disclosed embodiments may enable the user 105C to specify the scope of the data that will be used to conduct analytics. For example, the user 105C may specify a time period, product type, geographic region, etc. This method may include the step 705C of providing a first representation of the diagnostic metadata 201C for display on the user device 104C. In some embodiments, this representation may comprise elements of a matrix, each row of the matrix corresponding to a field in the table. In such embodiments, a filter column may be provided comprising a user selectable control for generating or modifying a script by specifying the filtering of the contents of the field. Responsive to user selection 203C of this control (step 710C), the server 103C may provide for display on the user device 104C a list of options of filtering options based on the contents of the selected field (step 715C). For example, if the selected field contains numerical data then the user interface may provide options for selecting a minimum and a maximum value. As an additional example, if the selected field contains enumerated data, such as responses to multiple choice questions, then the user interface may provide a user-selectable list based on values of the field contents. As a further example, if the selected field contains dates, the user interface may provide a beginning and end date. The method may include the further step 720C of receiving the user instructions, comprising, for example, the provided minimum and maximum values, selected enumerated items, and beginning and end dates. The method may also include the further step 725C of generating or modifying a script to filter the selected field of the database based on the information provided by the user. Therefore, in each of these examples, the information provided by the user may determine the contents of the field provided to the trait-based modeling system.

Figure 39:
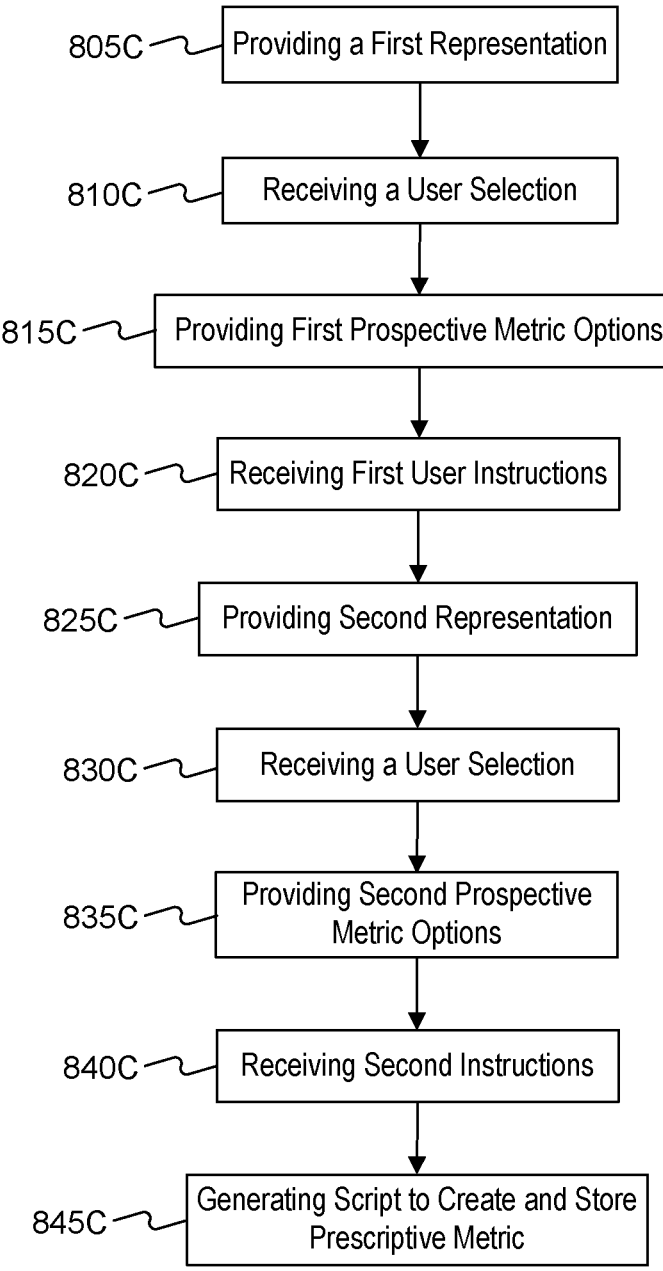
FIG. 39 depicts an exemplary method of generating or modifying a script defining a prescriptive metric consistent with disclosed embodiments.

FIG. 39 shows an exemplary method of generating or modifying a script defining a prescriptive metric consistent with disclosed embodiments. This method may include the step 805C of the server 103C providing for display by the user device 104C a first representation of the diagnostic metadata 201C. In some embodiments, this first representation includes first elements representing fields of a first table in the received information. The user display may allow the user 105C to select one or more of these first elements as a metric for the trait-based system discussed above. This selection may then be received by server 103C (step 810C). Based on the user selection 203C, the server 103C may provide a first set of prescriptive metrics options (step 815C). In some embodiments, the options may include controls permitting the user to provide equations as a metric for the trait-based system. These equations may take as variables the fields corresponding to the selected first elements of the first representation. For example, the user 105C may specify as a prescriptive metric a ratio between two fields corresponding to the selected first elements. The user 105C may also specify the level of aggregation of the data used to calculate the metric. For example, the user 105C may choose between calculating the proscriptive metric at the level of an individual, or at an overall or total level. In step 820C, the server 103C may receive these user instructions 203C. In further embodiments, a second representation of the metadata comprising elements representing fields of a second table in the received information is provided by server 103C for display on user device 104C (step 825C). In some embodiments, the second table may correspond to information received by server 102C from a second source of information 101C. This second source of information may be different than the source of information corresponding to the first table. The user display may allow the user 105C to select one or more of these second elements as a metric for the trait-based system discussed above. This selection may then be received by server 103C (step 830C). Based on the user selection 203C, the server 103C may provide a second set of prescriptive metrics options (step 835C). As discussed above, in some embodiments the options may include controls permitting the user to provide equations as a metric for the trait-based system. In step 840C, the server 103C may receive these user instructions 203C. The server may then generate or modify a script 204C based on the first instructions and the second instructions (step 845C). In some embodiments, only one table is selected and the script is generated or based only on one set of instructions. In some embodiments, the trait-based modelling system may then be used to optimize (e.g., increase or decrease) the identified field or relationship. When an equation is used, the server 103C may include in the script instructions to generate a new data field that stores the result of the equations. This may prevent the system from having to recalculate the data by calculating incremental changes based on newly received information. In some embodiments, the prescriptive metric may be calculated based on the fields from multiple sources of information. For example, the prescriptive metric may be based on a transaction cost from a table stored in one database and offset from a table stored in another database.

In such situations, the server 103C may cause the user interface of the user device 104C to display second prescriptive metric options based on the contents of the at least one selected second field (step 825C). Server 103C may generate or modify a script based the first and second instructions corresponding to the first and second prescriptive metric options (step 845C).

Figure 40:
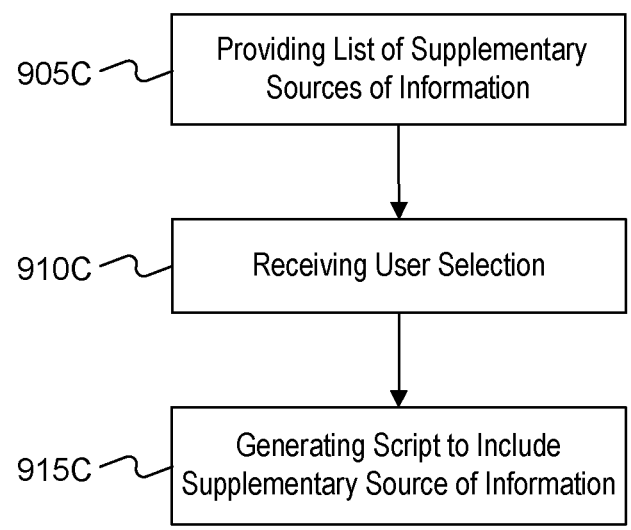
FIG. 40 depicts an exemplary method of generating or modifying a script associating supplementary sources of information with the client data consistent with disclosed embodiments.

FIG. 40 shows an exemplary method of generating or modifying a script associating supplementary sources of information with the client data consistent with disclosed embodiments. In some embodiments, method includes server 103C providing, for display to user device 104C, a list of proprietary supplementary sources of information, such a census data, weather data, property data, and personality and trait scoring data (step 905C). The display may allow the user 105C to select one or more of these tables for provision to the trait-based modeling system. Server 103C may then receive the user's selection (step 910C). Responsive to the user selection, the server 103C may generate a script to include these supplemental sources of information (step 915C).

Figure 41:
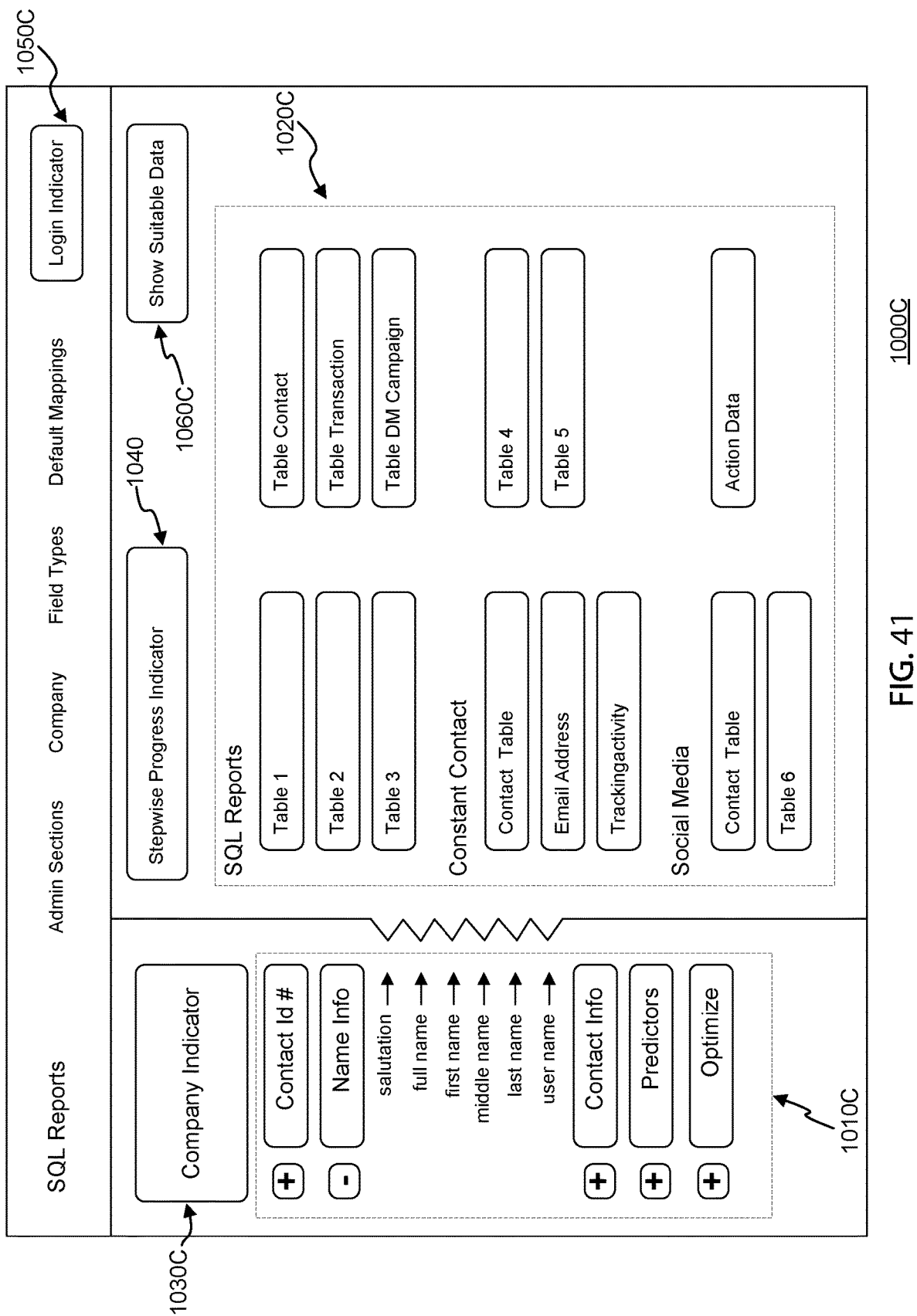
FIGS. 41-42 depict an exemplary user interface for on-boarding data consistent with the disclosed embodiments.

FIG. 41 depicts an exemplary user interface 1000C for on-boarding data consistent with the disclosed embodiments. In some embodiments user interface 1000C may concurrently display a first representation of a schema of the trait-based modeling system in an expandable list format 1010C, a first representation of the diagnostic metadata 1020C, a company indicator 1030C, a stepwise progress indicator 1040C, a login indicator 1050C, and a show suitable data control 1060C. The first representation in an expandable list format 1010C may show a first hierarchical level of the schema, together with user selectable display controls, that when selected cause the user interface to display a second hierarchical level of the schema. The first representation of the diagnostic metadata 1020C may display sources of the diagnostic metadata and objects arranged in an array indicating tables within each source. The company indicator 1030C may display the company for which the onboarding process is performed, while the login indicator 1050C may display the individual that is performing the onboarding process. The stepwise progress indication 1040C may show the several steps comprising the onboarding process and the current step in the process being performed. The stepwise progress indicator 1040C may be user-selectable to navigate the several steps of the onboarding process. The show suitable data control 1060C, discussed with reference to FIG. 43 below, may be user-selectable to cause the user interface to recommend data for association with fields of the trait based modeling system.

Figure 42:
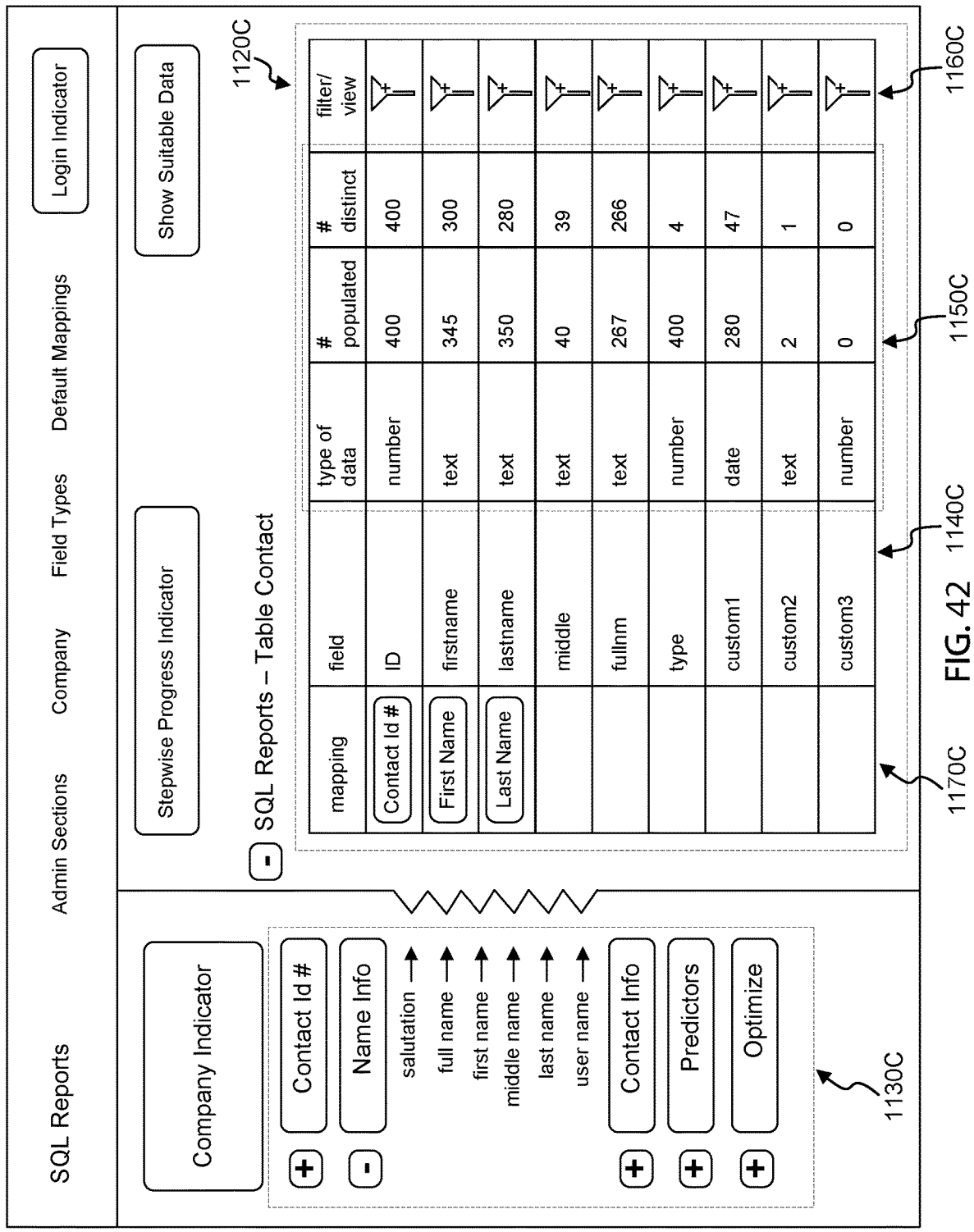

FIG. 42 depicts a second representation of the diagnostic metadata 1110C. This second representation may include a matrix depicting a table of the diagnostic metadata 1120C. The rows of the matrix may be associated with the fields of the table. The matrix may have a column indicating a mapping between the fields of the matrix and the fields of the schema 1130C, a column indicating a field identifier of the table 1140C, columns indicating descriptive statistics of the fields of the table 1150C, and a column containing a filtering control for each field of the table 1160C. The column of the matrix indicating a mapping 1170C may be populated with representations of fields in the schema of the trait-based modeling system indicating the existence of an association between the field of the schema and the field of the table.

Figure 43:
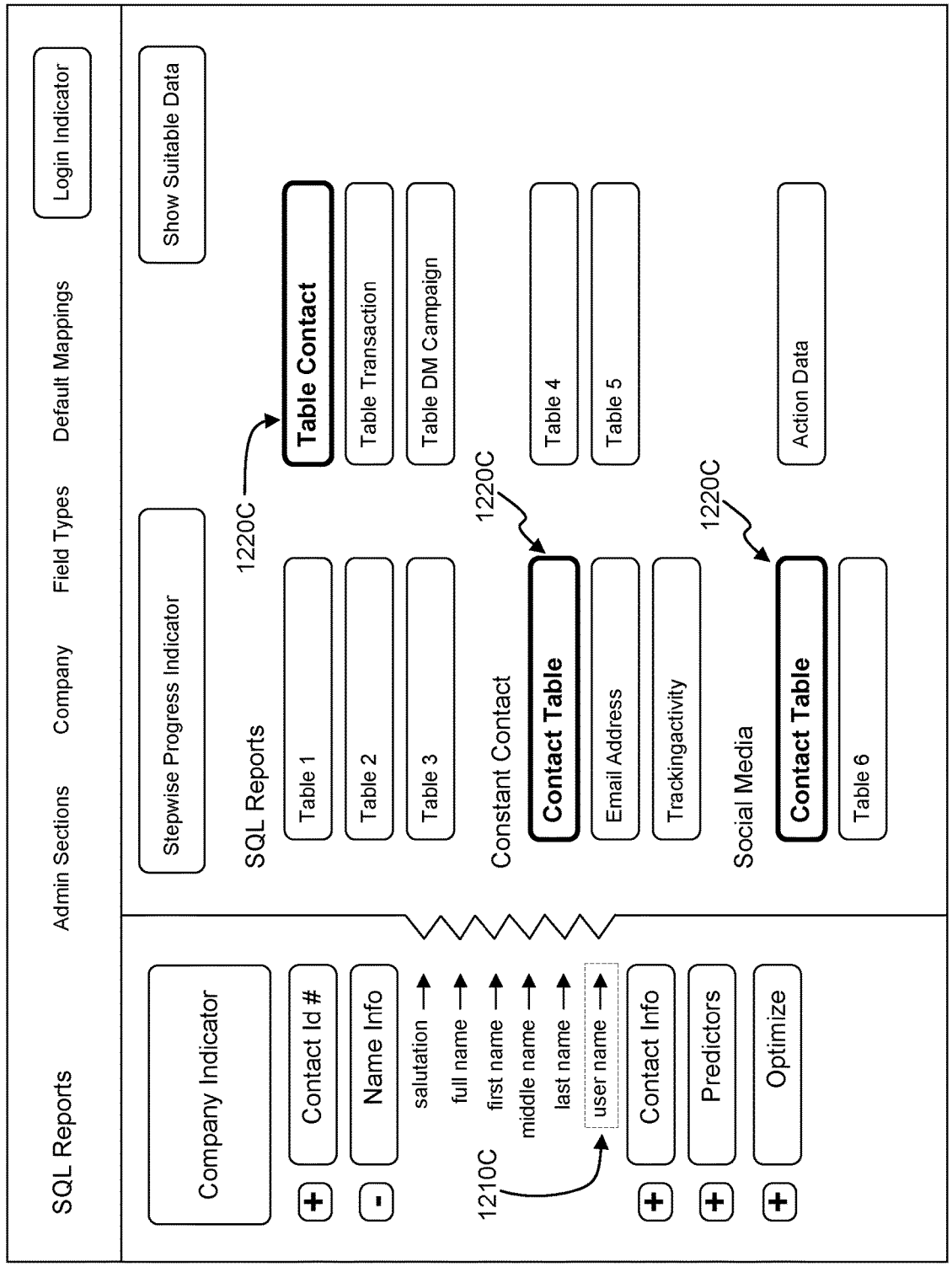
FIG. 43 depicts an exemplary user interface for recommending suitable client data consistent with disclosed embodiments.

FIG. 43 depicts an exemplary user interface for recommending suitable client data consistent with disclosed embodiments. Upon selection of the show suitable data control 1060C and a field in the schema of the trait-based modeling system 1210C, the user interface may highlight objects 1220C in the representation of the diagnostic metadata 1020C to indicate the presence of data in the tables corresponding to the objects relevant to the selected field of the trait-based modeling system.

Figure 44:
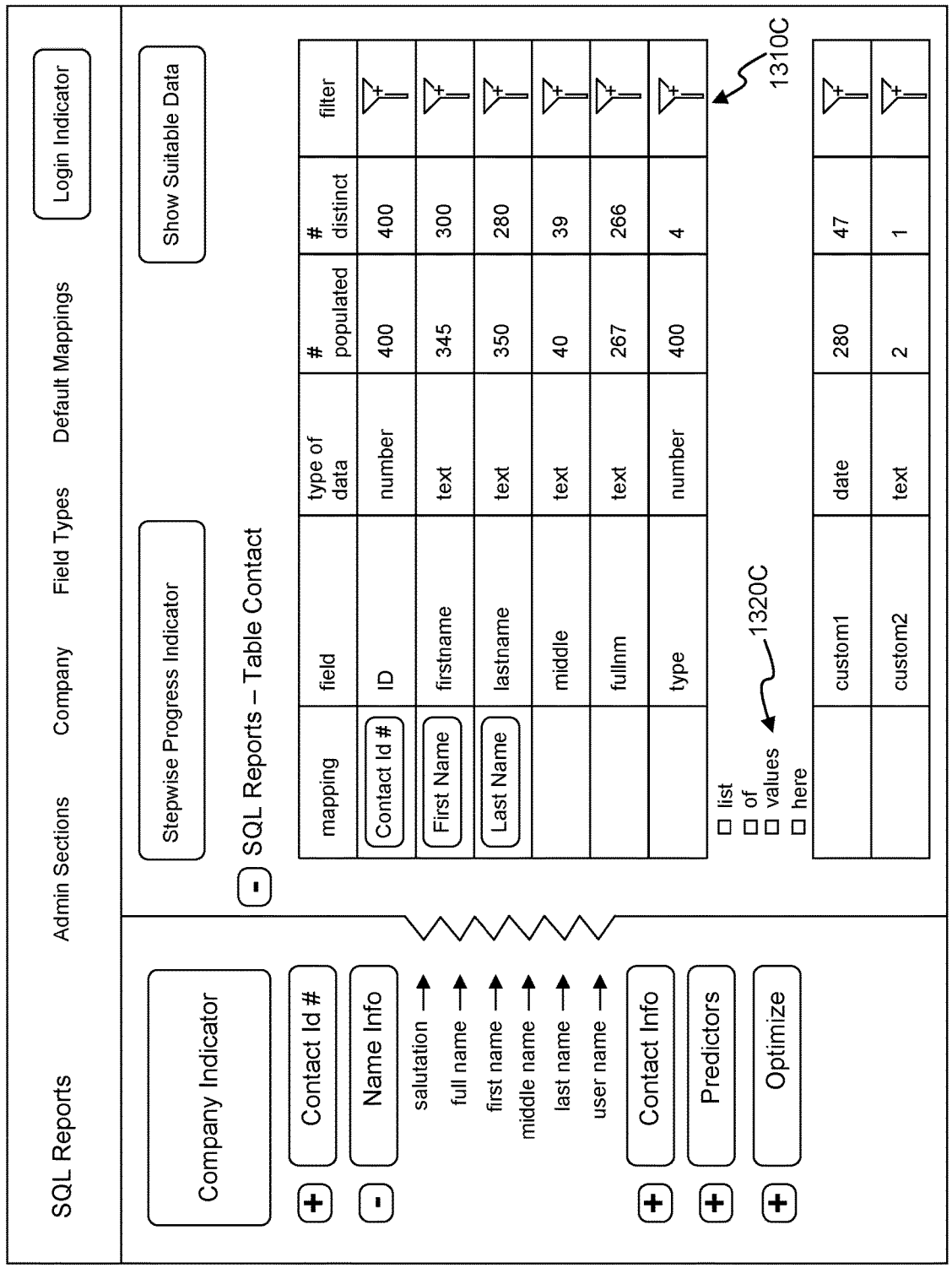
FIG. 44 depicts an exemplary user interface for filtering client data consistent with disclosed embodiments.

FIG. 44 depicts an exemplary user interface for filtering client data consistent with disclosed embodiments. As described above, the columns of the matrix depicting a table of the diagnostic metadata 1120C include a column having user-selectable filtering controls 1160C. Selection of a filtering control for a field of the table 1310C causes the user interface to provide filtering options 1320C for the content in that field. In some embodiments, the methods and systems for onboarding data may generate a script to filter the content in the field corresponding to the selected control 1310C based on the user input 203C provided in responses to the filtering options 1320C.

Figure 45:
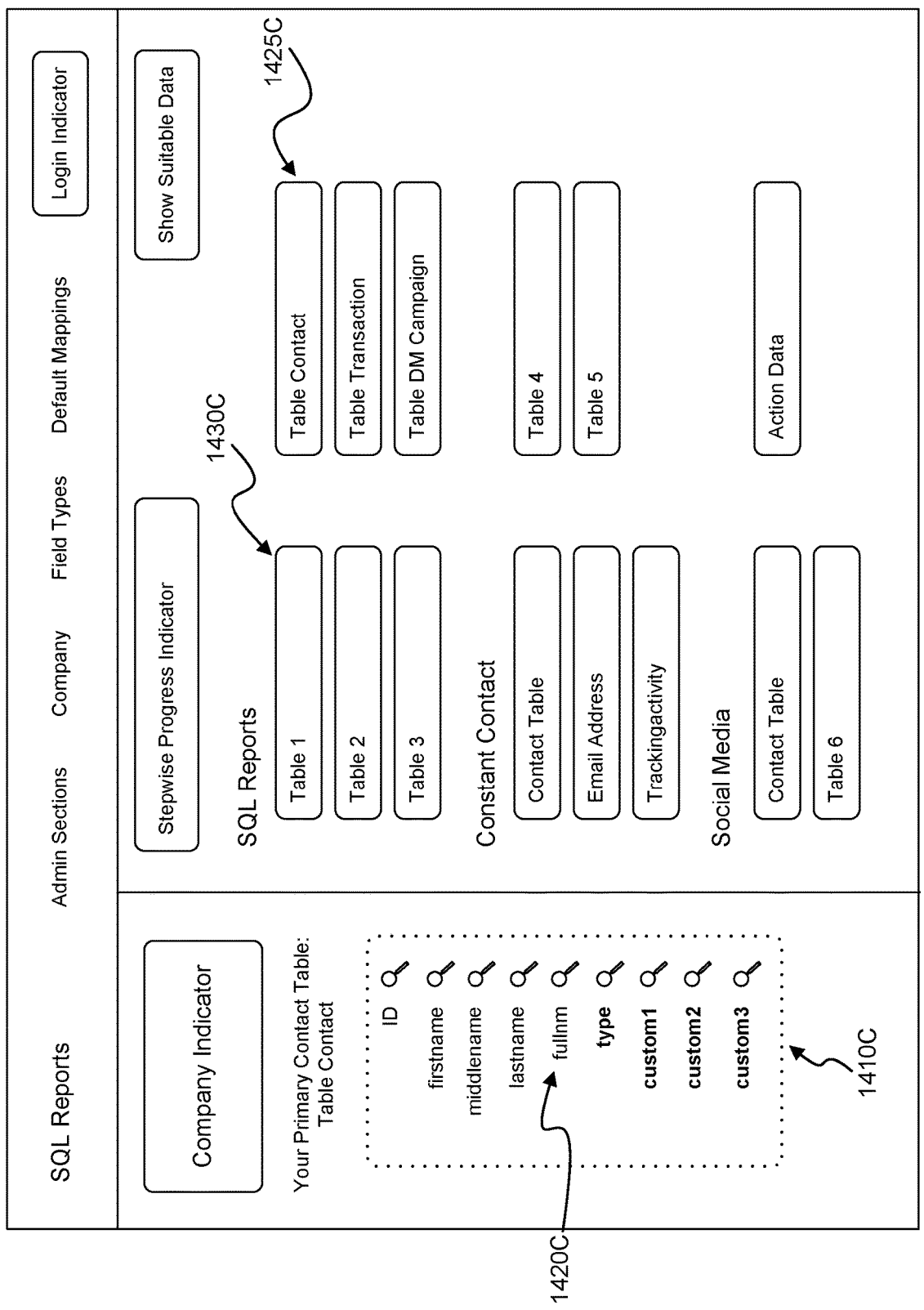
FIGS. 45-47 depict an exemplary user interface for combining multiple tables consistent with consistent with disclosed embodiments.

FIG. 45 depicts the first step in interacting with an exemplary user interface for combining multiple tables consistent with consistent with disclosed embodiments. In some embodiments, the user interface provides a first representation of metadata 1410C comprising elements (e.g. element 1420C) representing fields of a first table 1425C in the diagnostic metadata. User 105C may interact with user device 104C to select element 1420C corresponding to a field of the table. The user may also select a table 1430C from the first representation of the diagnostic metadata 1020C.

Figure 46:
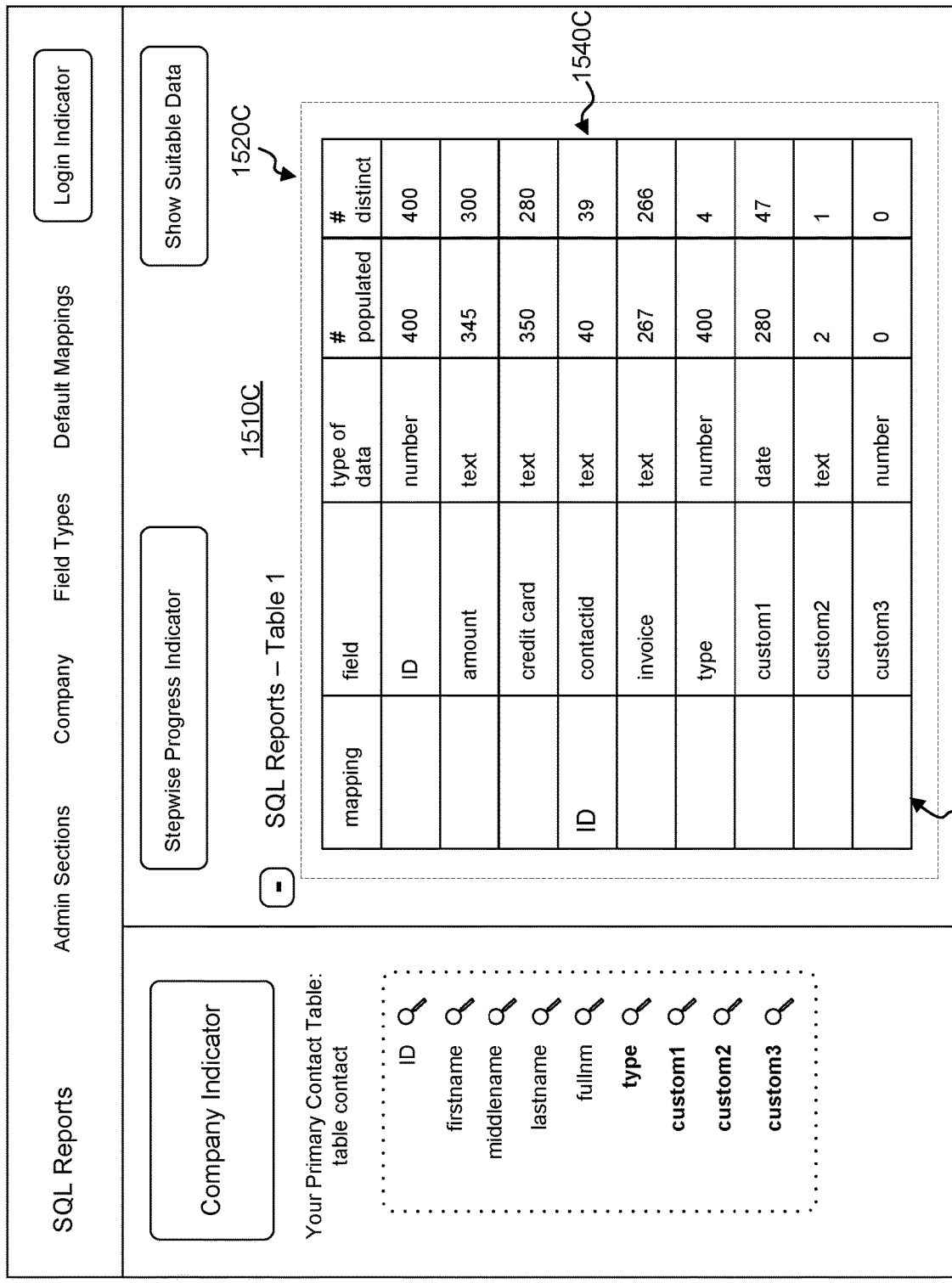

FIG. 46 depicts the second step in interacting with exemplary user interface for combining multiple tables consistent with consistent with disclosed embodiments. Responsive to the selection of element corresponding to a field 1420C and table 1430C, the user interface may provide a second representation of the diagnostic metadata 1510C. This second representation may include a matrix 1520C having a column 1530C indicating a mapping between the field corresponding to element 1420C and a field corresponding to a row of the matrix 1540C. In some embodiments, the order of presentation of the rows corresponding to the fields of the matrix may depend on the similarity of the contents of those fields to the field corresponding to selected element 1430C.

Figure 47:
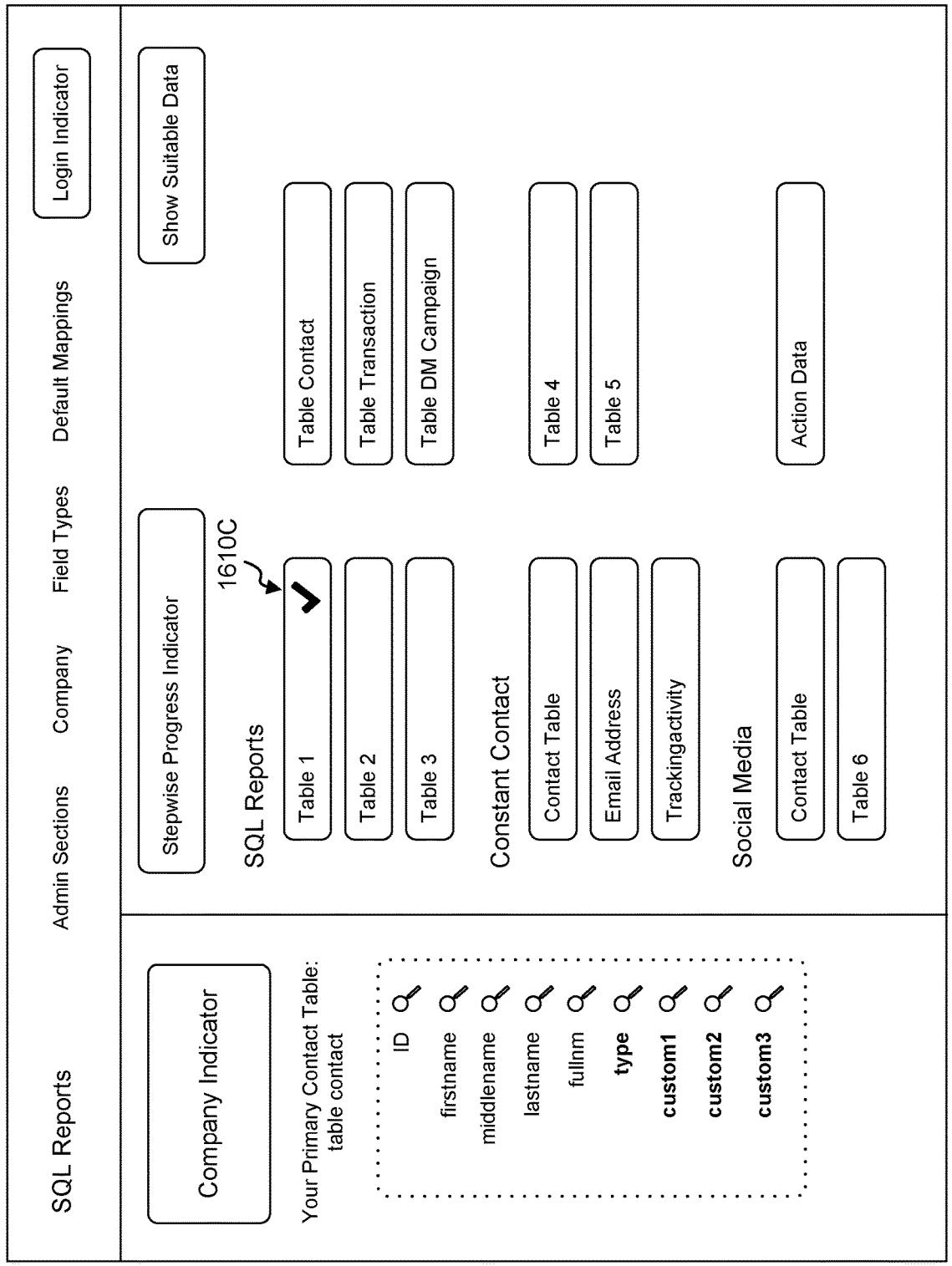

FIG. 47 depicts an exemplary user interface for combining multiple tables consistent with consistent with disclosed embodiments, following the association of the field corresponding to selected element 1430C with the field corresponding to matrix row 1540C. In some embodiments, the user interface may provide table 1440C an indication 1610C of the connection between the table 1440C and the table 1425C.

Figure 48:
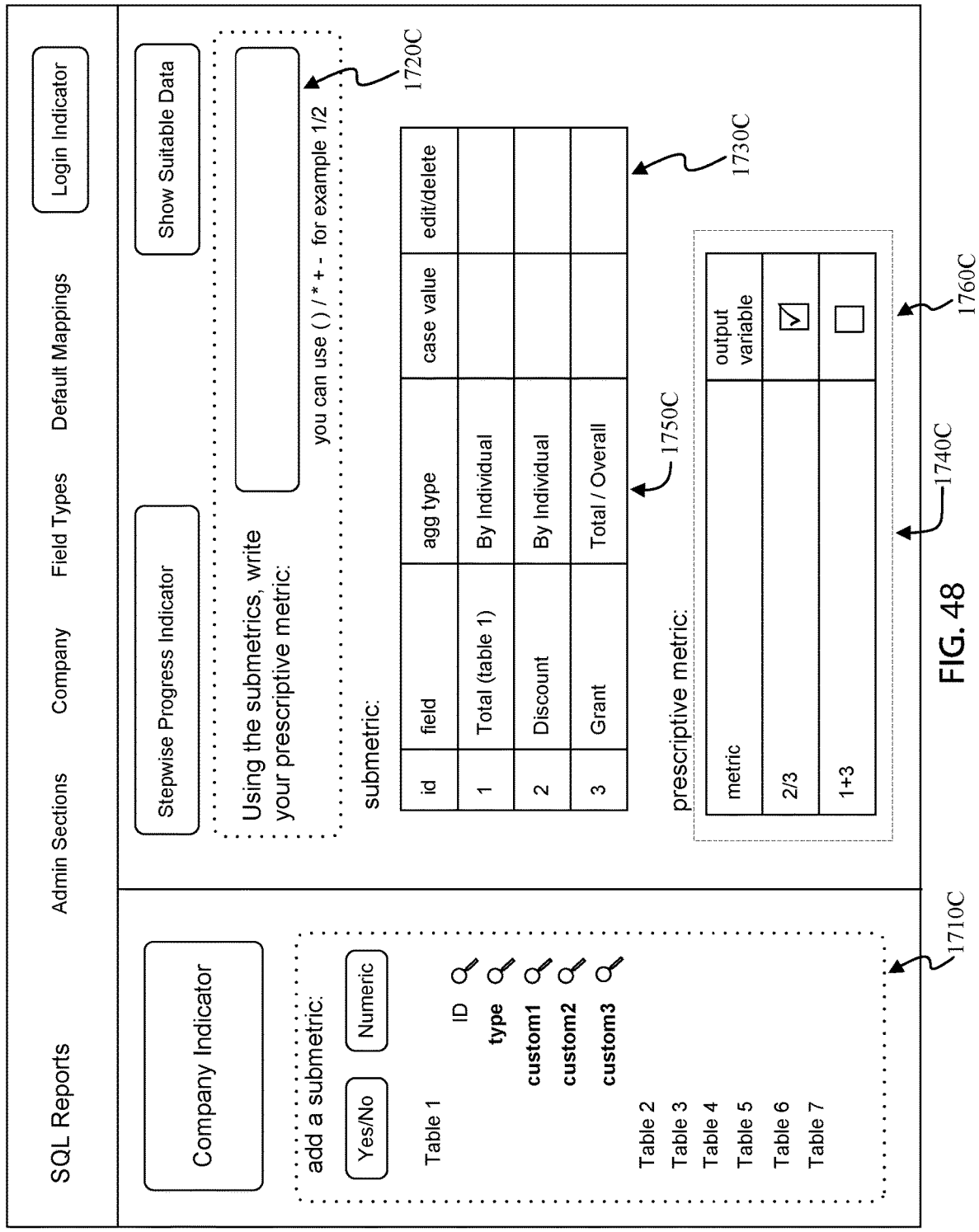
FIGS. 48-49 depict an exemplary user interface for generating a prescriptive metric consistent with disclosed embodiments.

FIG. 48 depicts an exemplary user interface for generating a prescriptive metric 1700C consistent with disclosed embodiments. In some embodiments, the user interface provides a field selector 1710C, a formula box 1720C, a submetric listing 1730C, and a prescriptive metric listing 1740C. Field selector 1710C provides a representation of the diagnostic metadata 201C in an expandable list format. The user 105C may interact with user device 105C, using field selector 1710C to select a field in the diagnostic metadata 201C as a source for a submetric and indicate whether the submetric would be a numeric submetric. Additionally, in some embodiments the user 105C may use formula box 1720C to provide a formula relating at least one submetric to a prescriptive metric. In some embodiments, submetric listing 1730C provides a list of the submetrics chosen as potential bases for prescriptive metrics and descriptive statistics of those chosen submetrics, including a column 1750C indicating an aggregation level for each submetric. In some embodiments, selecting elements of submetric listing 1730C may allow the user to access and modify information relating to the chosen submetrics. In some embodiments, prescriptive metric listing 1740C depicts the available prescriptive metrics, including a column containing a user-selectable control setting the prescriptive metric as a variable for optimization 1760C. In some embodiments, selecting elements of prescriptive metric listing 1740C may allow the user to access and modify information relating to the defined prescriptive metrics.

Figure 49:
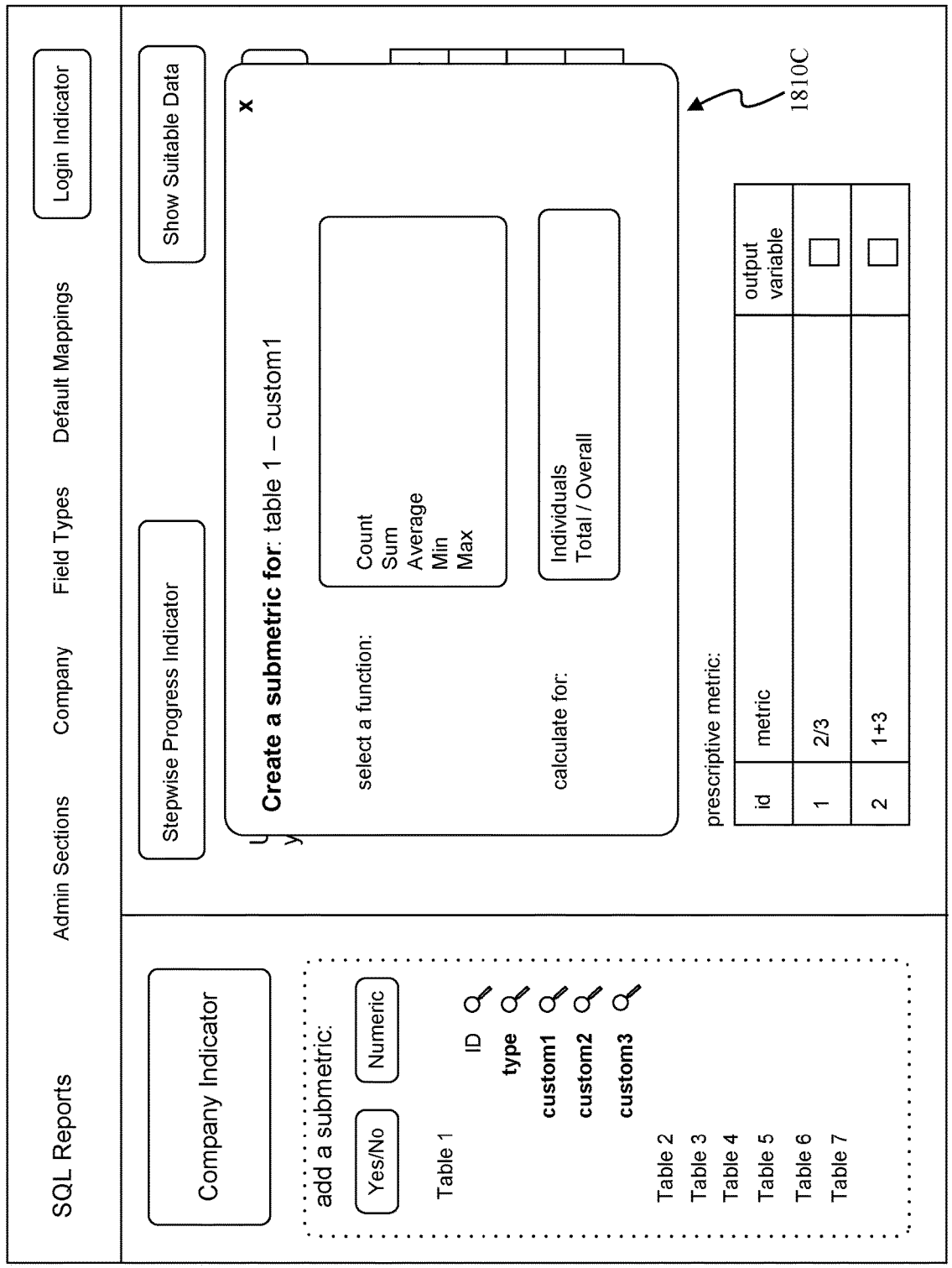

FIG. 49 depicts a dialog 1810C for defining submetrics. In some embodiments, the user interface may provide this dialog responsive to the selection of a field using field selector 1710C. In other embodiments, the user interface may provide dialog 1810C responsive to selection of another element of user interface 1700C, such as submetric listing 1730C. Dialog 1810C provides options for generating or modifying the submetric created from the selected field, including a choice of functions to perform on the data and a choice of aggregation levels for the calculation.

Figure 50:
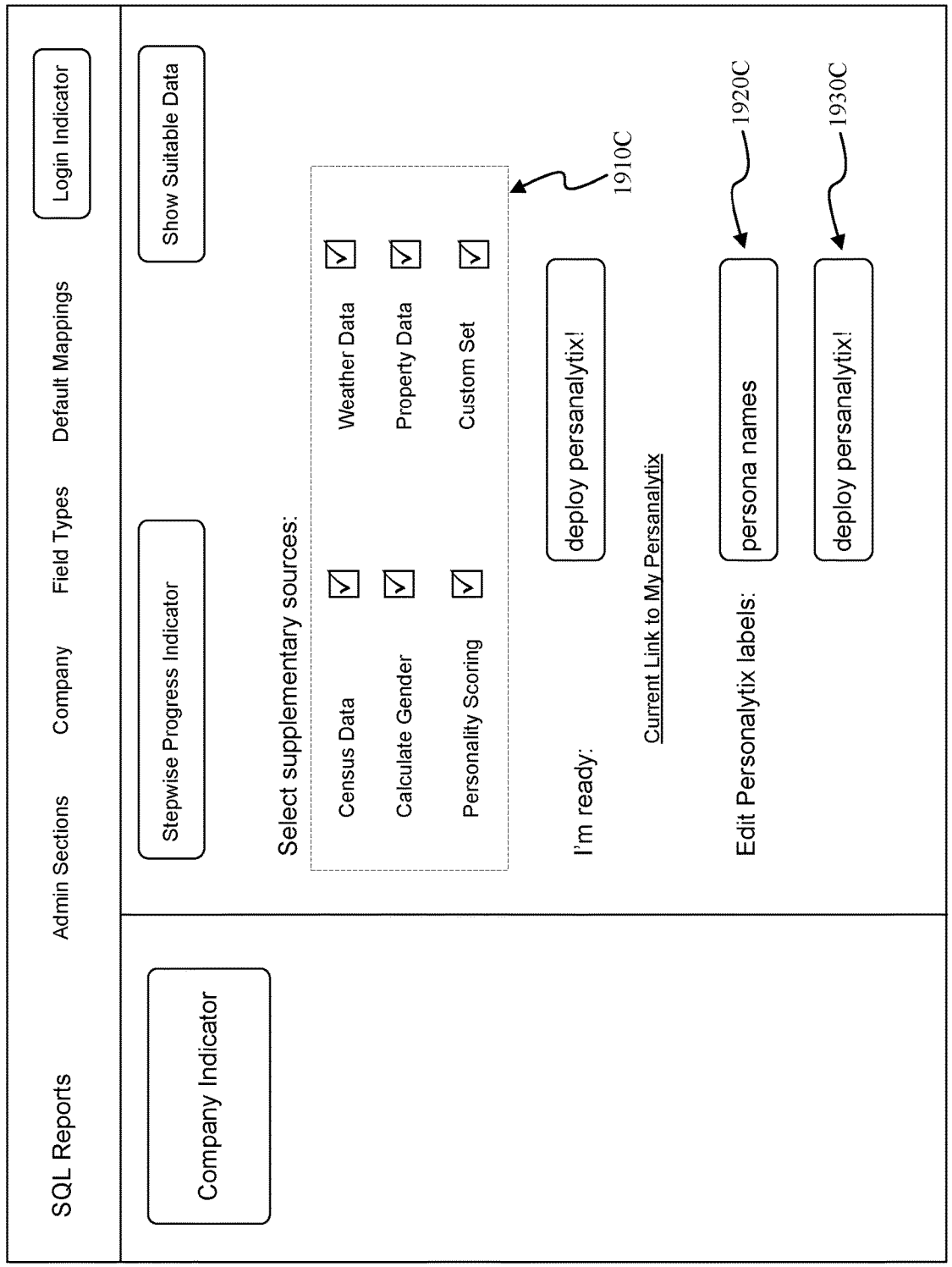
FIG. 50 depicts an exemplary user interface for selecting supplementary data sources consistent with disclosed embodiments.

FIG. 50 depicts an exemplary user interface for selecting supplementary data sources consistent with disclosed embodiments. In some embodiments, user-selectable controls 1910C are provided for selecting supplementary data sources to include in the information provided to the trait-based modeling system. In certain embodiments, control 1920C allows for the company or user-specific modification of labels associated with the fields in the schema of the trait-based modeling system. In other embodiments, a deployment control 1930C is provided. In such embodiments, selection of the deployment control will cause server 103C to generate a script based on the user input 203C and provide the scrip 204C to the server 102C, causing server 102C to provide data to the trait-based modeling system.

The methods disclosed herein may be implemented as a computer program product comprising computer-readable instructions. Computer-readable instructions may be stored on a tangible non-transitory computer-readable medium, such as a flexible disk, a hard disk, a CD-ROM (compact disk-read only memory), an MO (magneto-optical) disk, a DVD-ROM (digital versatile disk-read only memory), a DVD RAM (digital versatile disk-random access memory), or a semiconductor memory. Alternatively, the methods may be implemented in hardware components or combinations of hardware and software of a data processing apparatus, e.g., a. programmable processor, a computer, or multiple computers. The computer program may be written in any form of programming language, including compiled or interpreted languages, and it may be deployed in any form, including as a standalone program or as a module, component, subroutine, or other unit suitable for use in a computing environment. A computer program may be deployed to be executed on one computer or on multiple computers at one site or distributed across multiple sites and interconnected by a communication network.

In the preceding specification, the embodiments have been described with reference to specific exemplary embodiments. It will however, be evident that various modifications and changes may be made without departing from the broader spirit and scope of the exemplary embodiments as set forth in the claims that follow. The specification and drawings are accordingly to be regarded as illustrative rather than restrictive sense. Other embodiments of the present disclosure may be apparent to those skilled in the art from consideration of the specification and practice of the description disclosed herein.

What is claimed is:

1. A method comprising:
   obtaining, at a computer, a first set of relationships between information atoms, the first set of relationships occurring at a first time;
   measuring a baseline sentiment for each of the first set of relationships;
   obtaining a second set of relationships between the information atoms, the second set of relationships occurring at a second time different from the first time;
   measuring a baseline sentiment for each of the second set of relationships;
   calculating changes in baseline sentiment between the first time and the second time by determining differences between (a) one of the measured baseline sentiments for the first set of relationships and (b) one of the measured baseline sentiments for the second set of relationships;
   determining an action to take based on how the calculated changes in baseline sentiment relate to a metric; and
   outputting the action to take.

2. The method of claim 1, comprising:
   storing the baseline sentiments;
   recognizing patterns in the changes in baseline sentiment;
   identifying new baseline sentiments based on the patterns; and
   updating the stored baseline sentiments with the new baseline sentiments.

3. The method of claim 1, wherein the metric is an organization metric pertaining to an organization's goals, the method comprising:
   determining a third set of relationships between the organization metric and the other information atoms;
   identifying differences related to the organization metric, based on the third relationships;
   determining a second action to take based on the differences related to the organization metric; and
   outputting the second action to take.

4. The method of claim 3, wherein the information atoms comprise descriptors of individuals, statements made by individuals, or topics to which the statements pertain.

5. The method of claim 4, comprising:
   identifying a fourth set of relationships between (a) the determined differences between the one of the measured baseline sentiments for the first set of relationships and the one of the measured baseline sentiments for the second set of relationships ("the differences between the measured baseline sentiments") and (b) the information atoms;
   associating the differences between the measured baseline sentiments with specific ones of the individuals, based on the fourth set of relationships;
   calculating scores for the individuals, based on the third and fourth relationships; and
   outputting a score related to at least one individual.

6. The method of claim 4, comprising:
   identifying a fourth set of relationships between (a) the determined differences between the one of the measured baseline sentiments for the first set of relationships and the one of the measured baseline sentiments for the second set of relationships ("the differences between the measured baseline sentiments") and (b) the information atoms;
   associating the differences between the measured baseline sentiments with specific ones of the individuals, based on the fourth set of relationships;

calculating scores for the individuals, based on the third and fourth relationships; and outputting the differences between the measured baseline sentiments.

7. The method of claim 3, wherein the information atoms comprise descriptors of individuals, further comprising:

identifying a fourth set of relationships between (a) the determined differences between the one of the measured baseline sentiments for the first set of relationships and the one of the measured baseline sentiments for the second set of relationships ("the differences between the measured baseline sentiments") and (b) the information atoms; and associating the differences between the measured baseline sentiments with specific ones of the descriptors of individuals, based on the fourth set of relationships.

8. The method of claim 1, wherein at least one relationship in the first or second set of relationships comprises a magnitude.

9. The method of claim 1, wherein at least one relationship in the first or second set of relationships comprises a direction.

10. The method of claim 1, comprising:

recognizing patterns in the differences; and adjusting the second set of relationships based on the patterns, the baseline sentiment for the first set of relationships, and the baseline sentiment for the second set of relationships.

11. The method of claim 1, comprising:

recognizing patterns in the differences; and adjusting the information atoms based on the patterns and the baseline sentiments.

12. The method of claim 1 wherein the metric is a business metric.

13. A non-transitory computer-readable storage medium encoded with instructions that, when executed on a processor, perform a method comprising:

obtaining, at a computer, a first set of relationships between information atoms, the first set of relationships occurring at a first time;

measuring a baseline sentiment for each of the first set of relationships;

obtaining a second set of relationships between the information atoms, the second set of relationships occurring at a second time different from the first time;

measuring a baseline sentiment for each of the second set of relationships;

calculating changes in baseline sentiment between the first time and the second time by determining differences between (a) one of the measured baseline sentiments for the first set of relationships and (b) one of the measured baseline sentiments for the second set of relationships;

determining an action to take based on how the calculated changes in baseline sentiment relate to a metric; and outputting the action to take.

14. The storage medium of claim 13, wherein the method comprises:

storing the baseline sentiments;

recognizing patterns in the changes in baseline sentiment;

identifying new baseline sentiments based on the patterns; and updating the stored baseline sentiments with the new baseline sentiments.

15. The storage medium of claim 13, wherein the metric is an organization metric pertaining to an organization's goals, the method comprising:

determining a third set of relationships between the organization metric and the other information atoms;

identifying differences related to the organization metric, based on the third relationships;

determining a second action to take based on the differences related to the organization metric; and outputting the second action to take.

16. The storage medium of claim 15, wherein the information atoms comprise descriptors of individuals, statements made by individuals, or topics to which the statements pertain.

17. The storage medium of claim 13 wherein the metric is a business metric.

* * * * *